US006648367B2

(12) United States Patent
Breed et al.

(10) Patent No.: US 6,648,367 B2
(45) Date of Patent: Nov. 18, 2003

(54) INTEGRATED OCCUPANT PROTECTION SYSTEM

(75) Inventors: David S. Breed, Boonton Township, Morris County, NJ (US); Wilbur E. DuVall, Kimberling City, MO (US); Wendell C. Johnson, Signal Hill, CA (US); William Thomas Sanders, Rockaway Township, Morris County, NJ (US)

(73) Assignee: Automotive Technologies International Inc., Denville, NJ (US)

( * ) Notice: Subject to any disclaimer, the term of this patent is extended or adjusted under 35 U.S.C. 154(b) by 80 days.

(21) Appl. No.: 09/770,974

(22) Filed: Jan. 26, 2001

(65) Prior Publication Data

US 2001/0048215 A1 Dec. 6, 2001

Related U.S. Application Data

(63) Continuation-in-part of application No. 09/073,403, filed on May 6, 1998, now Pat. No. 6,179,326, which is a continuation-in-part of application No. 08/571,247, filed on Dec. 12, 1995, now Pat. No. 5,772,238, which is a continuation-in-part of application No. 08/550,217, filed on Oct. 30, 1995, now abandoned, application No. 09/770,974, which is a continuation-in-part of application No. 09/356,314, filed on Jul. 16, 1999, which is a continuation-in-part of application No. 08/947,661, filed on Oct. 9, 1997, now abandoned, and a continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,809,437.

(60) Provisional application No. 60/028,246, filed on Oct. 10, 1996.

(51) Int. Cl.[7] ............................................. B60R 21/22

(52) U.S. Cl. ........................... 280/730.1; 280/735

(58) Field of Search ...................... 280/730.1, 730.2, 280/735

(56) References Cited

U.S. PATENT DOCUMENTS 1,837,140 A    12/1931  Thew .................... 200/61.49

(List continued on next page.)

FOREIGN PATENT DOCUMENTS

| DE | 3809074 | 10/1989 | ............. 280/728.1 |
| DE | 4419034 | 12/1994 | ............... 280/734 |
| EP | 0663325 | 7/1995 | |
| GB | 2191450 | 12/1987 | |

OTHER PUBLICATIONS

Liubakka et al, "Failure Detection Algorithms Applied to Control System Design for Improved Diagnositcs and Reliability", SAE Technical Paper Series, 02–29 To 04–04, 1988, pp. 1–7.*

(List continued on next page.)

Primary Examiner—Eric Culbreth
(74) Attorney, Agent, or Firm—Brian Roffe

(57) ABSTRACT

Occupant protection system for protecting one or more occupants of a vehicle including a deployable occupant protection device arranged on at least one of the seats, a deployment determining unit which generates a signal indicative of whether deployment of the occupant protection device is desired, and an electrical bus extending into the seat and electrically coupling the occupant protection device and the deployment determining unit. The signal from the deployment determining unit is sent over the bus to the occupant protection device to enable deployment thereof. The occupant protection device may include an airbag module having an airbag and be arranged at a rear of the seat to be deployable rearward for protecting an occupant situated behind the seat. The deployment determining unit preferably includes a crash sensor coupled to the bus for sensing a crash event and providing a signal indicative thereof.

36 Claims, 35 Drawing Sheets

U.S. PATENT DOCUMENTS

| | | | |
|---|---|---|---|
| 2,052,869 A | 9/1936 | Coanda | 406/181 |
| 2,487,433 A | 11/1949 | Gardenhour | 200/DIG. 29 X |
| 3,158,314 A | 11/1964 | Young et al. | 417/191 |
| 3,204,862 A | 9/1965 | Hadeler | 230/95 |
| 3,370,784 A | 2/1968 | Day | 230/95 |
| 3,414,292 A | 12/1968 | Oldberg | |
| 3,564,280 A | 2/1971 | Sognefest | 301/101 |
| 3,567,881 A | 3/1971 | Duimstra | 200/61.53 |
| 3,632,133 A | 1/1972 | Hass | 280/150 |
| 3,672,699 A | 6/1972 | De windt | 280/735 |
| 3,673,362 A | 6/1972 | Carlson et al. | 200/61.45 R |
| 3,674,950 A | 7/1972 | Scoville | 200/61.48 |
| 3,694,003 A | 9/1972 | Radke | 280/735 |
| 3,715,535 A | 2/1973 | Urenda | 200/61.53 |
| 3,738,681 A | 6/1973 | Wada et al. | 280/728.1 |
| 3,741,583 A | 6/1973 | Usui et al. | 280/735 |
| 3,753,475 A | 8/1973 | Anderson et al. | 280/735 |
| 3,779,577 A * | 12/1973 | Wilfert | 280/730.1 |
| 3,791,669 A | 2/1974 | Hamilton | 280/150 |
| 3,801,127 A | 4/1974 | Katter et al. | 280/150 |
| 3,861,712 A | 1/1975 | Matsui et al. | 280/739 |
| 3,874,695 A | 4/1975 | Abe et al. | 280/735 |
| 3,884,499 A | 5/1975 | Oka et al. | 280/739 |
| 3,891,965 A | 6/1975 | Schroeder | 340/870.16 |
| 3,909,037 A | 9/1975 | Stewart | 280/150 |
| 3,910,595 A | 10/1975 | Katter et al. | 280/150 |
| 3,911,666 A | 10/1975 | Haber | 200/61.52 X |
| 3,938,826 A | 2/1976 | Giorgini et al. | 280/150 |
| 3,947,056 A | 3/1976 | Schwanz | 280/730.1 |
| 4,013,526 A | 3/1977 | Inoue | 204/129.46 |
| 4,016,752 A | 4/1977 | Carey | 73/652 |
| 4,022,998 A | 5/1977 | Fohl | 200/61.45 R |
| 4,043,572 A | 8/1977 | Hattori et al. | 280/736 |
| 4,128,005 A | 12/1978 | Arnston et al. | 73/117.3 |
| 4,130,298 A | 12/1978 | Shaunnessey | 280/730.1 |
| 4,243,248 A | 1/1981 | Scholz et al. | 280/735 |
| 4,360,223 A | 11/1982 | Kirchoff | 280/729 |
| 4,414,529 A | 11/1983 | Yoshioka et al. | 337/365 |
| 4,418,388 A | 11/1983 | Allgor et al. | 364/431.01 |
| 4,463,341 A | 7/1984 | Iwasaki | 340/310.1 |
| 4,528,541 A | 7/1985 | Hollweck et al. | 337/354 |
| 4,804,132 A | 2/1989 | DiFrancesco | 228/115 |
| 4,817,418 A | 4/1989 | Asami et al. | 73/118.1 |
| 4,822,959 A | 4/1989 | Schwab | 200/5 A |
| 4,843,964 A | 7/1989 | Bickes, Jr. et al. | 102/202.5 |
| 4,877,264 A | 10/1989 | Cuevas | 280/731 |
| 4,883,996 A | 11/1989 | Aoki | 102/530 |
| 4,909,549 A | 3/1990 | Poole et al. | 280/738 |
| 4,928,991 A | 5/1990 | Thorn | 280/738 |
| 4,948,927 A | 8/1990 | Pajak | 200/33 R |
| 4,963,412 A | 10/1990 | Kokeguchi | 280/743.1 |
| 4,974,873 A | 12/1990 | Kaiguchi et al. | 280/735 |
| 5,004,586 A | 4/1991 | Hayashi et al. | 422/164 |
| 5,041,976 A | 8/1991 | Marko et al. | 364/424.03 |
| 5,043,690 A | 8/1991 | Wahls | 337/370 |
| 5,060,973 A | 10/1991 | Giovanetti | 280/736 |
| 5,081,586 A | 1/1992 | Barthel et al. | 307/10.1 |
| 5,083,697 A | 1/1992 | Difrancesco | 228/116 |
| 5,085,465 A | 2/1992 | Hieahim | 280/738 |
| 5,100,172 A | 3/1992 | VanVoorhies et al. | 280/738 |
| 5,129,674 A | 7/1992 | Levosinski | 280/738 |
| 5,155,308 A | 10/1992 | Blair | 200/61.52 |
| 5,181,005 A | 1/1993 | Bayer | 337/354 |
| 5,182,459 A | 1/1993 | Okano et al. | 280/735 |
| 5,193,847 A | 3/1993 | Nakayama | 280/738 |
| 5,204,647 A | 4/1993 | Mitsuki et al. | |
| 5,207,450 A | 5/1993 | Pack, Jr. et al. | 280/738 |
| 5,216,396 A | 6/1993 | Stahly | 335/80 |
| 5,246,083 A | 9/1993 | Graf et al. | 280/735 |
| 5,286,054 A | 2/1994 | Cuevas | 280/738 |
| 5,313,407 A | 5/1994 | Tiernan et al. | 364/508 |
| 5,323,872 A | 6/1994 | Yabe | 280/735 |
| 5,325,082 A | 6/1994 | Rodriguez | 340/438 |
| 5,330,226 A * | 7/1994 | Gentry et al. | 280/735 |
| 5,332,259 A | 7/1994 | Conlee et al. | 280/738 |
| 5,333,240 A | 7/1994 | Matsumoto et al. | 395/23 |
| 5,334,809 A | 8/1994 | DiFrancesco | 200/262 |
| 5,366,241 A | 11/1994 | Kithil | 280/735 |
| 5,400,018 A | 3/1995 | Scholl et al. | 340/825.54 |
| 5,406,502 A | 4/1995 | Haramaty et al. | 364/551.01 |
| 5,406,889 A | 4/1995 | Letendre et al. | 102/201 |
| 5,423,571 A | 6/1995 | Hawthorn | 280/738 |
| 5,430,614 A | 7/1995 | Difrancesco | 361/785 |
| 5,435,594 A | 7/1995 | Gille | 280/728.2 |
| 5,437,473 A | 8/1995 | Henseler | |
| 5,442,553 A | 8/1995 | Parrillo | 364/424.04 |
| 5,446,442 A | 8/1995 | Swart et al. | 340/438 |
| 5,451,352 A | 9/1995 | Cook | 264/102 |
| 5,456,404 A | 10/1995 | Robinette, Jr. et al. | 228/104 |
| 5,457,293 A | 10/1995 | Breed | 200/61.52 |
| 5,458,367 A | 10/1995 | Marts et al. | 280/730.1 |
| 5,469,150 A | 11/1995 | Sitte | 340/825.07 |
| 5,471,151 A | 11/1995 | DiFrancesco | 324/757 |
| 5,481,906 A | 1/1996 | Nagayoshi et al. | 73/116 |
| 5,489,117 A | 2/1996 | Huber | 280/738 |
| 5,506,514 A | 4/1996 | Difrancesco | 324/757 |
| 5,509,686 A | 4/1996 | Shepherd et al. | 280/738 |
| 5,527,591 A | 6/1996 | Crotzer et al. | 428/209 |
| 5,538,278 A | 7/1996 | Blackshire et al. | 280/737 |
| 5,559,311 A | 9/1996 | Gorbatoff | 200/513 |
| 5,588,671 A * | 12/1996 | Boumarafi et al. | 280/730.2 |
| 5,599,042 A | 2/1997 | Shyr et al. | 280/730.1 |
| 5,709,403 A | 1/1998 | Taguchi et al. | 280/735 |
| 5,725,242 A | 3/1998 | Belau et al. | 280/735 |
| 5,744,765 A | 4/1998 | Yamamoto | 200/6 A |
| 5,745,027 A | 4/1998 | Malville | 340/310.1 |
| 5,772,238 A * | 6/1998 | Breed et al. | 280/728.2 |
| 5,772,686 A | 6/1998 | Caruana | 280/735 |
| 5,788,270 A | 8/1998 | Haland et al. | 280/729 |
| 5,796,057 A | 8/1998 | Nakajima et al. | 200/6 B |
| 5,809,437 A * | 9/1998 | Breed | 701/29 |
| 5,825,098 A | 10/1998 | Darby et al. | 307/10.1 |
| 5,834,716 A | 11/1998 | Lee | 200/5 R |
| 5,835,873 A | 11/1998 | Darby et al. | 701/45 |
| 5,859,584 A | 1/1999 | Counsell et al. | 340/310.1 |
| 5,899,949 A | 5/1999 | Kincaid | 701/45 |
| 5,964,815 A | 10/1999 | Wallace et al. | 701/45 |
| 5,964,816 A | 10/1999 | Kincaid | 701/45 |
| 6,084,314 A | 7/2000 | McCurdy | 307/10.1 |
| 6,104,308 A | 8/2000 | Wallace et al. | 340/825.08 |
| 6,175,787 B1 * | 1/2001 | Breed | 701/29 |
| 6,179,326 B1 * | 1/2001 | Breed et al. | 280/735 |
| 6,326,704 B1 * | 12/2001 | Breed et al. | 701/49 |

OTHER PUBLICATIONS

James et al, "Microprocessor Based Data Acquisition for Analysis of Engine Performance", SAE Technical Paper Series, 2/23–27/1987, pp. 1–9.*

Liubakka et al., "Failure Detection Algorithms Applied to Control System Design for Improved Diagnositcs and Reliability", SAE Technical Paper Series, 02–29 to 04–04, 1988, pp. 1–7.

James et al., "Microprocessor Based Data Acquisition for Analysis of Engine Performance", SAE Technical Paper Series, Feb. 23–27, 1987, pp. 1–9.

Making New Connections, Andrew J. Markel, IAI, pp. 39–40, Apr., 1999.

Siemens Jumps on the IDB Bus, News Release From Siemens Automotive Corporation, Feb. 28, 1999.

Different Approaches for Air Bag Triggering Units Using a Firing Bus, SAE Paper No. 971049, Michael Bischoff et al., Feb., 1997.
Bus Systems for Wiring Actuators of Restraint Systems, SAE Paper No. 971053, Joachim Bauer et al., Feb., 1997.

Fault Tolerant Networking of Squibs and Sensors in Advanced Passenger Restraint Systems, SAE Paper No. 980353, P. Buehring, Feb., 1998.

* cited by examiner

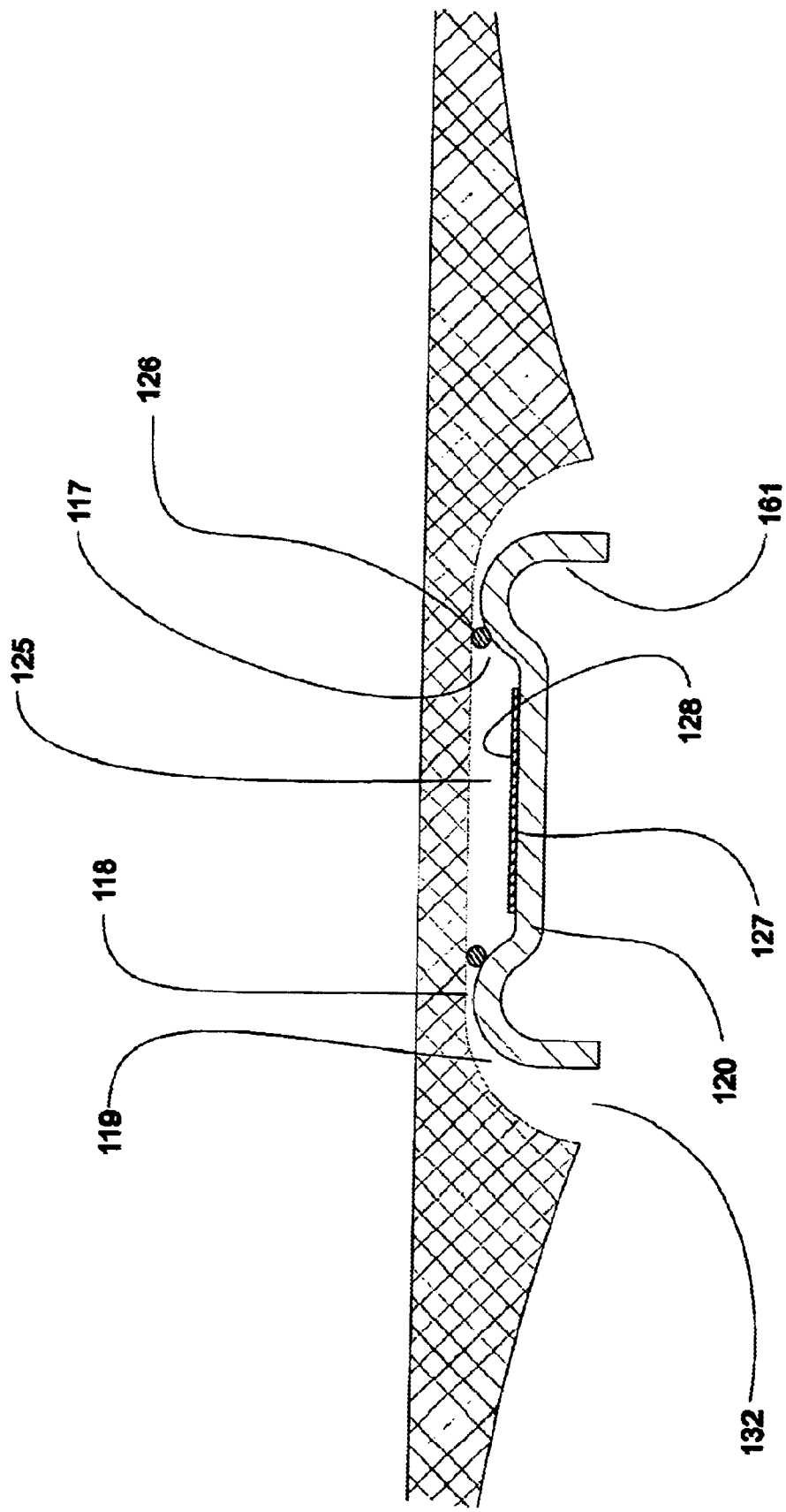

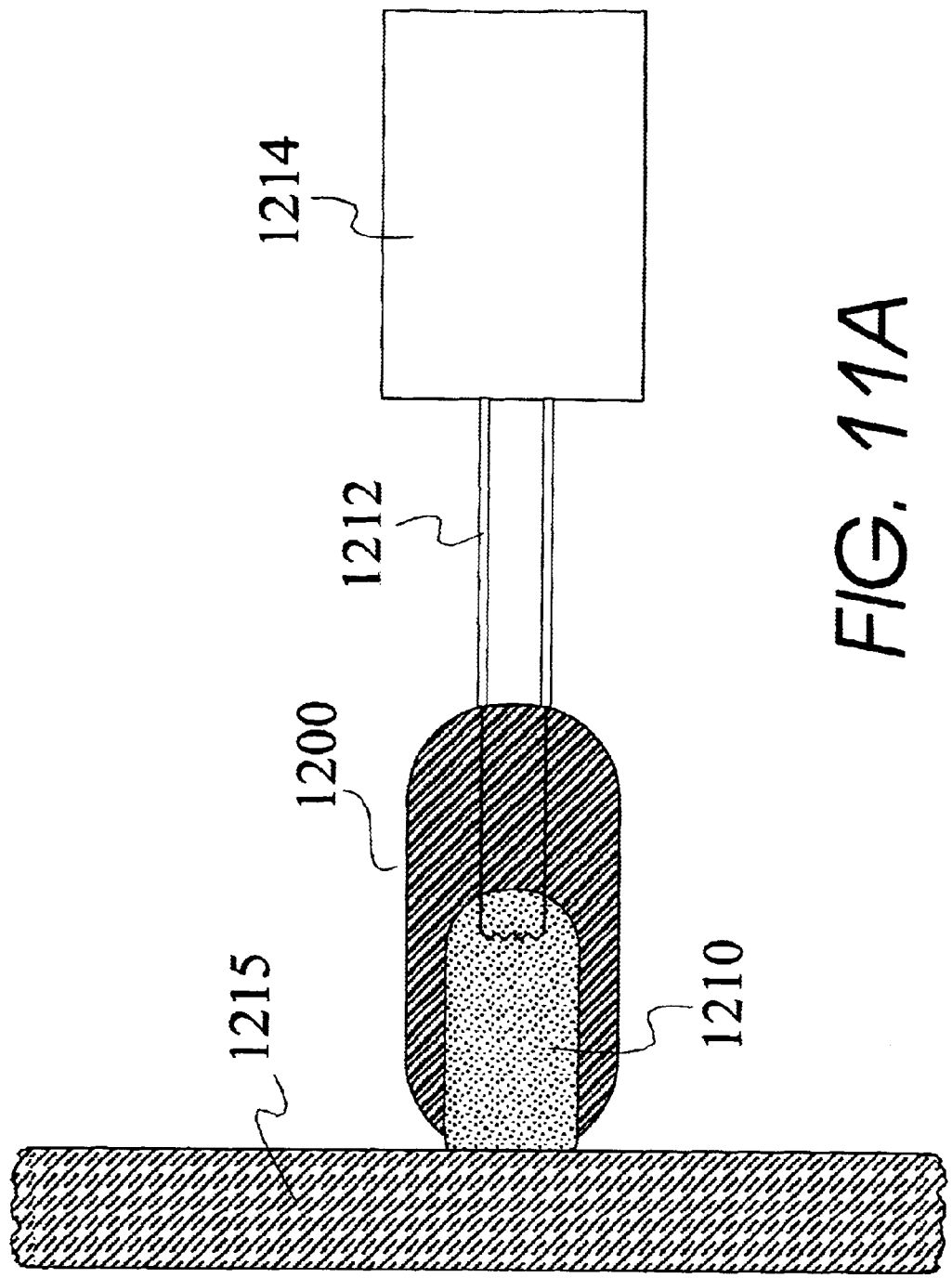

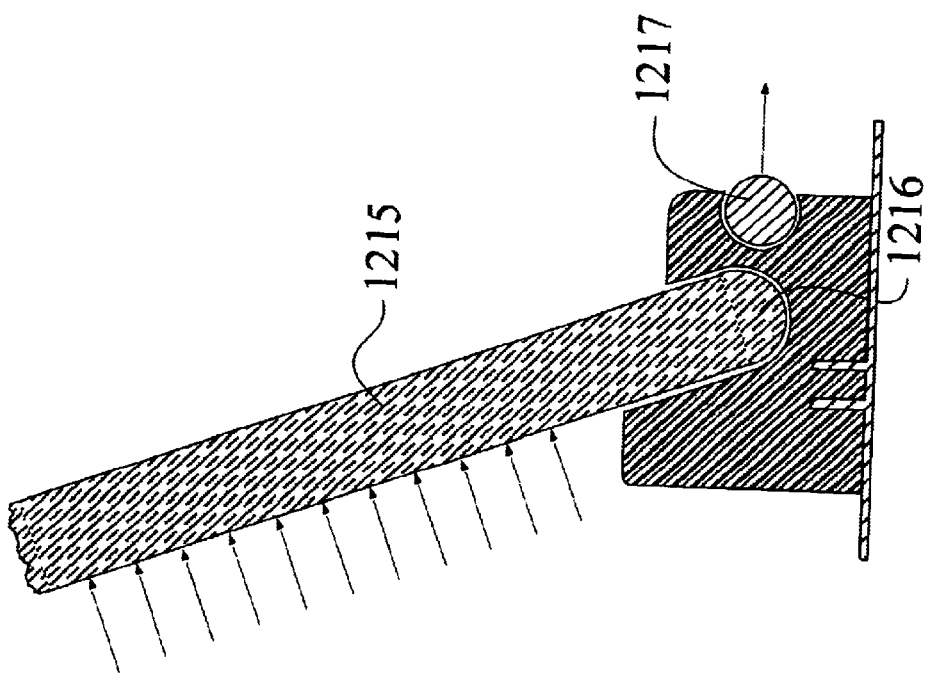

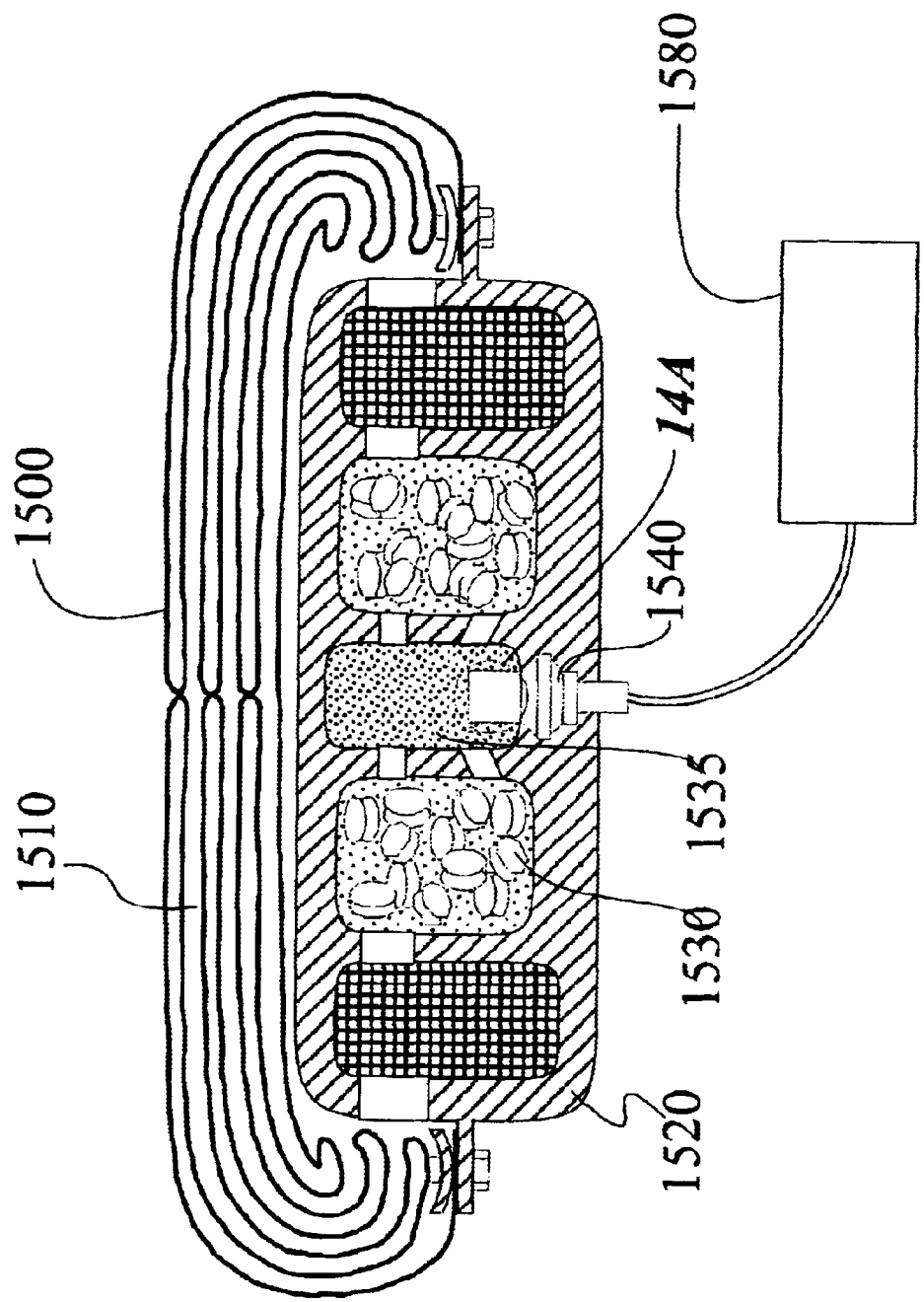

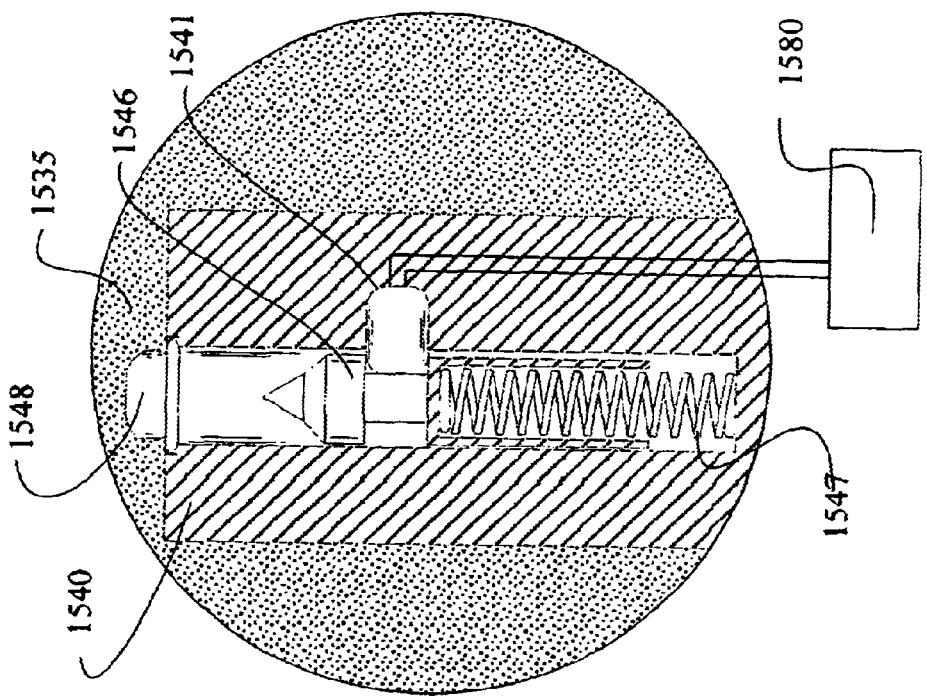
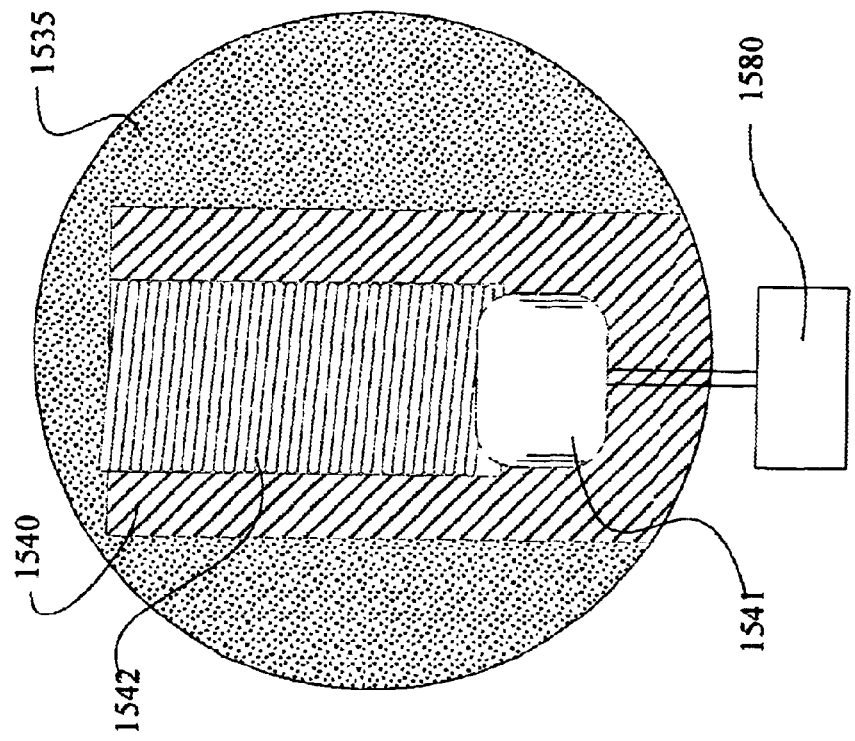
FIG. 14B
FIG. 14A

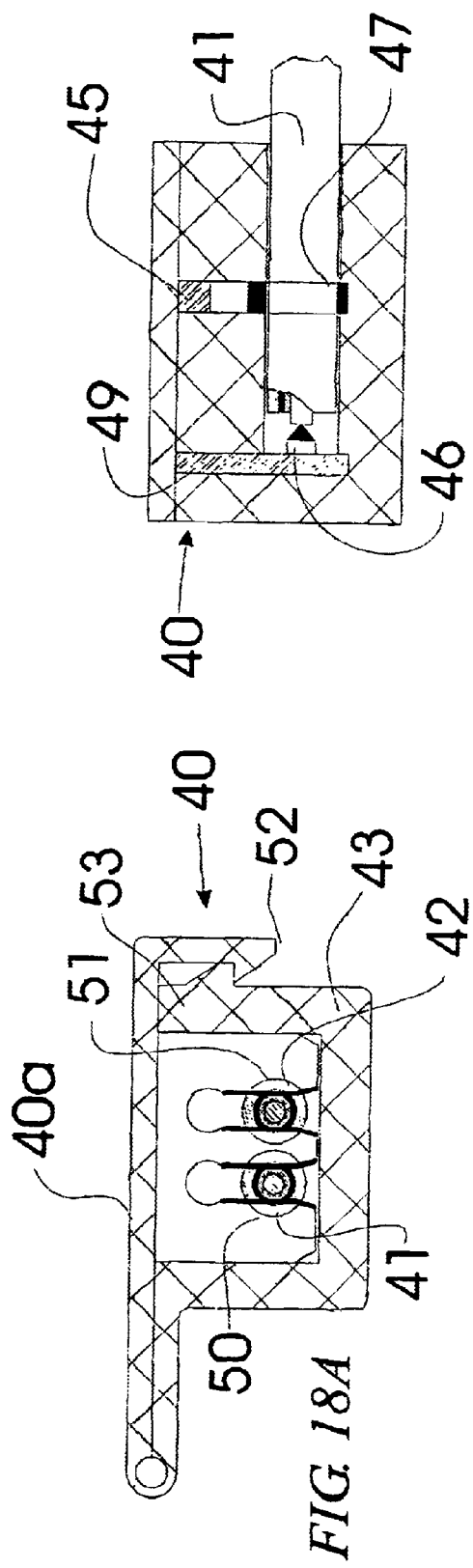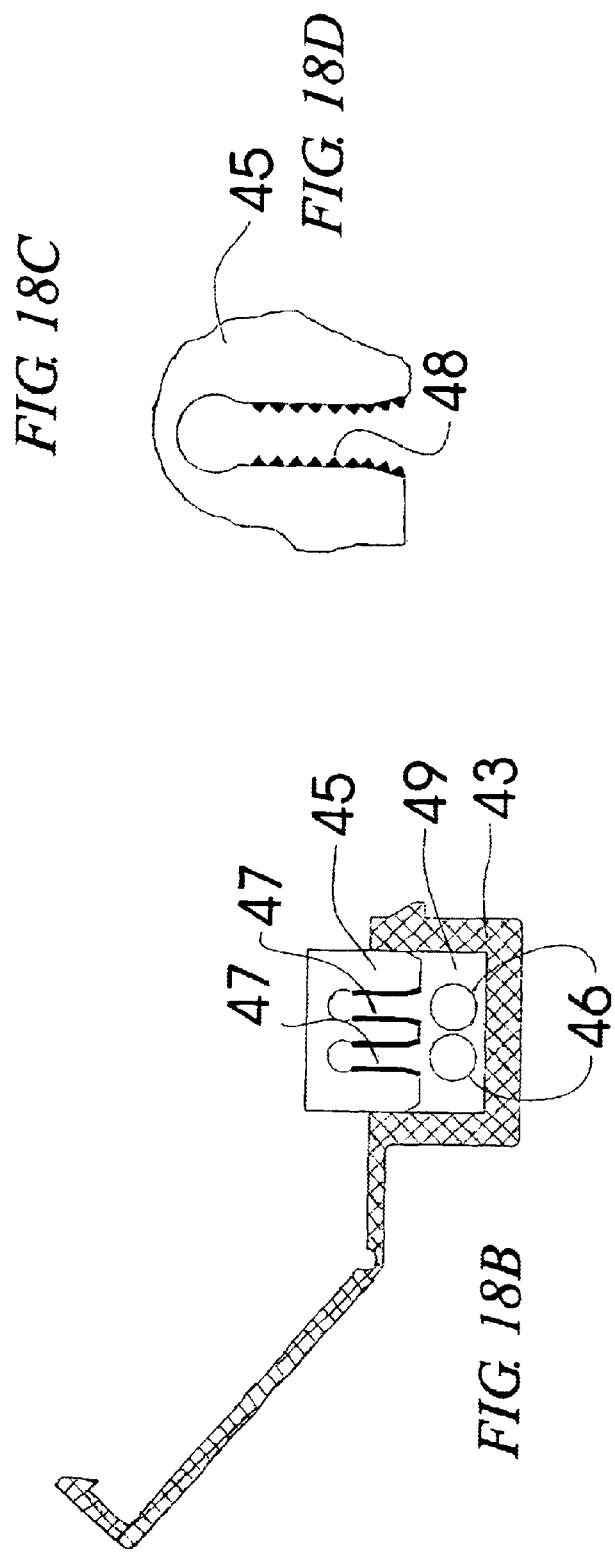

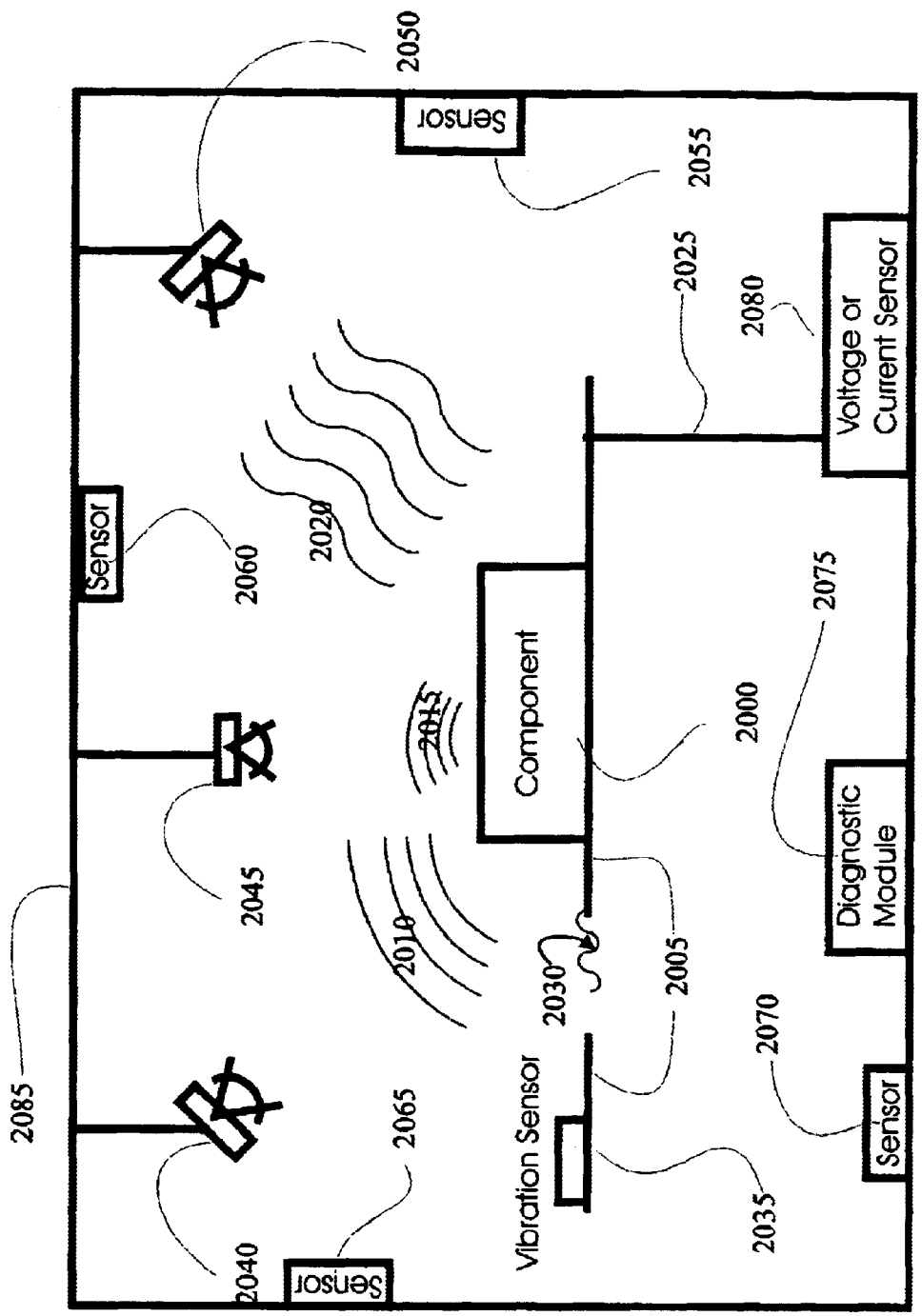

INTEGRATED OCCUPANT PROTECTION SYSTEM

CROSS REFERENCE TO RELATED APPLICATIONS

This application is a continuation-in-part application of U.S. patent application Ser. No. 09/073,403 filed May 6, 1998 now U.S. Pat. No. 6,179,326 which is a continuation-in-part of U.S. patent application Ser. No. 08/571,247 filed Dec. 12, 1995, now U.S. Pat. No. 5,772,238 and which is a continuation-in-part of U.S. patent application Ser. No. 08/550,217 filed Oct. 30, 1995, now abandoned.

This application also is a continuation-in-part of U.S. patent application Ser. No. 09/356,314, filed Jul. 16, 1999, which is a continuation-in-part of U.S. patent application Ser. No. 8/947,661 filed Oct. 9, 1997, now abandoned, and a continuation-in-part of U.S. patent application Ser. No. 09/137,918 filed Aug. 20, 1998 now U.S. Pat. No. 6,175,787, which in turn is a continuation-in-part of U.S. patent application Ser. No. 08/476,077 filed Jun. 7, 1995, now U.S. Pat. No. 5,809,437, which is incorporated herein by reference in its entirety.

This invention also claims domestic priority of U.S. provisional patent application Ser. No. 60/028,046 filed Oct. 10, 1996 through U.S. patent application Ser. No. 08/947,661 filed Oct. 9, 1997.

This application is related to U.S. patent application Ser. No. 08/247,763 entitled "Film Airbags" filed May 23, 1994, now U.S. Pat. No. 5,505,485 and U.S. patent application Ser. No. 08/539,676 entitled "Airbag System With Self Shaping Airbag", filed Oct. 5, 1995, now U.S. Pat. No. 5,653,464, all of which provide pertinent disclosure relative to this specification and are incorporated by reference herein.

This invention is also related to U.S. Pat. No. 5,457,293 by the same inventor entitled "Inertia or Gravity Responsive Tilt Switch", the disclosure of which is hereby incorporated by reference herein.

FIELD OF THE INVENTION

This invention is in the general field of wiring systems applied to vehicles and particularly to motor vehicles such as automobiles. It specifically addresses the use of a common wire bus or data bus for a plurality of sensors and actuators in a motor vehicle and particularly for safety systems including crash, occupant and other sensors, airbag modules and associated electronics.

This invention also relates to the field of inflator devices for inflating airbag occupant restraints mainly for the protection of occupants of automobiles and trucks although it also is applicable to the protection of occupants of other vehicles and for inflating other inflatable objects. In particular, by means of the present invention, a more efficient utilization of the energy in a propellant is attained resulting in the need for a lower amount of propellant than in currently existing inflators, and thus a smaller inflator, to inflate a given size inflatable object. This is accomplished in part through a more efficient aspirating nozzle design and an improved geometry of a gas generator that houses the propellant.

The present invention additionally relates to an airbag system for use in vehicles having multiple airbags where the possibility exists that more than two airbags will be deployed in a given accident resulting in excessive pressure within the passenger compartment of the vehicle, and which optionally utilize the inflator devices described above.

The present invention also relates to airbag systems including inflator devices using wider classes of propellants that produce gases that are toxic to humans if breathed for an extended time period.

The present invention additionally relates to an efficient airbag module whereby much of the electronics which are part of the airbag system are associated with the module including occupant sensing components, the backup power supply and diagnostic circuitry.

BACKGROUND OF THE INVENTION

It is not uncommon for an automotive vehicle today to have many motors, other actuators, lights etc., controlled by one hundred or more switches and fifty or more relays and connected together by almost five hundred meters of wire, and close to one thousand pin connections grouped in various numbers into connectors. It is not surprising therefore that the electrical system in a vehicle is by far the most unreliable system of the vehicle and the probable cause of most warranty repairs.

Unfortunately, the automobile industry is taking a piecemeal approach to solving this problem when a revolutionary approach is called for. Indeed, the current trend in the automotive industry is to group several devices of the vehicle's electrical system together which are located geometrically or physically in the same area of the vehicle and connect them to a zone module which is then connected by communication and power buses to the remainder of the vehicle's electrical system. The resulting hybrid systems still contain substantially the same number and assortment of connectors with only about a 20% reduction in the amount of wire in the vehicle.

Most airbag modules in use today are large, heavy, expensive, and inefficient. As a result, airbags are now primarily only used for protecting the passenger and driver in a frontal impact, although at least three automobile manufacturers currently offer a small airbag providing limited protection in side impacts and some are now offering head protection airbags. The main advantage of airbags over other energy absorbing structures is that they utilize the space between the occupant and vehicle interior surfaces to absorb the kinetic energy of the occupant during a crash, cushioning the impending impact of the occupant with the vehicle interior surfaces. Airbags have been so successful in frontal impacts that it is only a matter of time before they are effectively used for side impact protection in all vehicles, protection for rear seat occupants and in place of current knee bolsters. Substantial improvements, however, must be made in airbags before they assume many of these additional tasks A good place to start describing the problems with current airbags is with a calculation of the amount of energy used in a typical airbag inflator and how much energy is required to inflate an airbag. By one analysis, the chemical propellant in a typical driver's side inflator contains approximately 50,000 foot pounds (68,000 joules) of energy. A calculation made to determine the energy required to inflate a driver's side airbag yields an estimate of about 500 foot pounds (680 joules). A comparison of these numbers shows that approximately 99% of the energy in a chemical propellant is lost, that is, generated but not needed for inflation of the airbag. One reason for this is that there is a mismatch between the output of a burning propellant and the inflation requirements of an airbag. In engineering this is known as an impedance mismatch. Stated simply, propellants naturally produce gases having high temperatures and high pressures and low gas flow rates. Airbags, on the other hand, need gases with low temperatures and low pressures and high gas flow rates.

In view of this impedance mismatch, inflators are, in theory at least, many times larger then they would have to be if the energy of the propellant contained within the inflator were efficiently utilized. Some attempts to partially solve this problem have resulted in a so-called "hybrid" inflator where a stored pressurized gas is heated by a propellant to inflate the airbag. Such systems are considerably more energy efficient; however, they also require a container of high pressure gas and means for monitoring the pressure in that container. Other systems have attempted to use aspiration techniques, but because of the geometry constraints of current car inflator designs and mounting locations, and for other reasons, currently used aspiration systems are only able to draw significantly less than 30% of the gas needed to inflate an airbag from the passenger compartment. Theoretical studies have shown that as much as 90% or more of the gas could be obtained in this manner.

Furthermore, since inflators are large and inefficient, severe restrictions have been placed on the type of propellants that can be used since the combustion products of the propellant must be breathable by automobile occupants. It is of little value to save an occupant from death in an automobile accident only to suffocate him from an excessive amount of carbon dioxide in the air within the passenger compartment after the accident. If inflators operated more efficiently, then alternate, more efficient but slightly toxic propellants could be used. Also, most current inflators are made from propellants, namely sodium azide, which are not totally consumed. Only about 40% of the mass of sodium azide propellants currently being used, for example, enters the airbag as gas. This residual mass is very hot and requires the inflator to be mounted away from combustible materials further adding to the mass and size of the airbag system and restricts the materials that can be used for the inflator.

It is a persistent problem in the art that many people are being seriously injured or even killed today by the airbag itself. This generally happens when an occupant is out-of-position and against an airbag module when the airbag deploys. In order to open the module cover, sometimes called the deployment door, substantial pressure must first build up in the airbag before enough force is generated to burst open the cover. This pressure is even greater if the occupant is in a position that prevents the door from opening. As a result, work is underway to substantially reduce the amount of energy required to open the deployment doors and devices have been developed which pop off the deployment door or else cut the deployment door material using pyrotechnics, for example.

One reason that this is such a significant problem is that the airbag module itself is quite large and, in particular, the airbags are made out of thick, heavy material and packaged in a poor, folded geometry. The airbag, for example, which protects the passenger is housed in a module which is typically about one third as long as the deployed airbag. All of this heavy airbag material must be rolled and folded inside this comparatively small module, thus requiring substantial energy to unfold during deployment. This situation could be substantially improved if the airbag module were to have an alternate geometry and if the airbag material were substantially lighter and thinner and, therefore, less massive and folded mainly parallel to the inflator. Even the time to deploy the airbag is substantially affected by the mass of the airbag material and the need to unfold an airbag with a complicated folding pattern. Parallel folding, as used herein, means that the airbag material is folded with the fold lines substantially parallel to the axis of the inflator without being folded over lengthwise as is now done with conventional airbag folding patterns.

Devices are now being offered on vehicles that will monitor the position of the occupant and prevent the airbag from deploying if the occupant is dangerously close to the module where he or she can be seriously injured by the deployment. Some systems will also prevent deployment if the seat in connection with which the airbag operates is unoccupied. An alternate approach is to move the deployment doors to a location away from normal occupant positions. One such location is the ceiling of the vehicle. One problem with ceiling mounted airbags is that the distance required for the airbag to travel, in some cases, is longer and therefore a larger airbag is needed with greater deployment time. With the use of light airbag materials, such as thin plastic film, as disclosed in the above-referenced U.S. Pat. Nos. 5,505,485 and 5,653,464, and the use of more efficient inflators, both of these problems can be solved especially for the front and rear seat passengers. The driver poses a different problem since it would be difficult to position a ceiling mounted airbag module where the airbag would always be projected properly between the occupant and the steering wheel. On the other hand, the driver can usually ride down on the steering wheel if he or she is initially positioned close to it.

This problem for the driver's airbag system is not the concept of mounting the airbag on the ceiling, but the design of the steering wheel and steering column. These designs come from the time when the only way of steering an automobile was through mechanical linkages. The majority of vehicles manufactured today have power assisted steering systems and, in fact, most drivers would have difficulty steering a car today if the power steering failed. If servo power steering were used, the need for a mechanical linkage between a steering wheel, or other such device, and the power steering system would no longer be necessary. Servo power steering for the purposes here will mean those cases where the linkage between the manually operated steering device, which regardless of what that device is, will herein be called a steering wheel, is done with a servo system either electrically or hydraulically and the system does not have an operative mechanical connection between the steering wheel and the steering mechanism which moves the wheels.

The problem of educating the general population, which has become secure in the feeling of a steering wheel and steering column, might be insurmountable if it were not for the substantial safety advantage resulting from substituting servo power steering for conventional steering systems and using a non-steering wheel mounted airbag module for the driver.

The steering wheel and steering column are among the most dangerous parts of the vehicle to the occupant. Small people, for example, who are wearing seatbelts can still be seriously injured or killed in accidents as their faces slam into the steering wheel hubs. The problem of properly positioning an airbag, when the comfort and convenience features of telescoping and tilting steering columns are considered, results in substantial safety compromises. Deployment induced injuries which result when a small person is close to the steering wheel when the airbag deploys have already caused several deaths and numerous serious injuries. Future vehicles, therefore, for safety reasons should be constructed without the massive steering wheel and steering column and substitute therefor a servo steering assembly. With this modification, a ceiling mounted airbag module, such as discussed herein, becomes feasible for the driver as well as the other seating positions in the vehicle.

The front seat of the vehicle today has an airbag for the passenger and another for the driver. In some accidents, an occupant, and particularly a center-seated occupant, can pass between the two airbags and not receive the full protection from either one. If a ceiling mounted airbag system were used, a single airbag could be deployed to cover the entire front seat greatly simplifying the airbag system design.

One method of partially solving many of these problems is to use an efficient aspirated airbag system. There have been numerous patents granted on designs for airbag systems using aspirated inflators. In these patents as well as in the discussion herein the term "pumping ratio" is used. The pumping ratio as used in the art is defined as the ratio of the mass of gas aspirated from the environment, either from inside or outside of the vehicle, to the mass of gas generated by burning the propellant. A brief description of several pertinent aspiration patents, all of which are included herein by reference, follows:

U.S. Pat. No. 2,052,869 to Coanda illustrates the manner in which a fluid jet is caused to change direction, although no mention is made of its use in airbags. This principle, the "Coanda effect", is used in some implementations of the instant invention as well as in U.S. Pat. No. 3,909,037 to Stewart discussed below. Its primary contribution is that when used in inflator designs, it permits a reduction in the length of the nozzle required to efficiently aspirate air into the airbag. No disclosure is made of a pumping ratio in this system and in fact it is not an object of Coanda to aspirate fluid.

U.S. Pat. No. 3,204,862 to Hadeler also predates the invention of vehicular airbags but is nonetheless a good example of the use of aspiration to inflate an inflatable structure. In this device, an inflating gas is injected into an annular converging-diverging nozzle and some space efficiency is obtained by locating the nozzle so that the flow is parallel to the wall of the inflatable structure. No mention is made of a pumping ratio of this device and furthermore, this device is circular.

U.S. Pat. No. 3,632,133 to Hass provides a good example of a nozzle in a circular module with a high pumping ratio in an early construction of an airbag. Although analysis indicates that pumping ratios of 4:1 or 5:1 would be difficult to achieve with this design as illustrated, nevertheless, this reference illustrates the size and rough shape of an aspirating system which is required to obtain high pumping ratios using the prior art designs.

U.S. Pat. No. 3,909,037 to Stewart provides a good example of the application of the Coanda effect to airbag aspirating inflators. Stewart, nevertheless, still discards most of the energy in the propellant which is absorbed as heat in the inflator mechanism. Most propellants considered for airbag applications burn at pressures in excess of about 1000 psig. Stewart discloses that the maximum efficiency corresponding to a 5:1 pumping ratio occurs at inflator gas pressures of about 5 to about 45 psig. In order to reduce the pressure, Stewart utilizes a complicated filtering system similar to that used in conventional inflators. Stewart requires the use of valves to close off the aspiration ports when the system is not aspirating. Through the use of the Coanda effect, Stewart alludes to a substantial reduction in the size of the aspiration system, compared to Hass for example. Also, Stewart shows only a simple converging nozzle through which the burning propellant is passed.

U.S. Pat. No. 4,833,996 to Hayashi et al. describes a gas generating apparatus for inflating an airbag which is circular and allegedly provides an instantaneous pumping ratio of up to 7:1 although analysis shows that this is unlikely in the illustrated geometry. The average pumping ratio is specified to be up to 4:1. This invention is designed for the driver side of the vehicle where unrestricted access to the aspirating port might be difficult to achieve when mounted on a steering wheel. The propellant of choice in Hayashi et al. is sodium azide which requires extensive filtering to remove particulates. No attempt has been made in this design to optimize the nozzle geometry to make use of a converging-diverging nozzle design, for example. Also, the inflator has a roughly conventional driver side shape. It is also interesting to note that no mention is made of valves to close off or restrict flow through the aspiration port during deflation. Since most aspiration designs having even substantially smaller pumping ratios provide for such valves, the elimination of these valves would be a significant advance in the art. Analysis shows, however, that the opening needed for the claimed aspiration ratios would in general be far too large for it also to be used for exhausting the airbag during a crash. Since this is not discussed, it should be assumed that valves are required but not illustrated in the figures.

U.S. Pat. No. 4,877,264 to Cuevas describes an aspirating/venting airbag module assembly which includes a circular gas generator and contemplates the use of conventional sodium azide propellants or equivalent. The aspiration or pumping ratio of this inflator is approximately 0.2:1, substantially below that of Hayashi et al., but more in line with aspiration systems in common use today. This design also does not require use of aspiration valves which is more reasonable for this case, but still unlikely, since the aspiration port area is much smaller. Again, no attempt has been made to optimize the nozzle design as is evident by the short nozzle length and the low pumping ratio.

U.S. Pat. No. 4,909,549 to Poole et al. describes a process for inflating an airbag with an aspiration system but does not discuss the aspiration design or mechanism and merely asserts that a ratio as high as 4:1 is possible but assumes that 2.5:1 is available. This patent is significant in that it discloses the idea that if such high pumping ratios are obtainable (i.e., 2.5:1 compared with 0.2:1 for inflators in use), then certain propellants, which would otherwise be unacceptable due to their production of toxic chemicals, can be used. For example, the patent discloses the use of tetrazol compounds. It is interesting to note that there as yet is no commercialization of the Poole et al. invention which raises the question as to whether such high aspiration ratios are in fact achievable with any of the prior art designs. Analysis has shown that this is the case, that is, that such large aspiration ratios are not achievable with the prior art designs.

U.S. Pat. No. 4,928,991 to Thorn describes an aspirating inflator assembly including aspiration valves which are generally needed in all high pumping ratio aspiration systems. Sodium azide is the propellant used. Pumping ratios of 1:1 to 1.5:1 are mentioned in this patent which by analysis is possible. It is noteworthy that the preamble of this patent discloses that the state of the art of aspirating inflators yields pumping ratios of 0.1:1 to 0.5:1, far below those specified in several of the above referenced earlier patents. Once again, little attempt has been made to optimize the nozzle design.

U.S. Pat. No. 5,004,586 to Hayashi et al. describes a sodium azide driver side inflator in which the aspirating air flows through a series of annular slots on the circumference of the circular inflator in contrast to the earlier Hayashi et al. patent where the flow was on the axis. Similar pumping ratios of about 4:1 are claimed however, which by analysis is unlikely. Once again, aspiration valves are not shown and the reason that they can be neglected is not discussed. An inefficient nozzle design is again illustrated. The lack of commercial success of these two Hayashi patents is probably due to the fact that such high pumping ratios as claimed are not in fact achievable in the geometries illustrated.

U.S. Pat. No. 5,060,973 to Giovanetti describes the first liquid propellant airbag gas generator wherein the propellant burns clean and does not require filters to trap solid particles. Thus, it is one preferred propellant for use in the instant invention. This system however produces a gas which is too hot for use directly to inflate an airbag. The gas also contains substantial quantities of steam as well as carbon dioxide. The steam can cause burns to occupants and carbon dioxide in significant quantities is toxic. The gas generator is also circular. Aspirating systems are therefore required when using the liquid propellant disclosed in this patent, or alternately, the gas generated must be exhausted outside of the vehicle.

U.S. Pat. No. 5,129,674 to Levosinski describes a converging-diverging nozzle design which provides for more efficient aspiration than some of the above discussed patents. Nevertheless, the airbag system disclosed is quite large and limited in length such that the flow passageways are quite large which requires a long nozzle design for efficient operation. Since there is insufficient space for a long nozzle, it can be estimated that this system has a pumping ratio less than 1:1 and probably less than 0.2:1. Once again a sodium azide based propellant is used.

U.S. Pat. No. 5,207,450 to Pack, Jr. et al. describes an aspirated air cushion restraint system in which no attempt was made to optimize the nozzle design for this sodium azide driver side airbag. Also, aspiration valves are used although it is suggested that the exhaust from the airbag can be made through the aspirating holes thereby eliminating the need for the flapper valves. No analysis, however, is provided to prove that the area of the aspiration holes is comparable to the area of the exhaust holes normally provided in the airbag. Although no mention is made of the pumping ratio of this design, the device as illustrated appears to be approximately the same size as a conventional driver side inflator. This, coupled with an analysis of the geometry, indicates a pumping ratio of less than 1:1 and probably less than 0.2:1. The statement that the aspiration valves are not needed also indicates that the aspiration ratio must be small. Large inlet ports which are needed for large aspiration ratios are generally much larger than the typical airbag exhaust ports.

U.S. Pat. No. 5,286,054 to Cuevas describes an aspirating/ venting motor vehicle passenger airbag module in which the principal of operation is similar to the '264 patent discussed above. Once again the aspiration pumping ratio of this device is 0.15:1 to 0.2:1 which is in line with conventional aspirated inflators. It is interesting to note that this pioneer in the field does not avail himself of designs purporting to yield higher pumping ratios. Again the nozzle design has not been optimized.

Other U.S. patents which are relevant to the instant invention but which will not be discussed in detail are: U.S. Pat. Nos. 3,158,314 to Young et al., 3,370,784 to Day, 5,085,465 to Hieahim, 5,100,172 to Van Voorhies et al., 5,193,847 to Nakayama, 5,332,259 to Conlee et al. and 5,423,571 to Hawthorn.

None of the prior art inflators contain the advantages of the combination of (i) a linear inflator having a small cross section thereby permitting an efficient nozzle design wherein the length of the nozzle is much greater than the aspiration port opening, (ii) a non sodium azide propellant which may produce toxic gas if not diluted with substantial quantities of ambient air, and (iii) an inflator where minimal or no filtering or heat absorption is required.

It is interesting to note that in spite of the large aspiration pumping ratios mentioned and even claimed in the prior art references mentioned above, and to the very significant advantages which would result if such ratios could be achieved, none has been successfully adapted to an automobile airbag system. One reason is that pumping ratios which are achievable in a steady state laboratory environment are more difficult to achieve in the transient conditions of an actual airbag deployment.

None of these prior art designs have resulted in a thin linear module which permits the space necessary for an efficient nozzle design as disclosed herein. In spite of the many advantages claimed in the prior art patents, none have resulted in a module which can be mounted within the vehicle headliner trim, for example, or can be made to conform to a curved surface. In fact, the rigid shape of conventional airbag modules has forced the vehicle interior designers to compromise their designs since the surface of such modules must be a substantially flat plane.

With respect to airbag systems including a plurality of inflatable airbags or unconventionally large airbags and inflators therefor, automobile manufacturers are now installing more than two airbags into a vehicle. The placement of both side and rear seat airbags have in fact taken place by at least one manufacturer each; Nissan for rear airbags and Volvo, General Motors and Ford for side airbags. However, Nissan has stated that it cannot provide more than a total of two airbags in the vehicle and that it will not offer a front passenger side airbag for those vehicles that have a rear seat airbag. With respect to the Volvo, General Motors and Ford airbags, these side airbags will not deploy when the frontal airbags do because if more than two airbags would be deployed in a vehicle at the same time, the pressure generated by the deploying airbags within the passenger compartment of the vehicle creates large forces on the doors. These forces may be sufficient to force the doors open and consequently, if the doors of the vehicle are forced open during a crash, vehicle occupants might be ejected, greatly increasing the likelihood of serious injury. In addition, the pressure generated within the passenger compartment creates excessive noise which can injure human beings.

In addition to airbags for side impacts and rear seats, it is likely that airbags will be used as knee bolsters since automobile manufacturers are having serious problems protecting knees from injury in crashes while providing the comfort space desired by their customers.

As soon as three or more airbags are deployed in an accident, provisions should be made to open a hole in the vehicle to permit the pressure generated by the deploying airbags to escape. What has not heretofore been appreciated, however, is that once there is a significant opening from the vehicle to the outside, the requirements for the composition of the inflator gases used to inflate the airbags change and inflators which generate a significant amount of toxic gas become feasible, as will be discussed below.

The primary gas generating propellant used in airbag systems today is sodium azide. This is partially due to the fact that when sodium azide burns, in the presence of an oxidizer, it produces large amounts of Nitrogen gas. It also produces sodium oxide which must be retained in the inflator since sodium oxide, when mixed with moisture, becomes lye and is very toxic to humans. Thus, current inflators emit only nitrogen gas into the passenger compartment which occupants can breath for a long period of time in a closed passenger compartment without danger. The sodium azide inflators also are large to accommodate the fact that about 60% of the gas generating material remains in the inflator with only about 40% emerging as gas.

Other propellants, including nitrocellulose, nitroguanidine, and other double base and triple base formulations as well as a large number of liquid propellants, exist which could be used to inflate airbags. However, they usually produce various quantities of gases containing compounds of nitrogen and oxygen plus significant amounts of carbon dioxide. In many cases, the gases produced by these other propellants are only toxic to humans if breathed over an extended period of time. If the toxic gas were removed from the vehicle within a few minutes after the accident, then many of these propellants could be used to inflate airbags.

Much of the energy released when sodium azide burns in the inflator is removed from the gas by the cooling and filtering screens. In some designs, the sodium oxide must be trapped by the filters which requires that the gas be cooled to the point where sodium oxide condenses. In all designs, the gas is cooled so that the temperature of the gas in the airbag will not cause burns to the occupants. It is believed that in all current designs, a substantial amount of the energy in a propellant is lost through this cooling process which in turn necessitates that the inflator contain more propellant.

Airbag systems have primarily been installed within the instrument panel or steering wheel of automobiles. As a result, although numerous attempts have been made to create aspirated inflator systems, they have only been used on the passenger side and their efficiency has been low. In aspirated inflator systems, part of the gas to inflate the airbag is drawn in from the passenger compartment. However, in a typical passenger side airbag system in use today where aspiration is employed, substantially less than about 30% of the gas which inflates the airbag comes from the passenger compartment and some researchers state that it is even below about 5%. In view of the large size of conventional sodium azide inflators and woven airbags, there is limited room for the airbag system and it is difficult to design aspirating systems which will fit within the remaining available space. One reason is the resistance of the air flow through the instrument panel into the aspirator. Another reason for the low efficiency of aspirated inflator systems is that the aspirated systems used today have inefficient nozzle designs. Theoretical studies of aspiration systems, such as described herein, show that the percentage of gas drawn in from the passenger compartment could be raised to as high as about 75% or even 90%.

One airbag aspiration method is described in U.S. Pat. No. 4,909,549 to Poole et al. Poole et al. describes a method for inflating an airbag in which a substantially non-toxic primary gas mixture is diluted with outside air by passing the primary gas mixture through a venturi to aspirate the air. Poole et al. does not suggest that the outside air should come from the passenger compartment and therefore does not provide a solution to the problem of excessive pressure being generated in the passenger compartment upon deployment of multiple airbags, as discussed above.

If alternate, more efficient propellants are used and if the gas produced thereby is exhausted at a much higher temperature, more of the energy would be available to heat the gas which is flowing from the passenger compartment to the airbag thus further increasing the efficiency of the system and reducing the amount of propellant required. Since cooling screens are not necessary and since the efficiency of the propellant is high, the inflator can be made very small providing the extra space needed to design efficient aspirating nozzles.

Since many alternate propellants produce toxic gases, their use becomes practical (i) if the quantity used is substantially reduced, (ii) if means are provided to prevent the gas from entering the occupant compartment, or (iii) if means exist within the vehicle to exhaust the toxic gas from the vehicle shortly after the airbag is deployed.

Finally, today the airbag electronics are housed separate and apart from the airbag module and the energy needed to initiate the inflator is transmitted to the airbag module after the crash sensor has determined that the airbag deployment is required. This has resulted in many failures of the airbag system due to shorted wires and other related causes. This and other problems could be solved if the crash sensor electronics send a coded signal to the airbag module and the electronics associated with the module decoded the signal to initiate the inflator. The diagnostics circuitry can then also be part of or associated with the module along with the backup power supply which now also becomes the primary power supply for the module.

These and other problems of current airbag systems are solved by the invention disclosed herein and described in detail below.

Preferred embodiments of the invention are described below and unless specifically noted, it is the applicant's intention that the words and phrases in the specification and claims be given the ordinary and accustomed meaning to those of ordinary skill in the applicable art(s). If applicant intends any other meaning, he will specifically state they are applying a special meaning to a word or phrase.

Likewise, applicant's use of the word "function" here is not intended to indicate that the applicant seeks to invoke the special provisions of 35 U.S.C. §112, sixth paragraph, to define their invention. To the contrary, if applicant wishes to invoke the provisions of 35 U.S.C. §112, sixth paragraph, to define their invention, he will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims his inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

OBJECTS AND SUMMARY OF THE INVENTION

Accordingly, it is an object of the present invention to provide a new and improved electrical wiring system for coupling sensors and actuators in a motor vehicle in order to reduce the amount of wire in the motor vehicle and improve system reliability.

It is a particular object of this invention to provide a vehicle safety wiring system including a network comprising various safety devices such as crash sensors and airbag inflator igniters.

It is a further object of the present invention to provide a new and improved airbag module in which the disadvantages and problems in the prior art airbag module designs are substantially eliminated.

It is another object of the present invention to provide a new and improved airbag module in which the propellant is utilized more efficiently than in prior art constructions, i.e., more of the energy generated by the burning propellant is used to inflate the airbag with less waste of generated energy.

It is yet another object of the present invention to provide a new and improved airbag module in which the propellant is utilized more efficiently than in prior art constructions so that a smaller amount of propellant can be used thereby enabling a wider variety of propellants, which may generate toxic gases, to be used since only small quantities of such toxic gases will be generated.

It is still another object of the present invention to provide a new and improved airbag module which is designed so that if an occupant is out-of-position and leaning against the module, the module will still enable deployment of the airbag to protect the occupant.

It is another object of the present invention to provide a new and improved airbag module in which a more efficient aspirating system is used, i.e., one having a larger pumping ratio.

It is yet another object of the present invention to associate much of the airbag electronics with the airbag module so as to improve the reliability of the system.

It is a further object of the present invention to permit the deployment of both the frontal and side airbags during a primarily frontal crash to reduce the probability of injury to the occupants through impacts with the passenger compartment.

Other principle objects and advantages of this invention are:

1. To provide a long, thin airbag module which can be conveniently mounted on the ceiling or almost any other surface of the vehicle for the protection of vehicle occupants in frontal collisions.
2. To provide a highly efficient airbag module which uses the minimum amount of propellant.
3. To provide a rapidly deploying airbag module causing minimal injury to out-of-position occupants.
4. To provide an airbag module where a single module can be used to protect both a front and a rear passenger of the vehicle in side impacts.
5. To provide a cover system for the module which is easily released thereby reducing the risk of deployment induced injuries to the vehicle occupants.
6. To provide an airbag module which can be conveniently mounted on the instrument panel, or knee bolster support structure, to provide knee and leg protection for the vehicle occupant as well as for an occupant, such as a child, lying on the seat.
7. To provide a driver protection airbag system for use with vehicles having servo power steering and thereby promote the elimination of the massive steering column and steering wheel.
8. To provide an airbag module which is displaced from its mounting surface during the initial stage of airbag deployment to thereby opening aspirating channels.
9. To provide a highly efficient aspirated airbag module.
10. To provide a long thin airbag module where the module is approximately the same length as the inflated airbag thereby simplifying the folding, and unfolding during deployment, of the airbag and permit more rapid airbag deployment.
11. To provide an airbag module which is easily replaced when the vehicle is repaired after an accident.
12. To provide a ceiling mounted airbag module for protection of rear seated occupants.
13. To provide an aspirated airbag system where the aspiration inlet ports are also used as the venting ports for the airbag, including an automatic adjustment system to reduce the vent area, thereby simplifying the airbag design by removing the requirement for vents within the airbag material.
14. To provide an inflator design wherein the propellant is a single solid material attached to the inside of the inflator housing thereby simplifying the inflator design and providing a definable burning surface.
15. To provide a method of ignition of a propellant through a coating placed on the surface of a propellant containing an igniter material such as $BKNO_3$.
16. To provide a thin airbag module which can be mounted substantially on a surface of the passenger compartment such as the ceiling, instrument panel, or seat back without penetrating deeply within the surface.
17. To provide for a thin airbag module which can be made to conform to a curved surface.
18. To provide an inflator design wherein the propellant is a liquid substantially filling the inside of the inflator housing thereby simplifying the inflator design and providing a definable burning surface.
19. To provide new and improved methods and apparatus which permit the use of propellants in inflators for airbag system which otherwise would not be usable due to their toxicity.
20. To provide an airbag system where multiple airbags are deployed in a vehicle and where the gas used to inflate the airbags is toxic to humans but is removed from the passenger compartment before it causes injury to the occupants, thereby permitting the use of heretofore unusable toxic propellants.
21. To provide a system to relieve the excess pressure generated by the deployment of multiple airbags thereby preventing the doors from being inadvertently opened by this excess pressure.
22. In particular, to provide a method of breaking a window in the vehicle to relieve the excess pressure and create a path for toxic gases and excess pressure to escape.
23. To provide a system which only deploys those airbags in the vehicle which are likely to help prevent occupants from being injured, thereby minimizing the total number of airbags deployed during a crash.
24. To provide an airbag deployment delay system within one or more of the airbag modules in order to reduce the peak pressure and noise within the vehicle.
25. To permit the use of large knee protection airbags which helps reduce injuries to an occupant who is lying on a seat during an accident.
28. To provide protection for an occupant from the impact with various vehicle roof support pillars in the event of a frontal angular impact, or other impact, by providing side protection airbags which are deployed along with the frontal impact protection airbags through a method of relieving the excess pressure caused by the deployment of multiple airbags.
27. To provide a system which permits more than two airbags to be deployed during a single crash event.

Sometimes, when a component fails, a catastrophic accident results. In the Firestone tire case, for example, over 100 people were killed when a tire of a Ford Explorer blew out which caused the Ford Explorer to rollover. Similarly, other component failures can lead to loss of control of the vehicle and a subsequent accident. It is thus very important to accurately forecast that such an event will take place but furthermore, for those cases where the event takes place suddenly without warning, it is also important to diagnose the state of the entire vehicle, which in some cases can lead to automatic corrective action to prevent unstable vehicle motion or rollovers resulting in an accident. Finally, an accurate diagnostic system for the entire vehicle can determine much more accurately the severity of an automobile crash once it has begun by knowing where the accident is taking place on the vehicle (e.g., the part of or location on the vehicle which is being impacted by an object) and what is colliding with the vehicle based on a knowledge of the force deflection characteristics of the vehicle at that location. Therefore, in addition to a component diagnostic, the teachings of this invention also provide a diagnostic system for the entire vehicle prior to and during accidents. In particular, this invention is concerned with the simultaneous monitoring of multiple sensors on the vehicle so that the best possible determination of the state of the vehicle can be determined. Current crash sensors operate independently or at most one sensor may influence the threshold at which another sensor triggers a deployable restraint. In the teachings of this invention, two or more sensors, frequently accelerometers and/or gyroscopes, can be monitored simultaneously and the combination of the outputs of these multiple sensors are combined continuously in making the crash severity analysis. Also, according to the teachings of this invention, all such devices can communicate on a single safety bus that connects the various safety related electronics, sensors and actuators such as airbag modules, seatbelt retractors, and vehicle control systems.

In order to achieve one or more of the objects above, an occupant protection system for protecting one or more occupants of the vehicle includes a deployable occupant protection device arranged on at least one of the seats, deployment determining means for generating a signal indicative of whether deployment of the occupant protection device is desired, and an electrical bus extending into the seat and electrically coupling the occupant protection device and the deployment determining means. The signal from the deployment determining means is sent over the bus to the occupant protection device to enable deployment of the occupant protection device. The occupant protection device may include an airbag module having an airbag and be arranged at a rear of the seat to be deployable rearward for protecting an occupant situated behind the seat. The deployment determining means may comprise any type of crash sensor for sensing a crash event and providing a signal indicative thereof. When the occupant protection device is arranged in a housing, the crash sensor may be arranged separate and at a location apart from the housing. A sensor and diagnostic module is coupled to the bus for monitoring the occupant protection device. When the occupant protection device is resident in a module housing and includes at least one airbag and an inflator for inflating the airbag(s), an electronic control module, package or unit is usually arranged within, adjacent or proximate the housing and coupled to the inflator and via the bus to the deployment determining means. The control module initiates inflation of the airbag(s) by the inflator upon receiving a coded signal from the deployment determining means. An occupant position sensor can be arranged to detect the position of the occupant to be protected by the occupant protection device, in which case, the control module optimally initiates inflation of the airbag(s) by the inflator in consideration of the detected position of the occupant.

The occupant protection device may reside in a module housing along with a power supply for supplying power to initiate deployment of the occupant protection device. A monitoring component or system is also preferably arranged in the housing for monitoring energy stored in the power supply.

Another occupant protection system for protecting one or more occupants in accordance with the invention comprises a deployable occupant protection device arranged in connection with at least one of the seats, a crash sensor for generating a signal indicative of whether deployment of the occupant protection device is desired, and an electrical bus located at least partially within the seat and electrically coupling the occupant protection device and the crash sensor. The signal from the crash sensor is sent over the bus to the occupant protection device to enable deployment of the occupant protection device. The form, content and structure of the occupant protection device may be as discussed above, and the occupant protection system may include the optional modifications discussed above.

A method for controlling deployment of an occupant protection system for protecting one or more occupants in a vehicle comprises the steps of arranging a deployable occupant protection device on at least one of the seats, generating a signal indicative of whether deployment of the occupant protection device is desired by means of a crash sensor, electrically coupling the occupant protection device and the crash sensor by means of an electrical bus extending at least partially into the seat, and directing the signal from the crash sensor over the bus to the occupant protection device to enable deployment of the occupant protection device. The form, content and structure of the occupant protection device may be as discussed above, and method for controlling the occupant protection system may include the optional modifications discussed above, e.g., the feature of sensing the position of the occupant and controlling deployment based thereon.

In order to achieve one or more of the objects set forth above, an airbag deployment system for a vehicle in accordance with the invention comprises a module housing, an airbag associated with the housing, an inflator or inflator assembly arranged in the housing for inflating the airbag, and inflation determining means for generating a signal indicative of whether deployment of the airbag is desired. The inflation determining means preferably comprise one or more crash sensors, at least one of which is arranged separate and at a location apart from the housing. An electronic controller is arranged in or adjacent the housing and coupled to the inflation determining means. The controller controls inflation of the airbag by the inflator assembly in response to the signal generated by the inflation determining means. An electrical bus electrically couples the controller and the inflation determining means whereby the signal from the inflation determining means is sent over the bus to the controller to enable inflation of the airbag. The bus may consists of a single pair of wires over which power and information is conveyed. A sensor and diagnostic module is also coupled to the bus for monitoring the controller. The inflation determining means, e.g., crash sensor, is designed to preferably generate a coded signal when deployment of the airbag is desired which coded signal is conveyed over the bus to the controller to enable the controller to control inflation of the airbag by the inflator assembly based thereon. The controller will preferably include a power supply for enabling initiation of the inflator assembly. An occupant position sensor, e.g., an ultrasonic transmitter/receiver pair, may be arranged to detect the position of the occupant to be protected by the airbag in which case, the controller would control inflation of the airbag by the inflator assembly in consideration of the detected position of the occupant. The occupant position sensor may be arranged in the same housing as the inflator assembly, airbag and controller.

An embodiment of an occupant protection system in accordance with the invention comprises a plurality of occupant protection devices, each comprising a housing and a component deployable to provide protection for the occupant (such as an airbag), and deployment determining means for generating a signal indicating for which of the deployable components deployment is desired, e.g., one or more crash sensors which may be located around the vehicle and preferably separate and at locations apart from the same housings as the deployable components. An electronic controller is arranged in, proximate or adjacent each housing and coupled to the deployment determining means. Each controller controls deployment of the deployable component of the respective occupant protection device in response to the signal generated by the deployment determining means. An electrical bus electrically couples the controllers and deployment determining means so that the signal from the deployment determining means is sent over the bus to the controllers to enable deployment of the deployable components. A sensor and diagnostic module may be coupled to the bus for monitoring the controllers. The deployment determining means preferably generate a coded signal when deployment of one or more of the deployable components is desired so that since each controller initiates deployment of the respective deployable component only if the coded signal contains a specific initiation code associated with the controller. An occupant position sensor could also be provided to detect the position of the occupant to be protected by the deployable components so that the controller of any of the deployable components would control deployment thereof in consideration of the detected position of the occupant.

One embodiment of an occupant protection system, for a vehicle in accordance with the invention comprises an occupant protection device for protecting an occupant in the event of a crash involving the vehicle, initiation means for initiating deployment of the occupant protection device, power means for storing sufficient energy to enable the initiation means to initiate deployment of the occupant protection device, an electronic controller connected to the power means for monitoring voltage of the power means and controlling the initiation means, a diagnostic module arranged to receive a signal from the controller as to whether the voltage of the power means is sufficient to enable the initiation means to initiate deployment of the occupant protection device, and an electrical bus electrically coupling the controller and the diagnostic module. The controller is arranged to generate a fault code in the event of a failure of the power means or the initiation means, which fault code is sent to the diagnostic module over the bus. One or more crash sensors or other deployment determining means are preferably coupled to the bus for generating a (coded) signal indicative of whether deployment of the occupant protection device is desired, the signal being sent from the determining means over the bus to the controller. The controller may be arranged in the housing or adjacent the housing.

Another embodiment of an occupant protection system in accordance with the invention comprises a deployable occupant protection device, deployment determining means for generating a coded signal indicative of whether deployment of the occupant protection device is desired, and an electrical bus electrically coupling the occupant protection device and the deployment determining means. The coded signal from the deployment determining means is sent over the bus to the occupant protection device to enable deployment of the occupant protection device. The deployment determining means may comprise one or more crash sensors arranged separate and at locations apart from the occupant protection device. A controller may be coupled to the deployment determining means, the occupant protection device and the bus, and controls deployment of the occupant protection device in response to the coded signal generated by the deployment determining means. The coded signal from the deployment determining means is sent over the bus to the controller to enable deployment of the occupant protection device.

A method for controlling deployment of an occupant protection system for protecting an occupant in a vehicle comprises the steps of arranging a deployable occupant protection device in the vehicle, generating a coded signal indicative of whether deployment of the occupant protection device is desired, electrically coupling the occupant protection device and the crash sensor by means of an electrical bus, and directing the coded signal from the crash sensor over the bus to the occupant protection device to enable deployment of the occupant protection device. The coded signal may be generated by a crash sensor in response to a crash of the vehicle for which deployment of the occupant protection device might be required.

In order to achieve some of the objects set forth above and others, in one embodiment of a vehicle electrical wiring system in accordance with the invention, substantially all of the devices, and especially substantially all of the safety devices, are connected together with a single communication bus and a single power bus. In the preferred case, a single wire pair will serve as both the power and communication buses. When completely implemented each device on the vehicle will be coupled to the power and communication buses so that they will now have an intelligent connection and respond only to data that is intended for that device, that is, only that data with the proper device address.

The benefits to be derived from the vehicle electrical system described herein include at least at 50% cost saving when fully implemented compared with current wire harnesses. A weight savings of at least 50% is also expected. Most importantly, a multi-fold improvement in reliability will result. The assembly of the system into the vehicle is greatly simplified as is the repair of the system in the event that there is a failure in the wiring harness. Most of the connectors are eliminated and the remaining ones are considerably more reliable. Diagnostics on all devices on key-on can now be accomplished over the network with a single connection from the diagnostic circuit.

In contrast to other multiplexing systems based on zone modules, the communication to and from each device in the instant invention is bi-directional.

It is now believed that for side impacts, the airbag crash sensor should be placed in the door. There is reluctance to do so by the automobile manufacturers since in a crash into the A-pillar of the vehicle, for example, the wires leading to and form the door may be severed before the crash sensor activates. By using the two wire network as described herein, only two, or possibly four if a separate pair is used for power, of wires will pass from the door into the A-pillar instead of the typically fifty or more wires. In this case, the wires can be protected so that they are stronger than the vehicle metal and therefore will not sever during the early stages of the accident and thus the door mounted sensor can now communicate with the airbag in the seat, for example.

In the preferred system then, the power line or distribution network in the vehicle is used to simultaneously carry both power and data to all switches, sensors, lights, motors, actuators and all other electrical and electronic devices (hereinafter called devices) within the vehicle and especially all devices related to deployable restraints. Naturally, the same system will also work for vehicles having different voltages such as 48 volts. Also a subset of all vehicle devices can be on a net. Initially, for example, an automotive manufacturer may elect to use the system of this invention for the automobile safety system and later expand it to include other devices. The data, in digital form, is carried on a carrier frequency, or as pulse data as in the Ethernet protocol, and is separated at each device using either a microprocessor, "high-side driver" or other similar electronic circuit. Each device will have a unique, individualized address and be capable of responding to a message sent with its address. A standard protocol will be implemented such as SAE J1850 where applicable. The return can be through vehicle ground comprising the vehicle sheet metal and chassis or through a wire.

The advantages of such a system when fully implemented are numerous, among which the following should be mentioned:

1. The amount of wire in the vehicle will be substantially reduced. There is currently about 500 or more meters of wire in a vehicle.
2. The number and complexity of connectors will be substantially reduced. There are currently typically about 1000 pin connections in a vehicle. When disconnection is not required, a sealed permanent connector will be used to join wires in, for example, a T connection. On the other hand, when disconnection is required, a single or dual conductor connector is all that is required and the same connector can be used throughout the vehicle. Thus, there will be only one or two universal connector designs on the vehicle.
3. The number of electronic modules will be substantially reduced and maybe even be completely eliminated. Since each device will have its own microprocessor, zone modules, for example, will be unnecessary.
4. Installation in the vehicle will be substantially easier since a single conductor, with branches where required, will replace the multi-conductor wire harnesses currently used. Wire "choke points" will be eliminated.
5. Reliability will be increased based on system simplicity.
6. Two way or bi-directional communication is enabled between all devices. This simplifies OBD2 (On Board Diagnostic Level 2 now required by the US Government for pollution control) installation, for example.
7. All devices on the vehicle are diagnosed on key-on. The driver is made aware of all burned out lamps, for example before he or she starts the vehicle.
8. Devices can be located at optimum places. A side impact sensor can be placed within the vehicle door and still communicate with an airbag module located in the seat, for example, with high reliability and without installation of separate wiring. In fact, only a single or dual wire is required to connect all of the switches, sensors, actuators and other devices in the vehicle door with the remainder of the vehicle electrical system.
9. Electro-magnetic interference (EMI) Problems are eliminated. The driver airbag system, for example would have the final circuit that deploys the airbag located inside the airbag module and activated when the proper addressed signal is received. Such a circuit would have an address recognition as well as diagnostic capabilities and might be known as a "smart inflator". EMI, which can now cause an inadvertent airbag deployment, ceases to be a problem.
10. Vehicle repair is simplified and made more reliable.

It is important that any wire used in this embodiment of the invention be designed so that it won't break even in an accident since if the single bus breaks the results can be catastrophic. Additionally, the main bus wire or pair of wires can be in the form of a loop around the vehicle with each device receiving its messages from either direction such that a single major break can be tolerated. Alternately, a tree or other convenient structure can be used and configured so that at most a single branch of the network is disabled.

It should be understood that with all devices having access to the network, there is an issue of what happens if many devices are attempting to transmit data and a critical event occurs, such as a crash of the vehicle, where time is critical, i.e., will the deployment of an airbag be delayed by this process. However, it is emphasized that although the precise protocol has not yet been determined pending consultation with a customer, protocols do exist which solve this problem. For example, a token ring or token slot network where certain critical functions are given the token more frequently than non-critical functions and where the critical device can retain the token when a critical event is in progress is one solution. A crash sensor, for example, knows that a crash is in progress before it determines that the crash severity requires airbag deployment. That information can then be used to allocate the bandwidth to the crash sensor. An alternate approach is to use a spread spectrum system whereby each device sends and is responsive to a pattern of data that is sorted out using correlation techniques permitting any device to send and receive at anytime regardless of the activity of any other device on the network.

Another issue of concern is the impact of vehicle noise on the network. In this regard, since every device will be capable of bi-directional communication, standard error checking and correction algorithms are employed. Each device is designed to acknowledge receipt of a communication or the communication will be sent again until such time as receipt thereof by the device is acknowledged. Calculations show that the bandwidth available on a single or dual conductor is much greater than required to carry all of the foreseeable communication required within an automobile. Thus, many communication failures can be tolerated.

BRIEF DESCRIPTION OF THE DRAWINGS

The following drawings are illustrative of embodiments of the invention and are not meant to limit the scope of the invention as encompassed by the claims.

FIG. 2G is a cross-sectional view of the apparatus of FIG. 2A with parts cut away and removed illustrating an alternate configuration of the invention wherein a slow burning propellant in the form of a thin flat sheet is used.

FIG. 11A is a fragmented partially schematic cross-sectional view of a pyrotechnic window breaking mechanism used in accordance with the present invention.

FIG. 11C is a fragmented cross-sectional view of a window release mechanism in accordance with the present invention which permits the window to be ejected from the vehicle if the pressure in the vehicle exceeds a design value.

FIG. 14 is a cross-sectional view of an airbag module showing an airbag and inflator with the inflator sectioned to show the propellant, initiator and squib assembly, and with the sensor and diagnostic circuitry shown schematically.

FIG. 14A is a detailed sectional view of circle 14A of FIG. 14 showing the inflator squib incorporating a pyrotechnic delay element.

FIG. 14B is a detailed sectional view of an alternate mechanical deployment delay mechanism using the electrical squib to release a firing pin which is propelled into a stab primer by a spring.

FIGS. 18A, 18B, 18C and 18D are different views of an automotive connector for use with a coaxial electrical bus for a motor vehicle illustrating the teachings of this invention.

FIG. 19 is a schematic illustration of a generalized component with several signals being emitted and transmitted along a variety of paths, sensed by a variety of sensors and analyzed by the diagnostic module in accordance with the invention and for use in a method in accordance with the invention.

DEFINITION OF TERMS

The following terms will be used in the description of the invention and for the sake of clarity are defined here.

The "A-pillar" of a vehicle and specifically of an automobile is defined as the first roof supporting pillar from the front of the vehicle and usually supports the front door. It is also known as the hinge pillar.

The "B-Pillar" is the next roof support pillar rearward from the A-Pillar.

The "C-Pillar" is the final roof support usually at or behind the rear seats

The term "squib" represents the entire class of electrically initiated pyrotechnic devices capable of releasing sufficient energy to cause a vehicle window to break. It is also used to represent the mechanism which starts the burning of an initiator which in turn ignites the propellant within an inflator.

The term "airbag module" generally connotes a unit having at least one airbag, gas generator means for producing a gas, attachment or coupling means for attaching the airbag(s) to and in fluid communication with the gas generator means so that gas is directed from the gas generator means into the airbag(s) to inflate the same, initiation means for initiating the gas generator means in response to a crash of the vehicle for which deployment of the airbag is desired and means for attaching or connecting the unit to the vehicle in a position in which the deploying airbag(s) will be effective in the passenger compartment of the vehicle. In the instant invention, the airbag module may also include occupant sensing components, diagnostic and power supply electronics and componentry which are either within or proximate to the module housing.

The term "occupant protection device" as used herein generally includes any type of device which is deployable in the event of a crash involving the vehicle for the purpose of protecting an occupant from the effects of the crash and/or minimizing the potential injury to the occupant. Occupant protection devices thus include frontal airbags, side airbags, seatbelt tensioners, knee bolsters, side curtain airbags, externally deployable airbags and the like.

DESCRIPTION OF THE PREFERRED EMBODIMENTS

Figure 1:
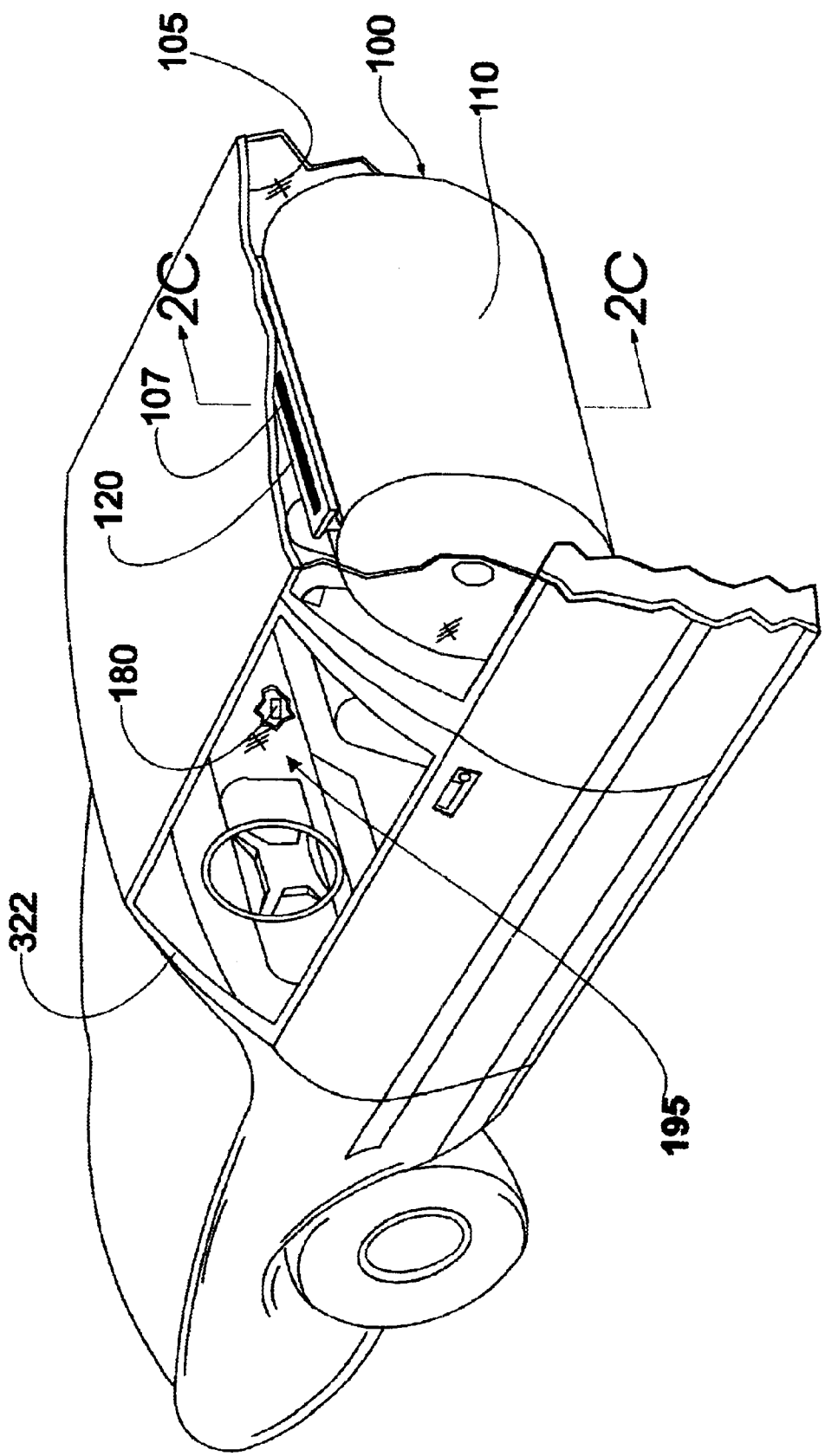
FIG. 1 is a perspective view, with certain parts removed, of a preferred implementation of the airbag module in accordance with the invention shown mounted on a ceiling of a vehicle passenger compartment for deployment to protect rear seat occupants.

Referring to the accompanying drawings wherein the same reference numerals refer to the same or similar elements, an airbag module constructed in accordance with the teachings of the invention and adapted for mounting, e.g., on a ceiling 105 in a passenger compartment 195 of a motor vehicle to protect rear seat occupants in collisions and particularly frontal collisions, is shown generally at 100 in FIG. 1. The airbag module 100 is elongate and includes an inflator module 120 and an airbag 110 made substantially of plastic film which is coupled to the inflator module 120. The airbag module 100 is attached to a mounting surface of the vehicle which, in the illustrated embodiment, is a middle region of the ceiling 105 by fastening means 107. The airbag module 100, or at least the airbag 110 housed therein, is dimensioned so that it extends across substantially the entire distance between the side windows. The airbag module 100, and more particularly the inflator module 120, is also coupled to a sensor and diagnostic module 180 which receives input data and determines if an accident involving the vehicle is of such severity as to require deployment of the airbag 110. If so, the sensor and diagnostic module 180 sends a signal to the inflator module 120 to start the process of deploying the airbag, i.e., by initiating the burning of a propellant housed within a gas generator portion of the inflator module 120 as described in more detail below. Module 100 may also be attached to the ceiling of the vehicle in a position to deploy the airbag between the dashboard and any front-seated occupants.

Figure 2A:
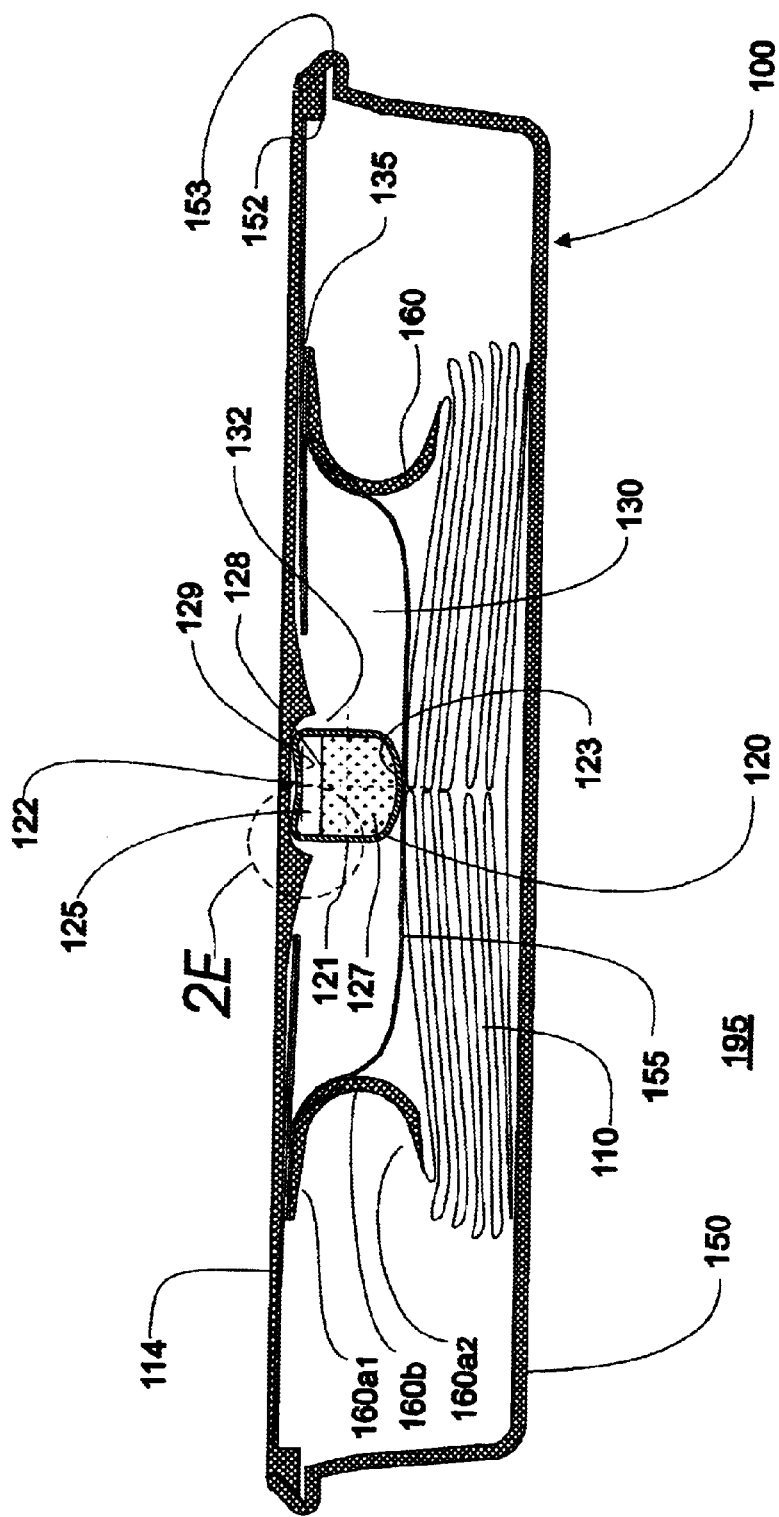
FIG. 2A is a cross-sectional view of the airbag module of FIG. 1 prior to deployment of the airbag.

FIG. 2A is a cross-sectional view of the airbag module 100 prior to inflation of the airbag 110. As shown in FIG. 2A, the airbag module 100 includes a protective cover 150 which partially defines a housing of the airbag module 100 and as such, encloses the airbag 110 and an interior portion of the airbag module 100 and prevents contaminated particles from entering the interior of the airbag module 100. Shortly after the inflator module 120 is directed to initiate burning of the propellant, the protective cover 150 is released as a direct result of the burning propellant and the folded airbag 110 begins to inflate using a combination of gases from both the gas generator portion of the inflator module 120 and, through aspiration, from the passenger compartment 195 of the vehicle.

The term "airbag" as used herein means either the case where the airbag module 100 contains a single airbag, as in most conventional designs, or where the airbag module 100 contains a plurality of airbags, possibly one inside another or several airbags inside a limiting net having a smaller volume than the volume of the airbags (see the disclosure of U.S. Pat. Nos. 5,505,485 and 5,653,464), or where the airbag module 100 contains a single airbag having a plurality of compartments which deploy in concert to protect an occupant. The term "inflator" as used herein means the gas generator plus all other parts required to deliver gas to the airbag including the aspiration system if present. The term "gas generator", on the other hand, refers only to the propellant, its housing and all other parts required to generate gas. In non-aspirated implementations, the inflator and the gas generator are the same. The terms "propellant" and "gas generator" are used here as equivalents. The term "cover" as used herein means any type of covering for enclosing an interior portion of the airbag module 100, or at least for overlying the airbag 110 per se, to protect the same and may even constitute a simple covering on an outermost region of the airbag 110. Thus, it will be appreciated by those skilled in the art that the cover may be the material which forms the outer peripheral surface of the passenger compartment, e.g., fabric, without deviating from the objects of the invention. Alternatively, the covering may actually be a surface of the airbag itself coated to appear like a cover.

Figure 2B:
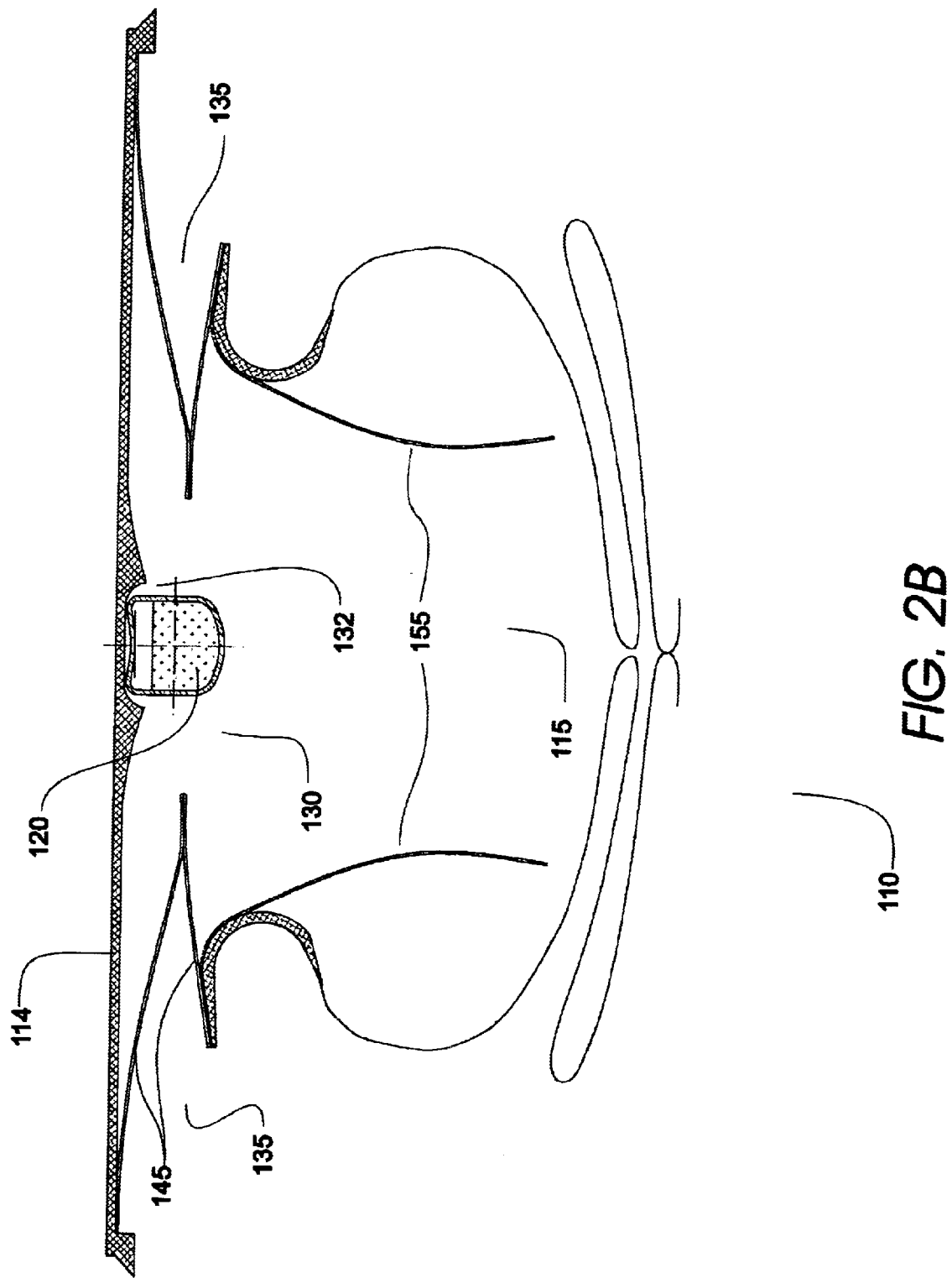
FIG. 2B is a view of the apparatus of FIG. 2A after the initial stage of deployment where the airbag module has been displaced from the mounting surface to open aspirating ports.
Figure 2C:
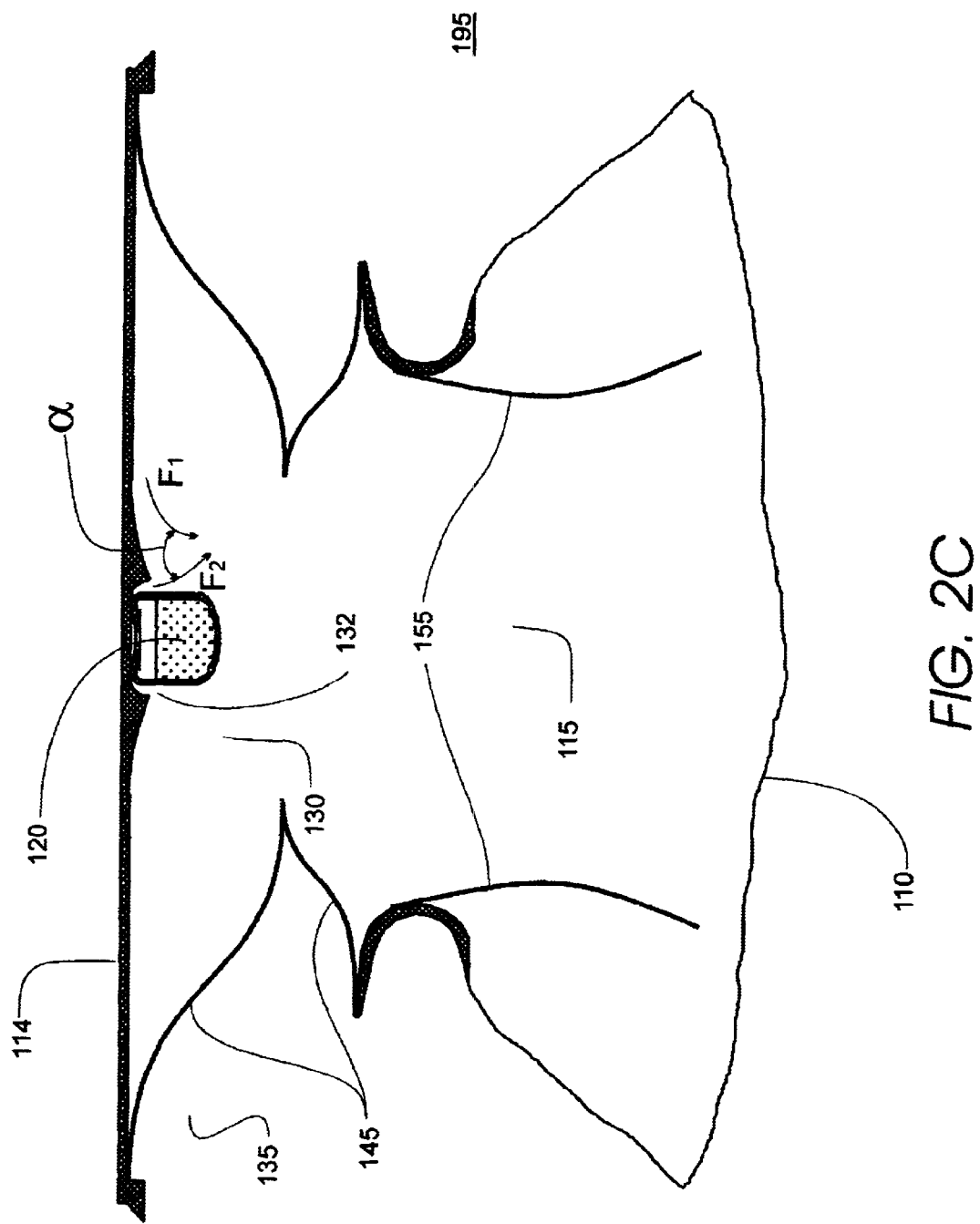
FIG. 2C is a cross-sectional view similar to FIG. 2A with the airbag fully deployed taken along lines 2C—2C of FIG. 1.

FIG. 2B is a view of the airbag module 100 of FIG. 2A after the initial stage of airbag inflation where the initial gas from the gas generator has generated sufficient pressure within the interior of the airbag module 100 to force the release of the cover 150. FIG. 2C shows the airbag 110 in its inflated condition and is a view taken along lines 2C—2C of FIG. 1. The cover 150 may also be released by other means such as pyrotechnic means.

In the embodiment illustrated in FIGS. 2A, 2B and 2C, the airbag module 100 is substantially elongate and the inflator module 120 comprises an elongate gas generator made from an approximately rectangular-cross-section housing, such as a tube 121, with at least one opening 122 therein for outflow of gas generated thereby. A propellant 127 in the form of a solid material is affixed to the inner surface of the walls of tube 121 in a significant portion of the interior of tube 121. The surface of the propellant 127 not engaging a wall of the tube 121 is coated with a layer of pyrotechnic igniter mix 128 such as a coating made from nitrocellulose and BKNO3, or other suitable materials, to aid in starting burning of the propellant 127. This layer of igniter mix 128 also serves to seal the propellant 127 from the environment, i.e., the atmosphere. If the material of the igniter mix 128 is made at least partially from nitrocellulose or another appropriate sealant, then another seal to isolate the propellant from the atmosphere is not required and the propellant 127 is effectively hermetically sealed. A screen member 129 is also positioned within tube 121 in a position spaced from the layer of igniter mix 128 covering the propellant 127 and adjacent to the opening(s) 122 to prevent any particulate matter from leaving the tube 121. A chamber 125 is thus defined between the screen member 129 and the layer of igniter mix 128. Although any screen member 129 will inherently provide some initial cooling of the gas from the propellant 127, this is simply an ancillary benefit. On the other hand, for cases where the selected propellant 127 is known to burn at too high a temperature, the screen member 129 can be made thicker so as to also serve as a heat sink, i.e., its size can be regulated to affect the temperature of the gases generated by the burning propellant 127 and expelled from the gas generator 120. Upon receiving a signal from the sensor and diagnostic module 180, an electronic module (not shown) ignites a squib at one end of the inflator module 110 (FIG. 1) which ignites the igniter mix 128 which in turn ignites the propellant 127. The propellant 127 burns in a direction from the surfaces coated by the igniter mix 128 toward wall 123 (FIG. 2A), which is opposed to the wall of the tube 121 having the opening(s) 122 until the propellant 127 is totally consumed. It will be appreciated by those skilled in the art that the size of the tube 121 can be regulated, i.e., elongated or widened, depending on the propellant used and ideally minimized based on appropriate selection of the propellant and the required gas output parameters of the gas generator, without deviating from the scope of the invention.

The airbag module 100 also includes, external of the tube 121 and in fluid communication with the opening(s) 122, a mixing chamber 130 in which the gas from the gas generator 120 resulting from the burning of the propellant 127 and gas from the passenger compartment 195, e.g., air, entering through an aspiration nozzle or inlet ports or inlet slits 135 are combined, and from which the combined gases are delivered to the airbag 110 through a port or nozzle, i.e., converging-diverging nozzle 115 (FIGS. 2B and 2C).

The airbag module 100 also comprises elongate U-shaped nozzle walls 160 (which define the nozzle 115 therebetween), base 114 which is mounted to the ceiling 105, or other mounting surface, by the fastening members 107 (FIG. 1) and support springs 145. The gas generator 120 is attached to base 114 by brackets 170 which will be described in more detail below (FIG. 2F). Each of the nozzle walls 160 has two leg portions 160a1, 160a2 extending from opposite end regions of a base portion 160b. At least one of the springs 145, two in the illustrated embodiment, is attached to leg portion 160a1 of each nozzle wall 160 and, as shown in FIG. 2A, prior to airbag inflation are maintained in a compressed state so that the walls 160 are proximate to the base 114, i.e., the aspiration inlet ports 135 are substantially closed. Attached to the base portion 160b of each nozzle wall 160 is a spring shield 155 which supports and protects the material of the airbag 110 during the initial inflation period, as shown in FIG. 2B, prior to the start of the aspiration when the gases are hot, keeping the airbag 110 from blocking the inlet to the inflator module 120 from the passenger compartment 195. Prior to inflation of the airbag 110, the spring shields 155 exert pressure against the folded airbag 110 to force the same against the cover 150. During inflation, the spring shields 155 are designed to be forced outward by the expulsion of gases from the gas generator 120 and help start the airbag deployment process since the cover 150 no longer acts to restrain the airbag 100, and then the support shields 155 form the converging and diverging portions of the low pressure part of the aspiration nozzle 115. The ends of the airbag 110 are connected to leg portions 160a2. This process uses the high pressure gas from the inflator to initiate deployment of the airbag prior to the start of the aspiration process. In this manner, the initial force needed to release the cover and start the airbag deployment is provided by the initial burning of the propellant. In some cases, two propellant formulations are used. A first rapidly burning mixture to provide an initial high pressure for cover release and initial deployment, followed by a slower burning propellant for inflating the airbag with aspirated air.

In view of this construction, the airbag 110 is not circular but rather is elongate as shown in FIG. 1 Some of the advantages of this non-circular airbag 110 is its ease of manufacture from flat plastic film sheets as described in commonly owned U.S. Pat. No. 5,653,464 and its ease in parallel folding the airbag into the module 100. In this regard, it is noted that in view of the elongated shape of the airbag 110, it can be folded lengthwise in the airbag module 100.

In operation, shortly after the propellant 127 has been ignited by the igniter mix 128 and the cover has been released, high pressure gas begins to flow through screen 129, through opening(s) 122 and out through a converging-diverging nozzle 117, 118, 119, also referred to as a convergent-divergent nozzle. The nozzle 117, 118, 119 extends along the longitudinal sides of the inflator module 120. This nozzle has the effect of causing a jet of the combustion gases to achieve a high supersonic velocity and low pressure and to spread to rapidly fill the mixing chamber 130 formed by an outer wall of tube 121, nozzle walls 160 and spring shields 155. This causes a low pressure to occur in the mixing chamber 130 causing substantial amounts of gas to flow through aspirator inlet ports 135, which are opened by the expansion of springs 145 forcing nozzle walls 160 to move away from base 114 as shown, e.g., in FIGS. 2B and 2C. The converging portion 117 of the nozzle is constructed so that its cross-sectional area gradually decreases until throat 118. After throat 118, the cross-sectional area of the diverging portion 119 of the nozzle gradually increases toward exit 132. Thus, after the throat 118, there is a significant continuation of the nozzle to provide for the diverging portion 119. An approximate analysis of an aspirating system similar to that of this invention appears in the Appendix.

The pressure then begins to build in the mixing chamber 130 until sufficient pressure is obtained to finish expelling the cover 150 causing springs 145 to expand even more, support shields 155 to be opened to fully open the nozzle 115 and airbag 110 to be further deployed. Prior to release, the cover 150 is retained by a catch 152. Upon pressurization of the mixing chamber during airbag deployment, a tab 153 on cover 150 is pulled from under catch 152 releasing the cover. Since the pressure builds at the end of the module which is initially ignited by the squib, not shown, the tab 153 is initially released at that end and then is rapidly pulled out from under catch 152 progressing to the end furthest away from the squib. This process can be facilitated by removal of either the tab 153 or catch 152 at the squib end of the airbag module 100. In this manner, the cover 150 is easily released yet retains the airbag 110 during normal vehicle operation. One important feature of the invention is that since the flow out of the high-pressure nozzle is supersonic, the pressure rise needed to further expel the cover 150 will not affect the flow through the nozzle. This is true as long as the flow remains supersonic which, in the preferred design, is set to permit a ten fold pressure rise to expel the cover 150 over that which should be required. Since relatively little pressure is required to expel the cover 150, if an object is loading the cover 150 in one location in the longitudinal direction of the tube 121, the pressure will be released by flowing out to the sides of the obstruction, i.e., at other longitudinal locations. This design is unique in that the pressure buildup never reaches the point that it will cause injury to an out-ofposition occupant. Even if the entire cover 150 is restrained, which is virtually impossible, the cover 150 will release the gas to the sides.

Although the airbag 110 is stored in a compact arrangement as shown in FIG. 2A, when it deploys, the aspiration inlet ports 135 and the converging-diverging nozzle 115 become quite large especially when compared with the size of the high pressure nozzle 117, 118, 119. It is because of this geometry that very high aspiration pumping ratios are achievable in the invention compared to the prior art. Representative dimensions for the high-pressure nozzle are about 0.054 inches for the converging portion 117 of the nozzle, about 0.0057 for the minimum opening or throat 118, to about 0.1 inches at the exit 132 of the nozzle in the diverging portion 119. Representative dimensions for the aspirating nozzle on the other hand are about 1 inch at the inlet ports 135, about 2 inches at the minimum double clearance, i.e., the minimum distance between spring shields 155. The length of the mixing portion of the nozzle is about 2 inches for the illustrated design. It is the ratio of the minimum high pressure gas jet thickness, here about 0.0057 to the length on the mixing channel, here about 2 inches, which is only made possible by the design disclosed herein where the gas jet is very long and thin. The dimensions provided here are illustrative only and the actual dimensions will vary according to the particular application and the particular gas generate used.

Figure 2D:
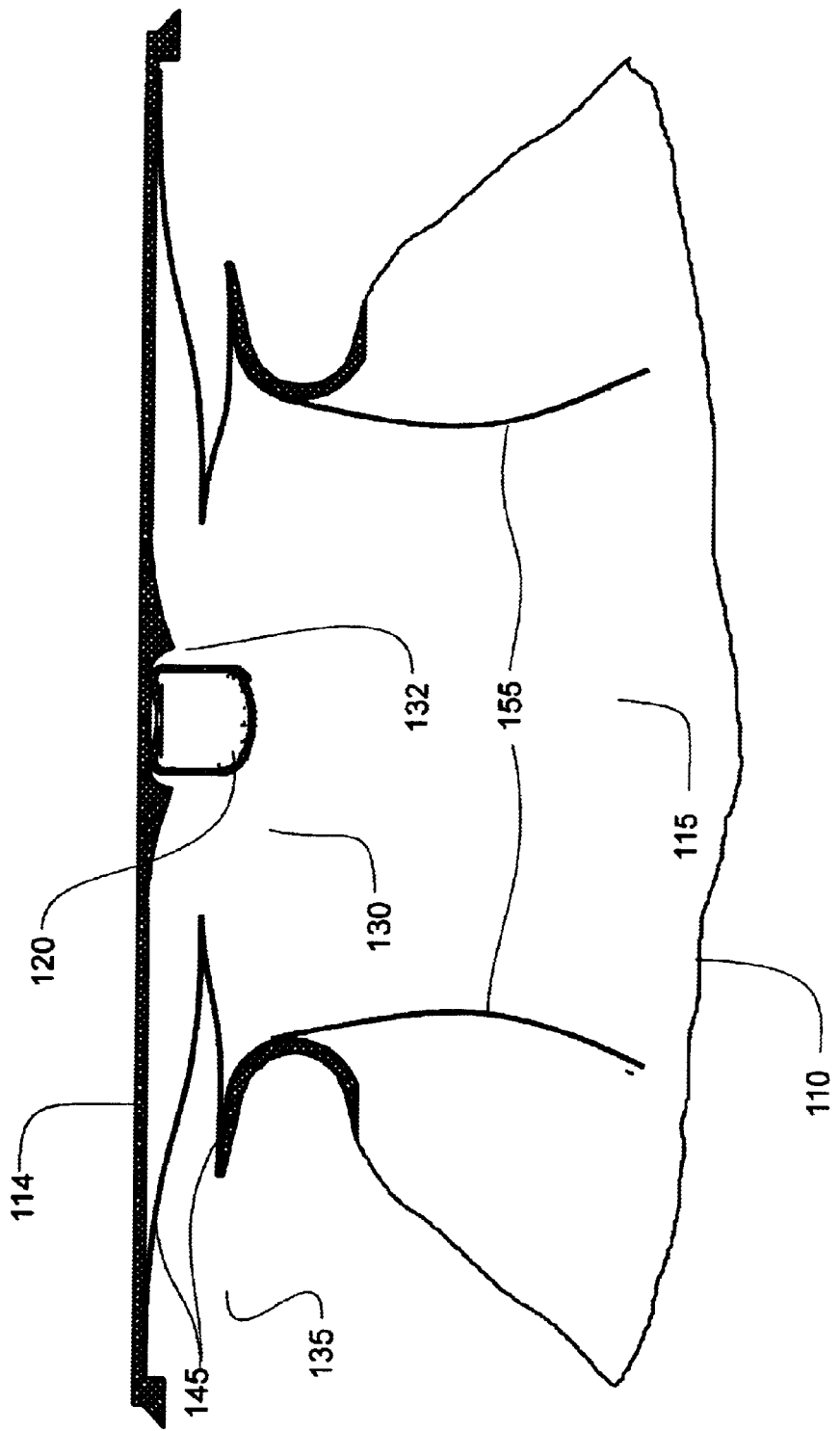
FIG. 2D is a cross-sectional view similar to FIG. 2C after the airbag has deployed showing the substantial closure of the aspirating ports.

FIG. 2D shows the state of the airbag module 100 when the propellant 127 has completed its burning cycle and the pressure has dropped in the module 100 and the springs 145 are acting to move the walls 160 in a direction toward the base 114, i.e., toward their initial position in which the inlet port 135 are substantially closed. The springs 145 do not return the walls 160 completely to their initial position but rather maintain a sufficient opening between base 114 and walls 160 to permit the gases to vent from the airbag 110 as it is loaded by an occupant, i.e., so that gases will flow in an opposite direction through inlet port 135 than the direction of gas flow during inflation of the airbag 110. Springs 145 are typically made from flat strips of spring steel.

In the nozzle, the gas flow initially converges to a very thin cross section that in one preferred design is about 0.005 inches. It then expands becoming supersonic and emerges from the high-pressure nozzle as a sheet canted or slanted at an angle with respect to the incoming aspirated air. As shown in FIG. 2C, the gas from the gas generator 120 flows in a direction F2 whereas the gas from the passenger compartment 195 flows from the aspirating inlet ports 135 in a direction F1 that is at an angle α to the direction F2. This interaction between the two planar flows at an angle promotes efficient mixing of the two gas flows as the flow downstream and into the airbag. In most cases, the angles of the two flows can be adjusted in the design to assure this efficient mixing. In some cases, additional measures are implemented such as varying the directions of the combined flows to further promote mixing before the gas mixture enters the airbag 110. The design illustrated in the figures provides ample space for the gas flows to mix after their initial impact.

In accordance with the invention, the length of the gas generator 120 is measured in a horizontal or longitudinal direction perpendicular to the direction of the flow of the gas and is the longest dimension of the device. The length of the nozzle 117, 118, 119, on the other hand, is measured in the direction of the gas flow and perpendicular to the length of the gas generator 120. A distinctive feature of the inflator module of this invention is that its length is much longer that its width or thickness and the length of the mixing chamber is much longer than the minimum thickness of the high pressure jet. It is this ratio which governs the completeness of the mixing of the gases generated by the propellant 127 and the gases from the passenger compartment 195 which in turn governs the pumping ratio and thereby permits the large pumping ratios achieved here in contrast to the constructions disclosed in the prior art patents discussed above. This is achieved by using a very long and thin jet of high pressure gas which is achieved by the elongate airbag module 100 disclosed herein. It is known in the art that the volume of gas flowing from a gas generator is proportional to the cross-sectional area of the jet times its length, but the ability of the jet to mix rapidly with the aspirating air is determined by the surface area of the jet. By using the thin linear geometry disclosed herein, the ratio of surface area to cross section area is maximized which in turn maximizes the amount of air which can be pumped and thus the pumping ratio. Other geometries can achieve high pumping ratios only by increasing the mixing length. In most implementations, however, this is not practical since there is insufficient space in the vehicle. This is the main reason that current inflators are limited to pumping ratios of substantially less than 1:1. In the case described above, the ratio of the mixing length to the minimum jet diameter is greater than 200:1. In most cases, in the implementation of this invention this ratio will exceed 100:1 and in all cases 50:1. Similarly, the ratio of the length of the gas generator 120 to the minimum thickness of the gas jet in the case described in FIG. 1 and FIGS. 2A–2F is greater than 4000:1. In most cases, this ratio will be greater than 1000:1 and preferably it will be greater than 100:1.

Referring now to FIG. 2F, it can be seen that the nozzle walls 160 are solid and extend in the longitudinal direction of the tube 121. Similarly, spring shields 155 are connected to the walls 160 over substantially the entire length of the walls 160. However, springs 145 are thin members which are connected only at discrete locations to the walls 160 such that upon release of the springs 145 during airbag inflation, gas from the passenger compartment 195 can flow around and between the springs 145 into the mixing chamber 130. Although two springs 145 are shown, it is of course possible to have a single spring or more than two springs. Further, it is important to note that the length of the gas generator 120 does not have to be the same as the length of the nozzle walls and the module 100.

Further, it is a known property or characteristic of propellants, e.g., propellant 127 situated in the tube 121, that their burn rate is dependent on the surrounding pressure, in this case the pressure in chamber 125 in the tube 121. The gas flow rate out of chamber 125 depends on the flow resistance through the opening(s) 122 and the clearance at the throat 118 between the outer wall of the tube 121 and the base 114. In FIG. 2F, this clearance is nominally set by supporting brackets 170 which are connected to the tube 121 at one end region and to the base 114 at an opposite end region. The brackets 170 are designed to hold the tube 121 at a certain distance from base 114. These brackets 170 can be designed to operate in three different ways: (i) as a fixed support, (ii) as a flexible support, or (iii) as a support which changes with temperature. In general, brackets 170 serve to fix the minimum clearance at throat 118 between the gas generator 120 as a unit and the support base 114.

If brackets 170 operate as fixed supports, then the inflator will have a response which varies with temperature as is the case with all conventional inflator designs. This greatly increases the total amount of propellant which is required as discussed below.

Figure 2E:
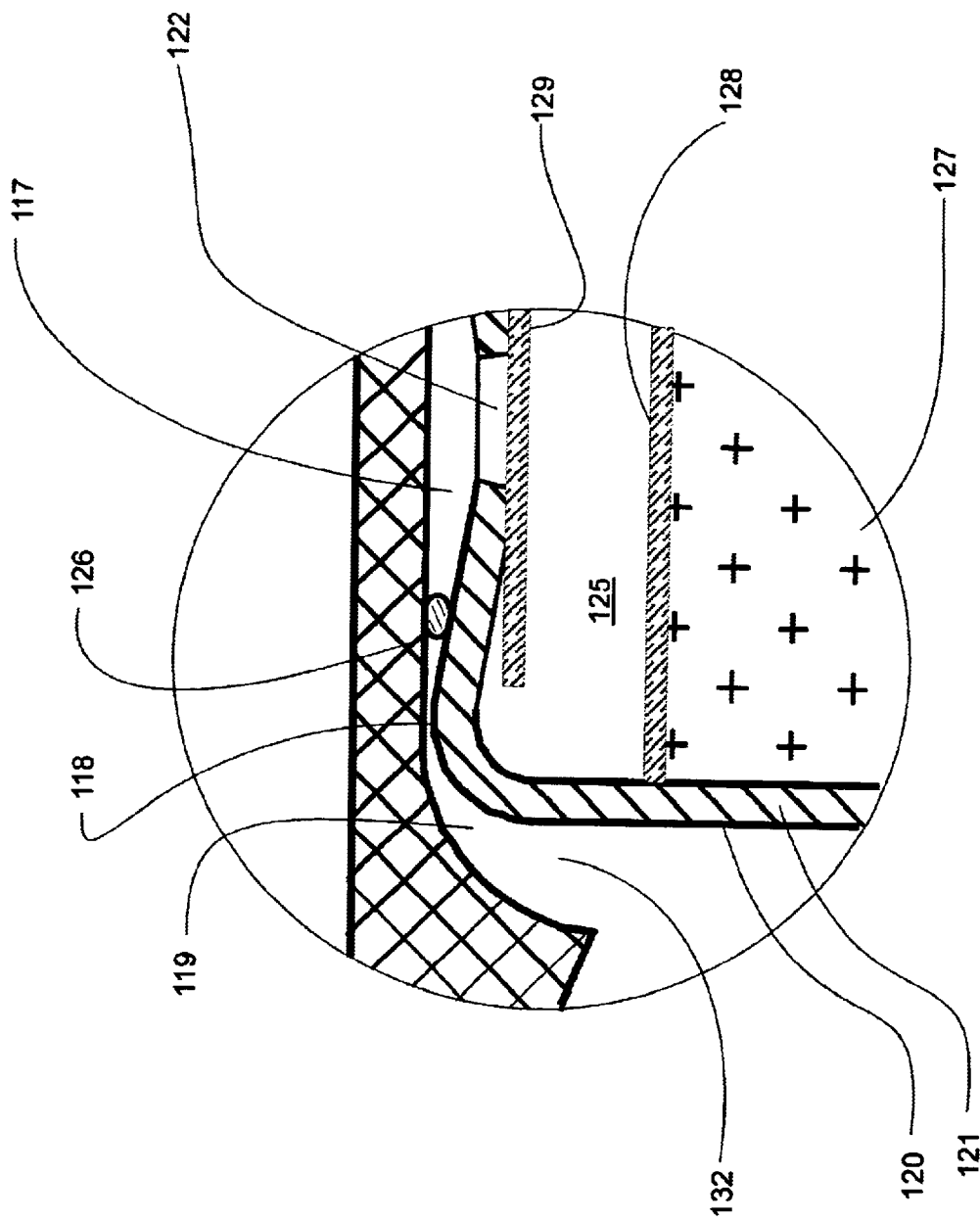
FIG. 2E is an enlarged view of the high pressure gas generator nozzle taken within circle 2E of FIG. 2A.
Figure 2F:
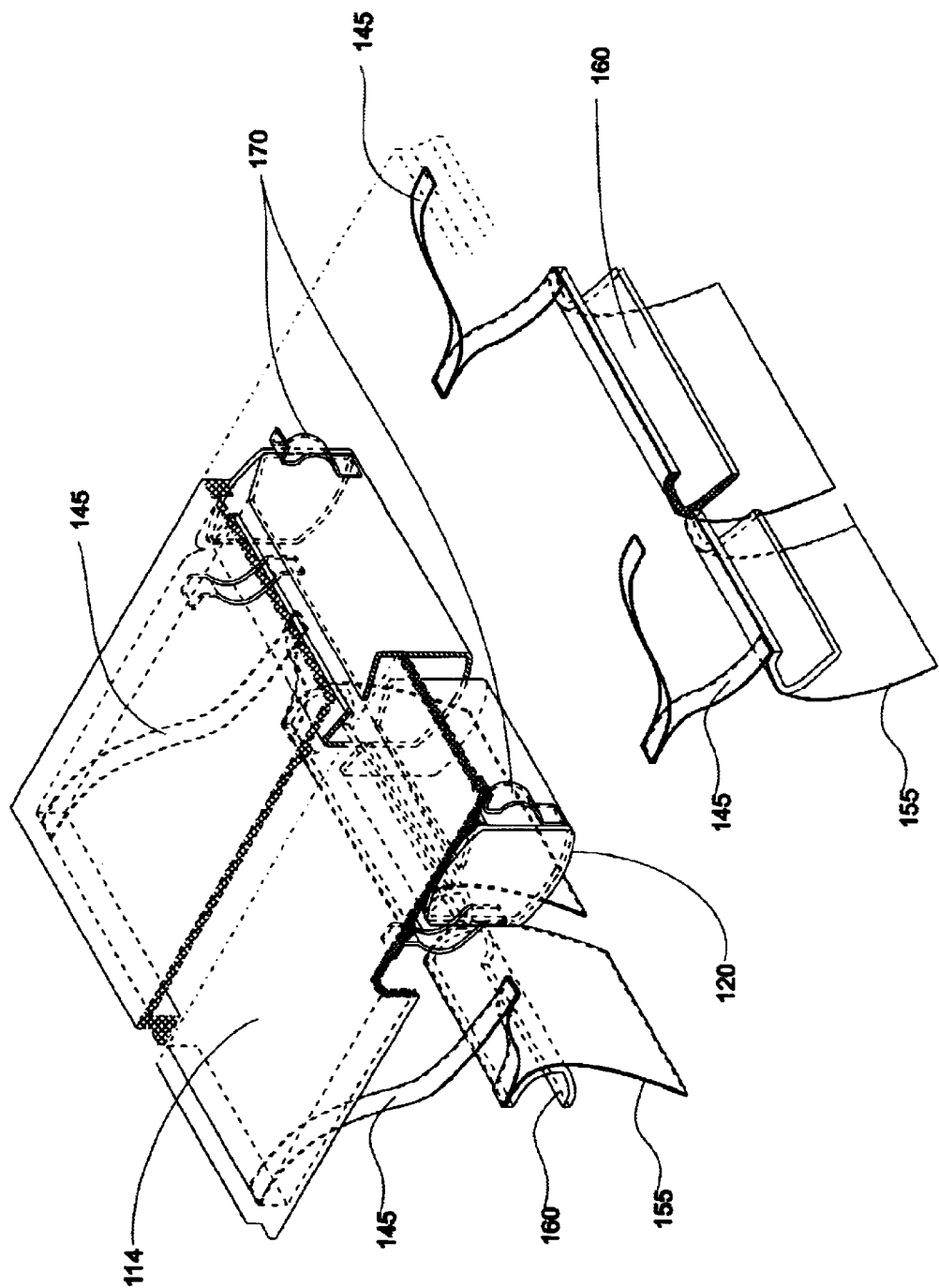
FIG. 2F is a perspective view of the apparatus of FIG. 2A, with the airbag and other parts cut away and removed.

If support brackets 170 are made elastic or flexible, supports 126 are arranged in the converging portion 117 of the nozzle defined by the tube 121 and the support base 114 (FIG. 2E). The brackets 170 then spring-load the tube 121 against the supports 126 so that the tube 121 can lift off of supports 126 when the pressure is sufficient to overcome the spring force of supports which act in the compression direction to keep tube 121 close to the base 114. In this case, the clearance at throat 118 between the tube 121 and base 114 increases, which reduces the flow restriction which in turn reduces the pressure within chamber 125 resulting in a nearly constant propellant burn rate and thus an inflator which operates relatively independent of temperature. The supports 126 are in the form of projections which are arranged at a plurality of spaced apart discrete locations between the base 114 and the gas generator tube 121 and fix the minimum clearance for the case where the support brackets 170 are elastic or flexible.

Alternately, the brackets 170 can be made from strips of bi-metallic material and, through a proper choice of materials and geometry, the brackets 170 will deform over temperature to vary the clearance at throat 118 also with the ambient temperature in order to increase the clearance at throat 118 with temperature thus reducing the flow resistance and reducing the pressure in chamber 125 with temperature providing partial compensation for the variation in the combustion rate of the gas generated as a function of temperature.

In general, the burn rate of propellants increases with ambient temperature and also with pressure, the so-called pressure exponent. The techniques described here are used to control the pressure in chamber 125 to offset the often uncontrollable changes in ambient temperature. By keeping the pressure in chamber 125 relatively constant through the techniques described above, or even decreasing the pressure in chamber 125 with temperature, the propellant burn rate is kept approximately constant. This serves to reduce the variation in the inflator gas output as a function of temperature. At cold temperatures, when the propellant tends to burn slowly, the clearance at throat 118 will be reduced and the pressure will build up increasing the propellant burn rate until the flow of gas out of chamber 125 is sufficient to relieve the pressure. Similarly, at high temperatures, when the propellant tends to burn at a higher rate, the pressure will be relieved reducing the pressure and slowing down the burn rate. In this manner, the invention provides a sort of self-correcting system for providing a substantially constant propellant burn rate, based on adjustment in pressure in the chamber 125, regardless of the ambient temperature.

Conventional inflators, which do not have this pressure adjusting mechanism, produce higher gas flow rates at high ambient temperature than at low temperature since the resistance to the gas flow rate out of the inflator ports is constant. Therefore, a greater gas generating capacity is required at cold temperatures than at high temperatures and the inflators must be designed with sufficient propellant to handle the cold temperature case. Thus, a larger quantity of propellant is needed for conventional inflators by as much as a factor of two than would be the case in the inflator described above.

A further advantage of the elastic pressure adjustment system described above is that since the inflator nozzle 117, 118, 119 opens as a function of the pressure in the chamber 125, it would not be possible for the inflator module 120 to explode in a fire which can be a problem in conventional designs. Thus, in general, a device called a "match" or auto-igniter which is used in conventional inflators to start the propellant burning in the case where the vehicle is on fire, for example, is not required for the gas generator described herein particularly when the elastic brackets 170 are used. It is also in general not required since the total amount of propellant used is small and it is distributed along a significant length. Thus, the confinement pressures required for the propellant to detonate do not occur in this design rendering this design inherently safer than the design of conventional inflators.

Different propellants have different rates of combustion which has a significant effect on the geometry of the gas generator. For propellants with slow burn rates, the ratio of the burning surface width to the thickness of the solid propellant will have to increase. For slow burning propellants, therefore, the width of the tube 121 in a direction parallel to the igniter mix 128 may be much larger than the thickness of propellant 127. In other cases, the width of the tube 121 might become significantly less than the thickness of the propellant 127. This design therefore can accommodate a wide variety of propellant chemistries, and particularly those which produce small amounts of toxic gas which have heretofore been unusable, and therefore design is not limited to any particular propellant.

In particular, FIG. 2G illustrates a case where a very slow burning propellant 127 is used and thus a wide thin geometry has been chosen for the inflator module 120. In this case, a tube is not used and the inflator module comprises the propellant 127 which is attached by an adhesive to a piece of formed metal 161 or other similar member positioned to define a constricting nozzle with the base. This geometry has the significant advantage of simplicity as can be readily seen in the illustration. It has another advantage in that propellants having slow burn rates can be used which heretofore could not be used. Slow burn rate propellants require very thin structures with a large surface area. If such propellants are formed into tablets as is conventionally done in conventional inflators, they would lack sufficient structural strength and be prone to breakage. If the tablets break, the surface area is increased and the propellant burns faster. This would be an uncontrollable property of these tablets such that the burn rate of various inflators depends on how many tablets break. Since this is unacceptable, there is a practical lower limit for the burn rates for propellants used in conventional inflator designs. This, therefore, restricts that classes of propellants which can be used. This restriction does not apply to the present invention since the propellant 127 is supported by metal piece 161 and therefore can be made very thin without fear of breakage. The metal piece 161 is also provided with appropriate curved sections to define a converging-diverging nozzle 117, 118, 119 with the support base 114. Also in this embodiment, a layer of igniter mix 128 may be coated onto the propellant 127.

Although in the preferred implementations of the invention described above, the propellant is placed within the tube 121, in some cases it is desirable to place the gas generator in another location and to use the tube geometry described above to distribute the gas to the high-pressure nozzle. Thus, it will be appreciated by those skilled in the art that it is not required to generate gas within the inflator housing tube per se but it is possible to generate the gas in an auxiliary structure and direct the generated gas into the tube which then merely distributes the gas. Such an embodiment is illustrated schematically in FIG. 2H where an inflator 280 is illustrated in a position connected to tube 121 by a conduit through which gas generated in inflator 280 would be conducted into the tube 121. The inflator 280 is shown here for illustrative purposes only and is not meant to indicate the actual size or location of the inflator. Naturally, if a conventional inflator were used, it would be considerably larger than 280. Such an inflator 280 could be placed adjacent to, or in the vicinity of, the tube 121 or at a more remote location with the gas being transmitted to tube 121 through any type of tube. Such an arrangement is particularly useful when the chosen propellant does not burn clean and the effluent must be filtered. Although the inflator now feeds gas to the tube from one end, the remainder of the operation of the module is the same as described above.

As should now be evident, the aspirated inflator of the present invention has significant advantages over other aspirated inflators currently used in conventional airbag systems. In particular, large openings are provided in the form of the inlet ports 135 on either side of the aspirating nozzles. These ports 135 permit the flow of gas from the passenger compartment 195 into the aspirating nozzle through ports 135 with a short, low flow resistance, flow path. Once the cover 150 is removed from the airbag system and initial airbag deployment has begun, the module pops open and the inlet ports 135 are open to allow the entrance of the passenger compartment gas. The outlet passage from the inflator passes through a converging-diverging nozzle as described above which causes a smooth developed supersonic flow pattern in the emerging gas. The gas leaves the nozzle 117, 118, 119 at exit 132 and enters the mixing chamber 130 at a position near the throat of the aspirating nozzle 115 defined by walls 160 and shields 155 after which the aspirating nozzle 115 diverges, see FIGS. 2C and 2D, to create the minimum pressure at the throat to aid in drawing in the maximum amount of gas from the passenger compartment 195 through inlet ports 135. Using this design, total pumping ratios of up to 10:1 of passenger compartment to generated gas result and instantaneous ratios of up to 20:1 have been proven feasible.

The deployment of the airbag 110 is timed so that, as shown in FIG. 2D, after the airbag 110 is fully inflated and the gas generator 120 has stopped generating gas, i.e., all of the propellant 127 has been burned, the occupant begins to press against the deployed and inflated airbag 110. As a result of the impact of the occupant against the inflated airbag 110, the gas in the airbag 110 begins to flow back through the nozzle 115 defined by spring shields 155 and walls 160 and back out into the passenger compartment 195 through the aspiration inlet ports 135, which thus function as outlet ports at this juncture. In view of absence of gas flow from the gas generator 120, the nozzle 115 defined by spring shields 155 and walls 160 is smaller than during the flow of gas from the gas generator 120 and, the support springs 145 pull walls 160 closer to the base 114 thereby reducing the size of aspiration inlet ports 135. By this method and design, the flow resistance of the aspiration inlet ports 135 for this return flow will, by design of the support springs 145, be optimum regardless of the particular propellant used or the particular airbag geometry. Naturally other geometries and structures are possible which, for example, entirely close off the exhaust ports after the gas generation has stopped and only open when the pressure within the airbag increases above a designed value.

Thus, after the propellant 127 in the tube 121 has finished burning, as a result of a pressure difference between the area proximate and within the gas generator 120 and the interior of the airbag 110, the gas inside the airbag 110 will be caused to flow back through the aspiration inlet ports 135, in a direction opposite to that during inflation of the airbag 110, gradually exhausting the gas from the airbag 110. This only happens, however, when the pressure in the gas generator 120 drops indicative of the end of the burning process. In this manner, the gases produced by the gas generator 120 are always cooled by the aspirated air through inlet ports 135 and there is no need for cooling screens inside of the gas generator 120.

If an occupant interacts with the airbag 110 during its initial inflation phase before the cover 150 is expelled in one preferred design, the pressure in the chamber 130 will rise, the flow of gas into the airbag 110 in preparation for deployment will be stopped, and gas from the gas generator 120 will flow out through aspiration inlet ports 135. This construction prevents injury to an occupant who is loading the cover 150, i.e., resting against the same, prior to inflation of the airbag 110 in the manner described above. In current airbag module designs, if an occupant loads the airbag cover or casing, the pressure will continue to build up behind the cover until thousands of pounds of force are available to force the cover open and thereby injure or kill the "out-of-position" occupant. In another preferred design, the aspiration inlet ports are not uncovered until after the cover is released and the airbag is partially deployed. Since the total motion of the module surface is still small compared with conventional airbag modules, the injury sustained by the occupant is minimized.

An additional advantage to using the aspirating ports 135 as the exhaust ports for an "out-of-position" occupant is that gas does not start flowing out of the airbag 110 until the gas generator 120 stops producing gas. In contrast, in current airbag module designs the gas begins flowing out of the airbag immediately as the airbag is being inflated. The design that is described herein, therefore, conserves inflator gas and permits the use of a smaller amount of propellant in the inflator. The combination of this effect and pressure compensation effect described above can reduce the propellant required to inflate the airbag by a factor of two or more, thus again substantially reducing the size and cost of the inflator and the quantity of toxic gases which are exhausted into the passenger compartment and widening the class of propellants available for use with airbags. The total compartment pressure rise which results from the deployment of multiple airbags is also substantially reduced. However, even if a significant amount of toxic gas is exhausted into the passenger compartment during deployment of the airbag, the sensor and diagnostic module 180 may be coupled to a number of different arrangements for reducing the concentration of toxic gas in the passenger compartment resulting from the deployment of multiple airbags or unconventionally large airbags (which aspect is discussed in greater detail below). Thus, the airbag module 100 described above may be implemented in a comprehensive airbag system in connection with a toxic gas reducing arrangement.

As discussed above, in some situations with conventional inflators, but not with the inflator of this invention, the occupant may be so out-of-position as to be already leaning against the airbag module when the sensor and diagnostic module signals that the airbag should be deployed. This is a particularly serious situation since deceleration of the vehicle may cause the occupant to exert a significant force against the airbag cover preventing it from opening. The inflator module will begin producing gas and if the flow out of the inflator module is resisted, the pressure in the inflator module will increase even exceeding about 1000 psi if necessary until the resistance is overcome and the cover opens. This can result in very large forces against the head or chest of the occupant and result in serious injury or even death.

Several inflator designers and manufacturers are experimenting with variable output inflators where the gas flow from the inflator is reduced. However, this will not solve this problem but only delay the pressure buildup for a few milliseconds with the same eventual catastrophic results. The design used herein eliminates this problem since even though the occupant may load one portion of the cover 150 at one location in the longitudinal direction of the cover 150 preventing it from opening by the release of latch 152, and even if he were able to entirely block the removal of the cover 150, the build-up of gas in the module 100 will cause a slight bulge in the cover 150 causing it to pop free of the base 114 and the gas will begin flowing out through inlet ports 135 as soon as the pressure exceeds a design value which is significantly below that required to oppose the force of an occupant leaning against the airbag module cover 150. Note, however, for many of the preferred mounting locations of the airbag module 100 of this invention, such as on the ceiling of the vehicle, it is very difficult for the occupant to get into a position where he/she is against the module cover 150. Also, note that for some applications, some additional motion of the cover is permitted in order to permit an initial airbag deployment before the aspiration begins.

In conventional airbag module designs, the cover is cut open during the deployment process. The expulsion method used here has the advantage of simplicity since no cutting of the material is necessary and it also permits a rapid opening of the aspiration inlet ports which is important to the inflator design disclosed herein. If properly designed, the cover release mechanism requires little force to release the cover and yet is very difficult to detach from outside the module. Thus, the cover is released before significant pressures occur in the module, reducing the danger of deployment-induced injuries to the occupants.

Figure 2H:
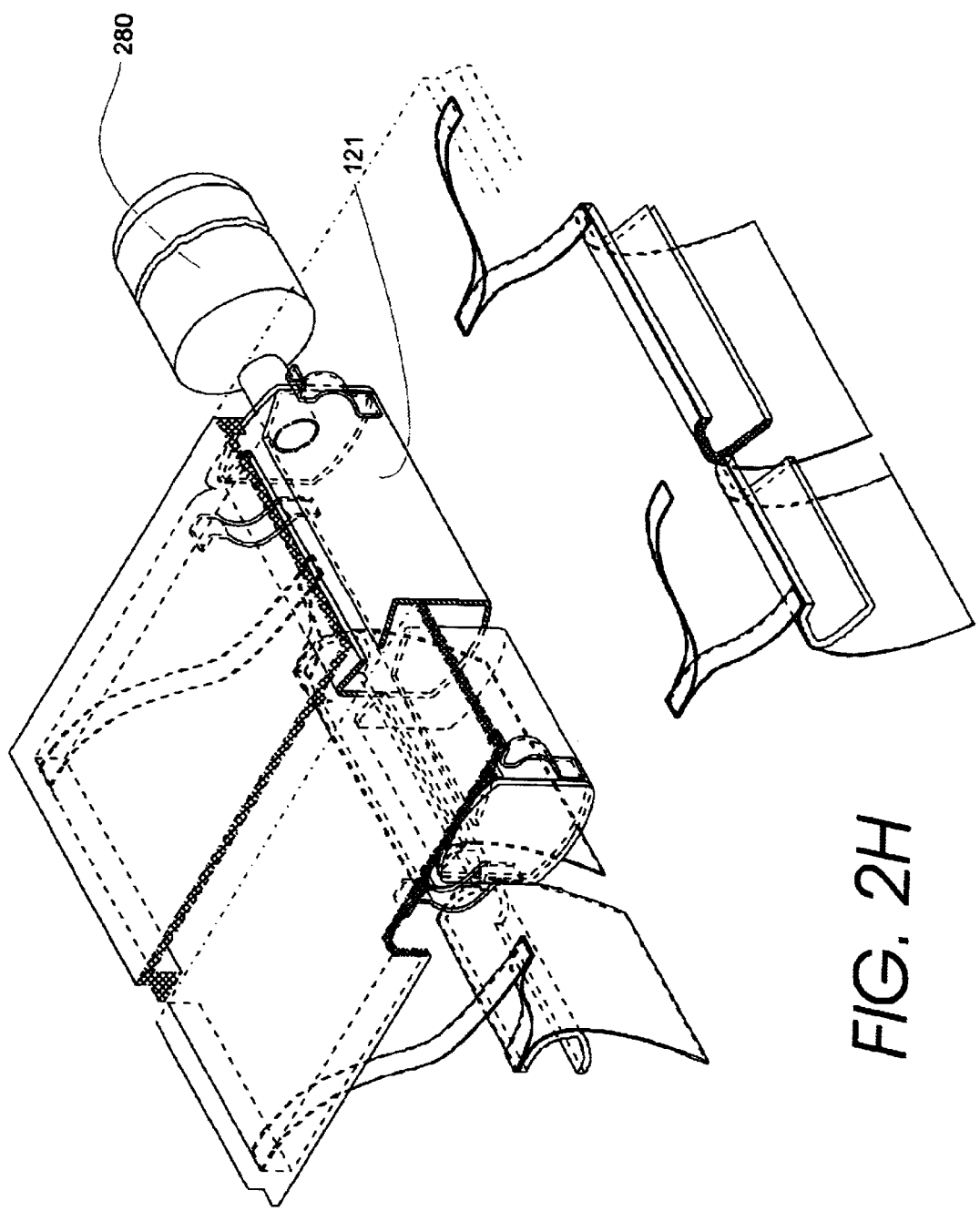
FIG. 2H is a perspective view of the apparatus as shown in FIG. 2F wherein a separate inflator is used in place of the propellant in the tube of FIG. 2A and the tube is used here as a method of dispensing the output from the inflator to the aspirating nozzle design of this invention.
Figure 3A:
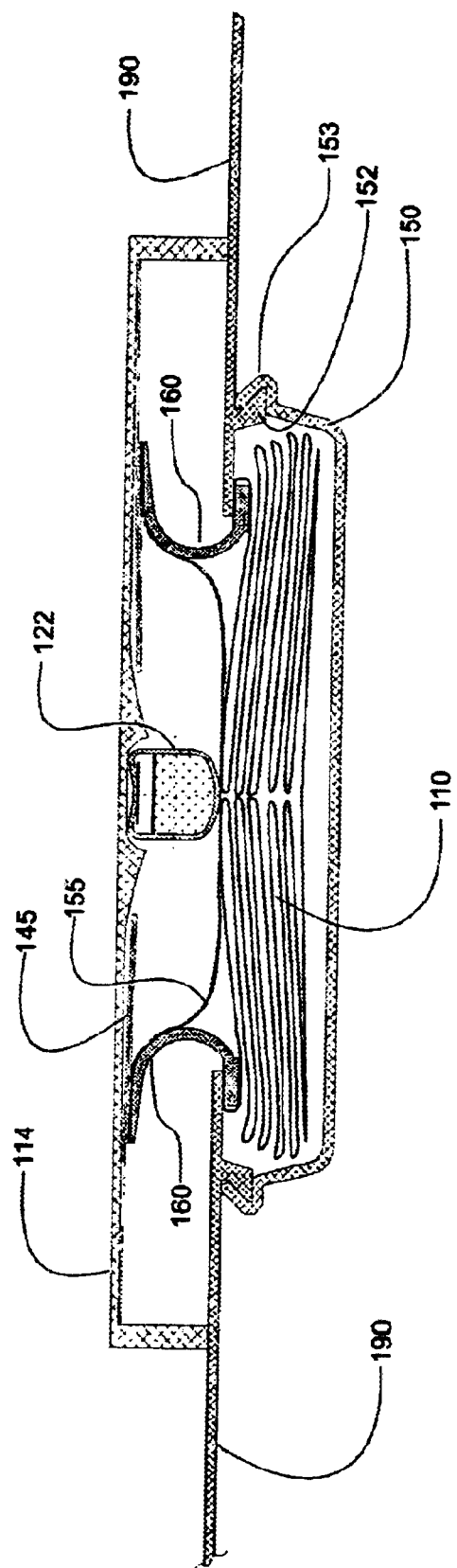
FIG. 3A is a cross-sectional view of an alternate embodiment of the airbag module in accordance with the invention where sufficient space is available for the aspirating ports without requiring movement of the module toward the occupant.
Figure 3B:
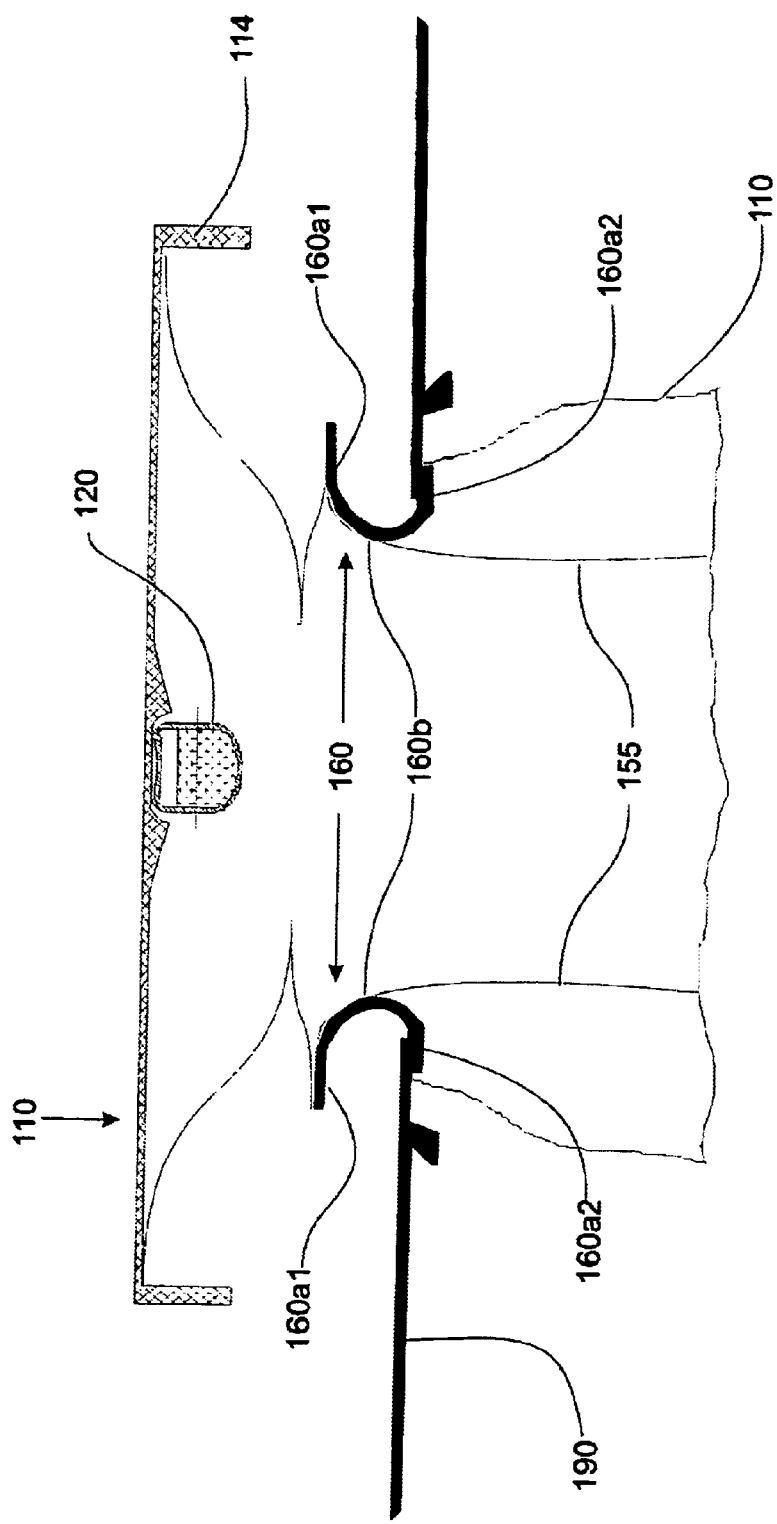
FIG. 3B is a cross-sectional view of the embodiment of FIG. 3A with the airbag deployed.

Another preferred embodiment of the invention in which there is sufficient space for the formation of aspirating channels behind the mounting surface on which the airbag module is mounted is illustrated in FIGS. 3A and 3B. Aside from the direction of movement of the airbag module 100 to open aspirating channels, the operation of this embodiment is essentially the same as the embodiment discussed above. However, in contrast to the embodiment in FIGS. 2A–2H, in this case, the gas generator 120 and base 114 are displaceable and are moved away from a mounting surface 190 in one direction during airbag deployment whereas the airbag 110 is deployed in an opposite direction. To enable this relative movement of the gas generator 120 and base 114 relative to the fixed mounting surface 190, the leg portion 160a 2 of each of the walls 160 is attached to the mounting surface 190. As shown in FIG. 3A, the base 114 is mounted in engagement with the mounting surface 190 on one side thereof, which is the side to which the walls 160 extend. On the opposite side of the mounting surface 190, the latches 152 are mounted so that the cover 150 is detachably connected to the mounting surface 190 by tabs 153 engaging with the latches 152. Thus, in this embodiment, instead of connecting the base 114 to, e.g., the ceiling of the vehicle as in FIG. 1, the walls 160 are connected to the mounting location, such as the instrument panel or knee bolster structure, of the vehicle and would not be substantially displaced during deployment of the airbag 110. In this context, the instrument panel of the vehicle is defined so as to include the knee bolster area of the vehicle from which airbags used as knee bolsters would be deployed.

In an alternative embodiment, the inflator module 110 can be mounted in a position with the aspirating ports 135 open providing there is sufficient space available and thus, this invention is not limited to the preferred embodiments whereby the inflator module 110 expands on deployment.

Figure 4:
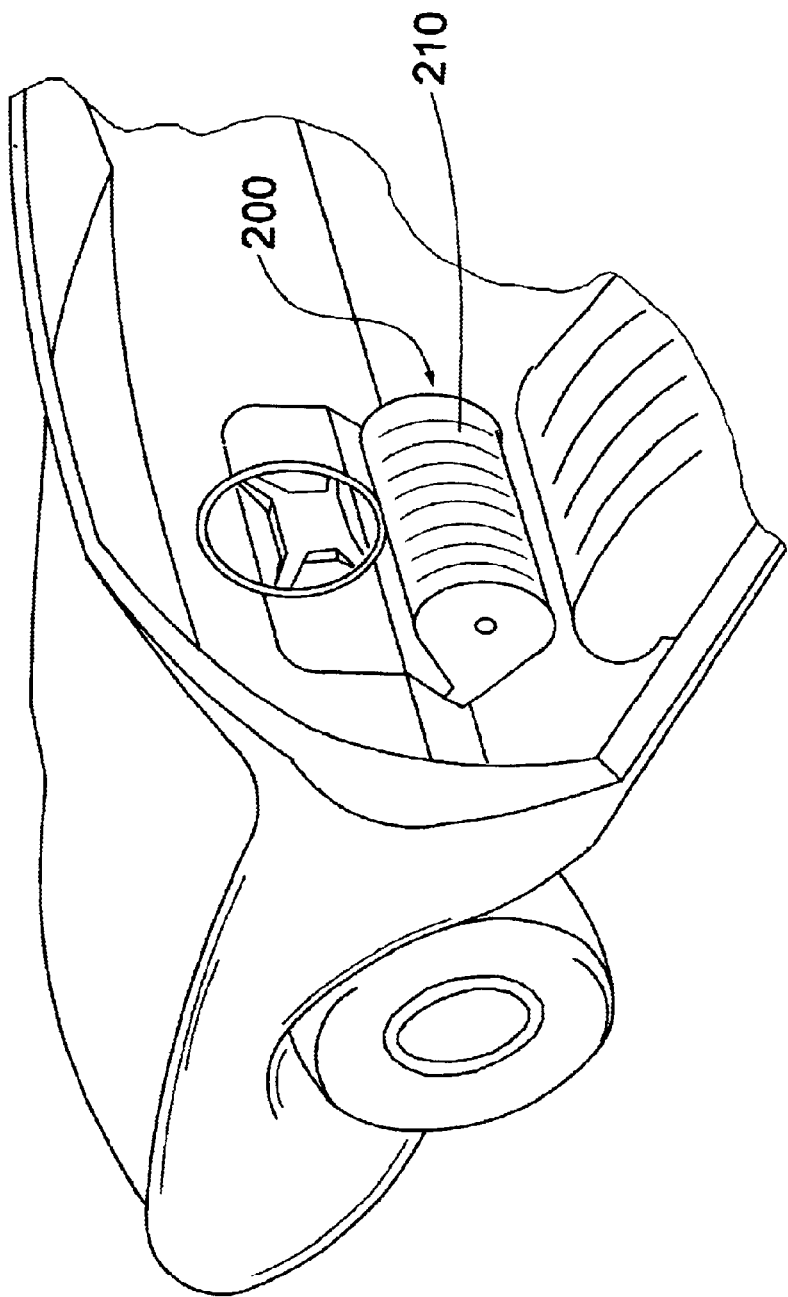
FIG. 4 is a perspective view of a preferred embodiment of the airbag module in accordance with the invention used for knee protection shown in the deployed condition.

One particular application for the design of FIG. 3A is for use as a knee protection airbag as shown in FIG. 4. FIG. 4 illustrates a preferred embodiment of the present invention used as a knee protection device for the front driver and passenger occupants. The airbag module is shown deployed generally at 200 in FIG. 4 and includes an airbag 210. The airbag 210 is designed to interact with the driver's knees, not shown, and with the body of an occupant who may be lying down, also not shown. In this manner, the airbag 210 protects not only the knees of the driver from injury but also protects a child lying on the front seat, for example.

Knee airbags have heretofore been commercially used only as part of the front passenger airbag system where they have been inside of and in conjunction with the passenger airbag and inflated by the passenger airbag inflator. Current front passenger airbag systems are all mid or high mount systems where it is no longer convenient to mount a knee airbag inside of the passenger airbag or to use the same inflator. The exemplifying embodiment shown in FIG. 4 uses a separate airbag system with its own inflator. This is only now made practical by the low cost efficient airbag module design disclosed herein. The airbag module 200 for controlling inflation of the knee airbag 210 may have any of the constructions disclosed herein.

Figure 5:
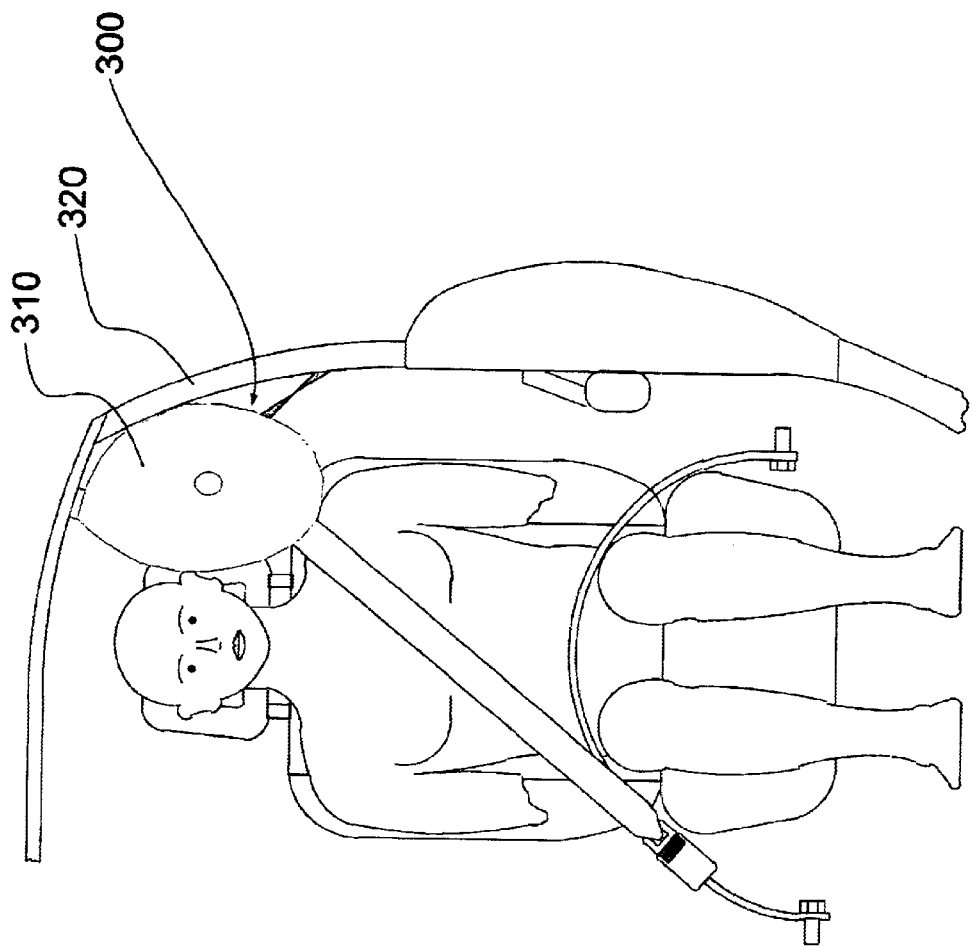
FIG. 5 is a view of another preferred embodiment of the invention shown mounted in a manner to provide head protection for a front and a rear seat occupant in side impact collisions and to provide protection against impacts to the roof support pillars in angular frontal impacts.

FIG. 5 illustrates another possible mounting location for the airbag module, shown generally at 300, in accordance with the invention and including a deployable airbag 310. In this embodiment, the airbag 310 will be deployed from the ceiling in the event of a side impact of sufficient severity that an occupant's head would otherwise be injured. This implementation is significant since the airbag for the front and rear seats are combined, i.e., the airbag deploys along substantially the entire side of the vehicle alongside both the front seat and the rear seat, which results in significantly greater protection in side impacts when the windows are broken. The airbags are less likely to project outside of the windows if they are restrained by the B-pillar 320 and other vehicle structures such as the A-pillar 322 as shown in FIG. 1. This support is achieved since the module extends forward almost to the windshield and is mounted adjacent to but somewhat away from the side of the vehicle. When the airbag deploys, therefore, it is partially restrained by the A-pillar further aiding the retention of the occupant's head within the vehicle. As noted above, airbag 310 may comprise a number of airbags controlled to deploy simultaneously by means of a common inflator system and the airbag module 300 for controlling inflation of the side airbag 310 may have any of the constructions disclosed herein.

As discussed above, the steering wheel and steering column are among the most dangerous objects in the automobile. Even with airbags and seatbelts many people are still injured and killed by an impact with a steering wheel rim, spokes or hub, or by the airbag as it is deployed from the steering wheel hub. The steering column also significantly interferes with the operation of many knee bolster designs causing significant leg and knee injuries. With today's technology, neither the steering wheel nor steering column are necessary and only bring harm to drivers. Naturally, a substantial educational program is necessary to wean people away from the false feeling of security of a substantial steering wheel and steering column. However, if it can be shown to the population that a vehicle with a servo electronic steering system (called steer-by-wire) is considerably safer, then the battle can be won. Such a system is common in commercial aircraft although a steering wheel is still usually used.

Figure 6:
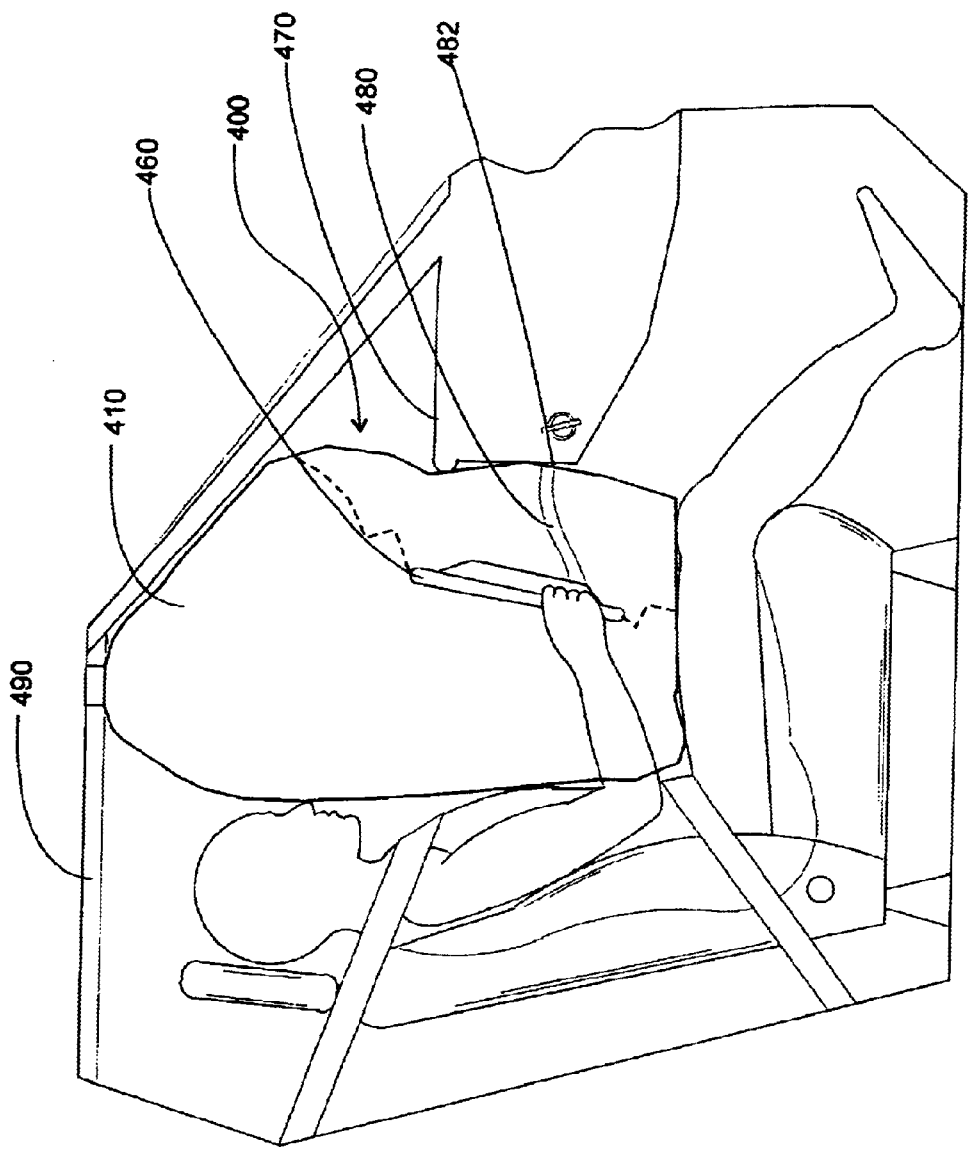
FIG. 6 illustrates still another preferred embodiment of the invention used to provide protection for all front seat occupants in a vehicle which incorporates servo power steering.
Figure 7:
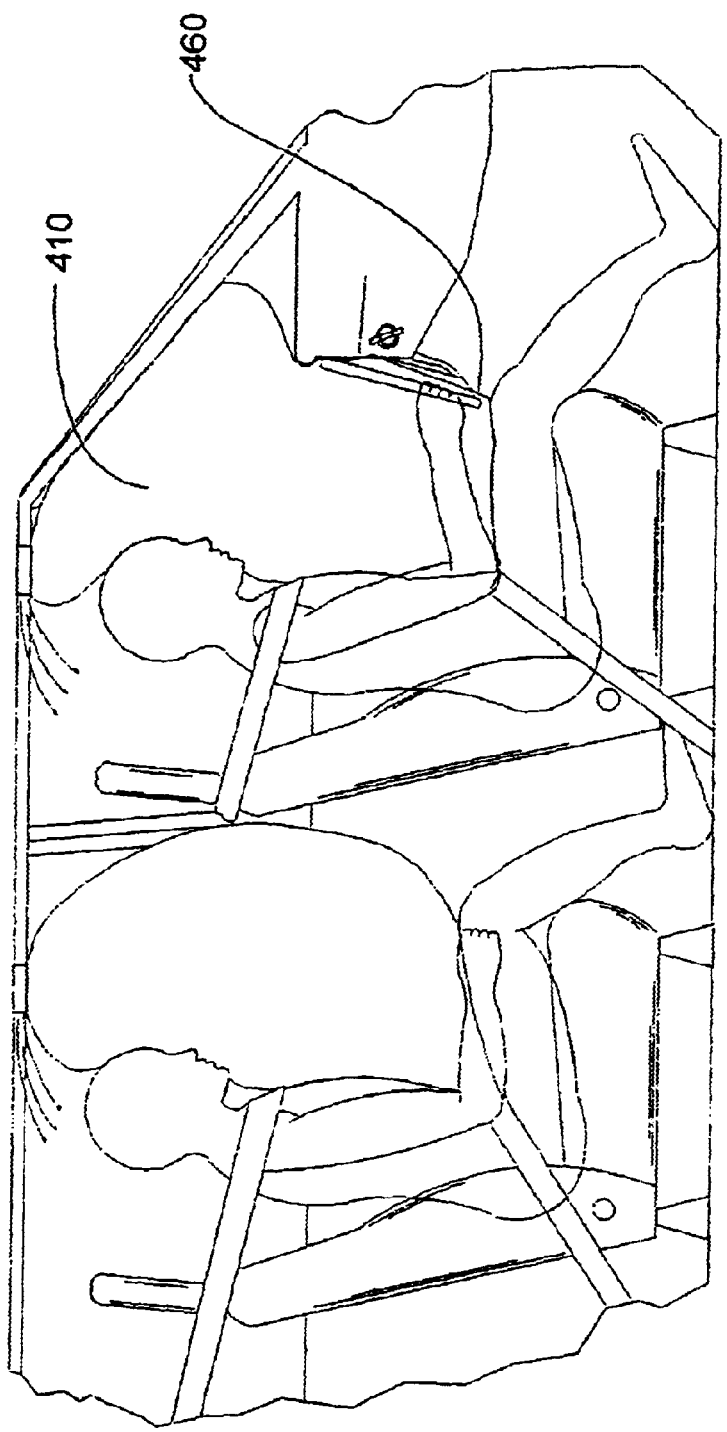
FIG. 7 is a view as in FIG. 6 showing the flow of the inflator gases into the passenger compartment when occupants begin loading the airbag.

One implementation of a driver protection airbag system which is deployed from the ceiling 490 coupled with a steer-by-wire system is illustrated at 400 in FIG. 6 which is a partial cutaway view of a driver in an automobile. The conventional steering wheel and column have been eliminated from this vehicle and a thinner, lighter steering wheel 460, which projects from an instrument panel 470, is provided instead. The steering wheel 460 is attached to a deformable column 480 which is supported by the instrument panel 470. In the event of an accident, the steering column 480 easily bends at the connection point 482 with the instrument panel 470 and permits the steering wheel 460 to be displaced or to be rotated out of the way, i.e., to make room for the deploying airbag as illustrated in FIG. 7. In this embodiment, a single airbag 410 is deployed downward from the ceiling 490 to protect all occupants in the front seat of the vehicle, and thus is elongate extending substantially across the entire width of the passenger compartment of the vehicle.

If some energy absorption is desired, the steering wheel support 480 can be made in the form of an elastic spring which is designed to provide a nearly constant force versus deflection relationship which aids the energy absorption of the airbag. The steering wheel and support in FIG. 6 is shown with the airbag wrapped around, which somewhat reduces the energy absorption effects of the airbag. Other implementations are to pull the steering wheel into the instrument panel space using pyrotechnics, a mechanical linkage (as in the Pro-Con-Tem system) or to release the support so that the airbag itself moves the steering wheel out of the way. Naturally, if alternate steering systems can be sold to the public, the steering wheel and support can be eliminated entirely and replaced by a device mounted onto or between the seats or on the floor, for example. Even steering mechanisms mounted to the door or ceiling are possible. Many other steering systems which do not interfere with the airbag will now be evident to those skilled in the art.

FIG. 7 illustrates the positions of front and rear seat airbags as well as of the steering wheel and steering support after the airbags have deployed and the occupants have begun moving forward. Deployment of the front and rear seat airbags may be controlled to occur simultaneously.

Figure 8:
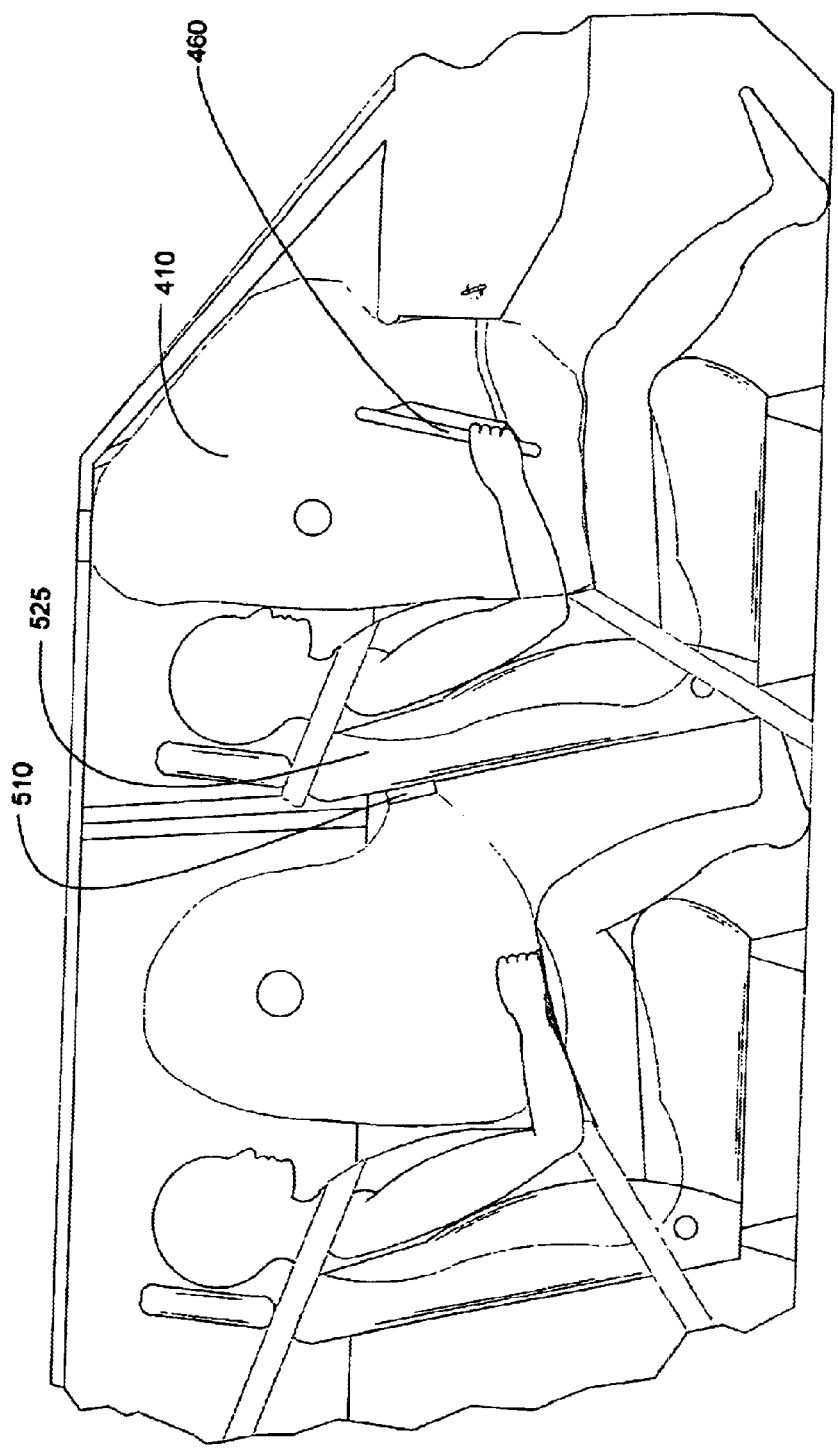
FIG. 8 shows the application of a preferred implementation of the invention for mounting on the rear of front seats to provide protection for rear seat occupants.

FIG. 8 illustrates another implementation of the airbag module of this invention. In this case the module 510 is mounted to the rear of the front seats 525 of the vehicle and is designed for those cases where a ceiling mounted system is not desired or practical. In this case, two airbag modules 510 are provided, one in the back of each of the front seats 525. Naturally, a single airbag can be used for vehicles with bench seats.

A primary advantage of the linear, elongated module disclosed herein is that it can be mounted on the surface of the ceiling, instrument panel, seat back, or other appropriate surface. In some cases, the module is literally attached to the mounting surface while more commonly it is recessed so that the surface of the module is approximately flush with the surrounding surfaces prior to deployment. In most cases, however, the depth of penetration into the mounting surface will be small and less than ⅕ of the module length and in most cases less than ⅒ of the module length. For the purposes of this disclosure, therefore, mounting on a surface will mean mounting so that the penetration into the surface will be less than ⅕ of the module length.

The preferred material for the gas generator housing in accordance with the invention is steel in order to withstand the pressure and temperature from the burning propellant. It is possible to make the inflator housing from a high temperature plastic; however, the propellant tube in this case will be considerably thicker. Plastic can be used in the inflator in accordance with the invention since the propellants generally used burn completely in a very short time period and do not leave a hot residue. Thus, there is little time for the heat to penetrate into the plastic housing. For this same reason, the inflator in accordance with the invention can be mounted adjacent to combustible materials without fear of starting a fire.

In the preferred embodiment of the airbag module of this invention illustrated in FIGS. 1 and 2A, the length of the module was approximately the same as the length of the airbag. This permits the airbag, especially if made of film, to be easily rolled or folded with the portions of the airbag which project beyond the module easily accommodated without the special endwise folding required in conventional inflators. This results in a uniform geometry and symmetry for the airbag module and permits the module to be easily made in any convenient length. Additionally, the long thin design permits the module to be bent somewhat so as to conform to the surface of the location where it is mounted. This geometry also permits the airbag to unfold much more easily and in considerably less time than with conventional designs. Thus, the airbag system of this invention can be deployed in less time with less force and thus with less danger of deployment induced injuries than with conventional designs.

In a particular example used in this application, the cover is mechanically pushed off by the expansion of the airbag, or the displacement of the module, progressively from one end to the other much like a zipper. In other applications it may be required to pyrotechnically cut or eject the cover which would require separate pyrotechnic devices. Also, in the examples illustrated herein, the module cover has been pushed off and removed from the module. Although this is the preferred method, other designs could remove the cover by cutting an opening in the material which covers the module. In such cases, the existence of the module could be completely hidden through the use of a seamless covering and only cut open when it is required for deployment of the airbag. For the purposes herein, therefore, removal of the cover will include any method by which an opening is provided to permit the airbag to deploy.

The propellant and gas generator assembly are shown with an approximate rectangular cross section so that once the propellant begins burning the surface area neither decreases or increases as the inflator propellant is consumed. In some cases, it may be desirable to vary the burn rate of the propellant by changing the surface area which is burning. If the cross section area of the inflator, and thus of the propellant, were made triangular, for example, with a wider base and narrower top, the rate of gas generation would increase as the propellant burns. Conversely, if the base of the propellant were narrower than the top, the opposite would occur and the propellant will begin burning fast and slow down with time. Naturally, the shape of the inflator housing can be infinitely varied to achieve any reasonable variation in propellant burn rate with time desired. For complicated shapes, it is necessary to cast the propellant in place in the tube which also helps the propellant to adhere to the surfaces of the gas generator housing.

It is also noted that U.S. Pat. No. 5,060,973 discloses the use of a liquid propellant. Central to this patent is the method of injecting the liquid from its container into a combustion chamber. A liquid propellant has an important advantage that many such propellants, and the particular one disclosed in this patent, burn without producing solid particles which could clog the high pressure nozzle or burn holes in a film airbag. The purpose of the injection system is to control the burning rate of the fuel. In solid fuel inflators, this is done by shaping the surface of the propellant as discussed above.

The burning surface can also be controlled in the geometry of the inflator in accordance with the present invention by increasing the viscosity of the liquid through an emulsifying process or, alternately, by placing a solid matrix within the tube which is non-combustible such as one made from glass fibers. These fibers therefore serve to hold the liquid propellant in a position where the burning surface area is known and thus the burning rate controlled. Naturally, other methods of controlling the liquid burn rate without resorting to an injection system will now become apparent to those skilled in the art.

In addition, the liquid propellant can be used in a separate inflator housing such as disclosed in the discussion above with reference to FIG. 2H. This invention is not limited to the use of liquid or solid propellants but also contemplates the use of stored gas, hot gas, hybrid or other designs.

Figure 9:
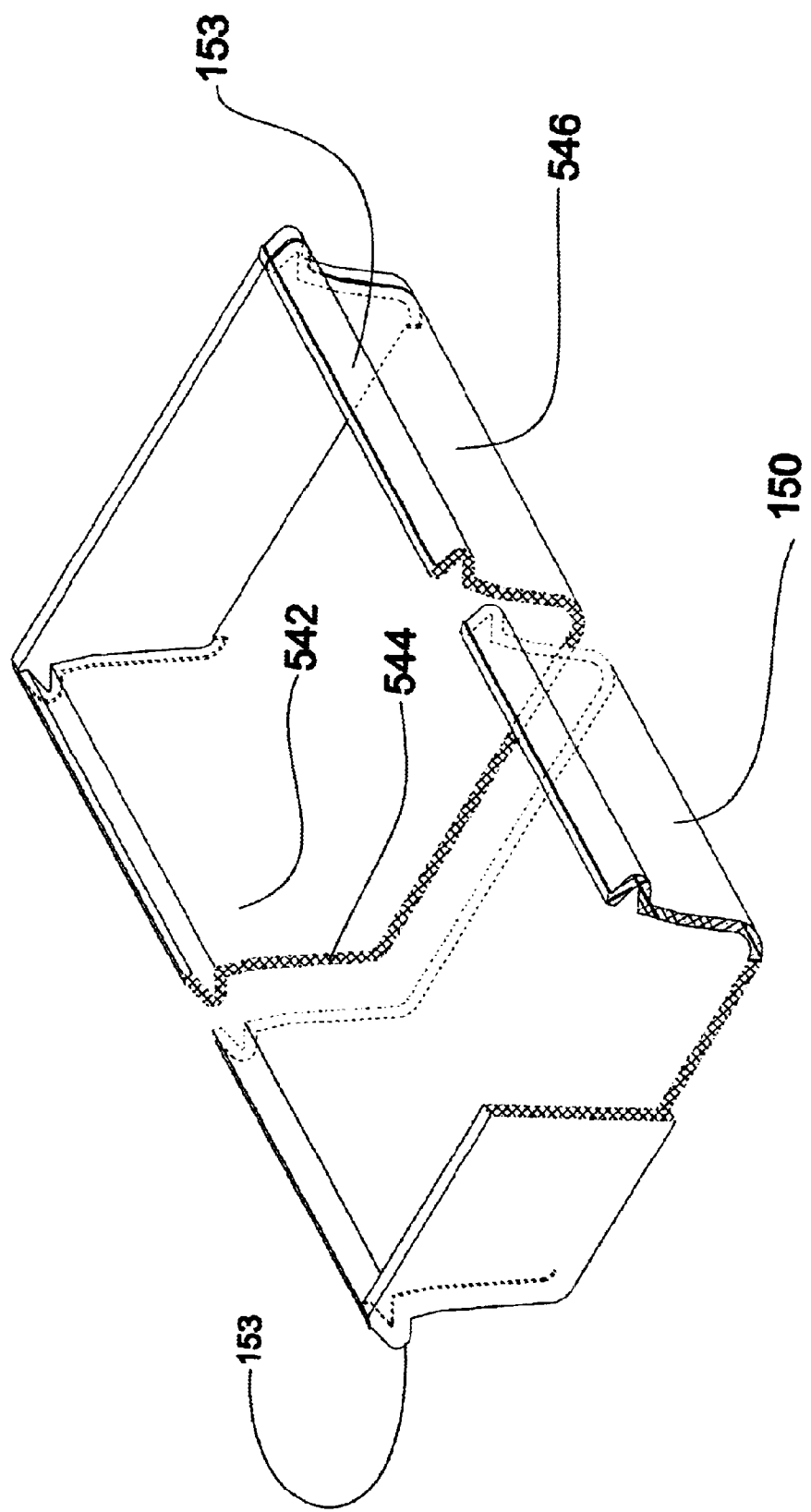
FIG. 9 is a perspective view of a typical module cover design as used with the embodiment of FIGS. 2A–FIG. 2H.

A perspective view of a preferred cover design is shown generally as 150 in FIG. 9. The cover 150 comprises a semi-rigid molded plastic backing material 542 covered with a foam 544 and skin 546 or other combinations of materials to be compatible with the vehicle roof liner, instrument panel or other mounting location. Tabs 153 are placed in the cover to interlock with corresponding catches 152 on the module housing base. When pressure builds beneath the airbag, it causes the airbag to bulge pulling tabs 153 out of engagement with catches 152 in the progressive manner as described above. The cover 150 is then free to move and will in general be projected downward by the deploying airbag. Since the cover 150 has a low density, it will not cause injury even if it impacts an occupant.

In the example shown in FIG. 9, the cover 150 can be attached to the airbag by an adhesive or other suitable means. When the airbag deploys the cover adheres to the airbag on the side away from the occupant thereby generally preventing interaction between the occupant and the cover.

With the development of the film airbag as described in the patents referenced above, and the inflator design described herein, a very thin airbag module is possible which can be made in any length. Typically, the module length will exceed about 10 to 20 times the width or thickness of the module, and in all cases at least about 5 times. The length of the gas generator will typically be about 40 to 80 times its thickness and in all cases at least about 10 times. This shape permits the module to be easily mounted in many locations and to be bent or curved to match the interior shape of the vehicle. For example, one could be positioned so as to conform to the ceiling to protect rear seat occupants. Another one could stretch the length of the car on each side to protect both front and rear occupants from head injuries in side impacts. A similar system can be used for a deployable knee bolster, and eventually a single module can be used for both the passenger and driver in frontal impacts when used in conjunction with an servo electronic steer-by-wire system, for example. With the economies described above, airbags of this type would be very inexpensive, perhaps one-fifth to one-tenth the cost of current airbag systems offering comparable, or inferior, protection.

The airbags described herein would be easily and inexpensively replaceable. They would require only a single connection to the vehicle safety system. Although the bags themselves would not be reusable, in some cases the airbag covers could be.

The designs illustrated herein are simple and because of their small cross-section can be easily mounted to conform to interior vehicle surfaces. They are very efficient, in some cases requiring less than 1/10 of the amount of propellant that is required by competitive conventional systems. The particular designs are also easily manufactured. Since they use less propellant, the noise and problems with high pressures when multiple airbags are deployed are greatly reduced. They also offer protection in cases such as the sleeping child which has heretofore not been available. These designs as disclosed herein, therefore, provide all of the objects and advantages sought.

Furthermore, several different airbags are shown for protecting occupants of the vehicle, i.e., the rear airbag 100 shown in FIG. 1, the knee airbag 210 shown in FIG. 4, the side airbag 310 shown in FIG. 5 and the front seat airbag 410 shown in FIG. 6. Simultaneous deployment of any combination of even all of these airbags may be initiated by the sensor and diagnostic module 180 upon determining that a crash requiring deployment of such airbag(s) is required. Thus, the sensor and diagnostic module 180 may determine that deployment of only the front airbag, knee airbag and the side airbag are desired, for example in the case of a frontal crash, or possibly only the side and rear seat airbags in the event of a side impact. Accordingly, sensor and diagnostic module 180 may be designed to detect frontal impacts requiring deployment of airbags as well as side impacts requiring deployment of airbags and rear impacts requiring deployment of airbags.

In the following, a vehicle having multiple airbags, preferably arranged in connection with any one of the constructions of the airbag module described above (but which arrangement is not essential to the invention), is described in conjunction with toxic gas reducing arrangements which serve to reduce the concentration of toxic gas in the passenger compartment during or after deployment of the airbags. These toxic gas reducing arrangements may of course also be used even for vehicle with only a single airbag.

Figure 10:
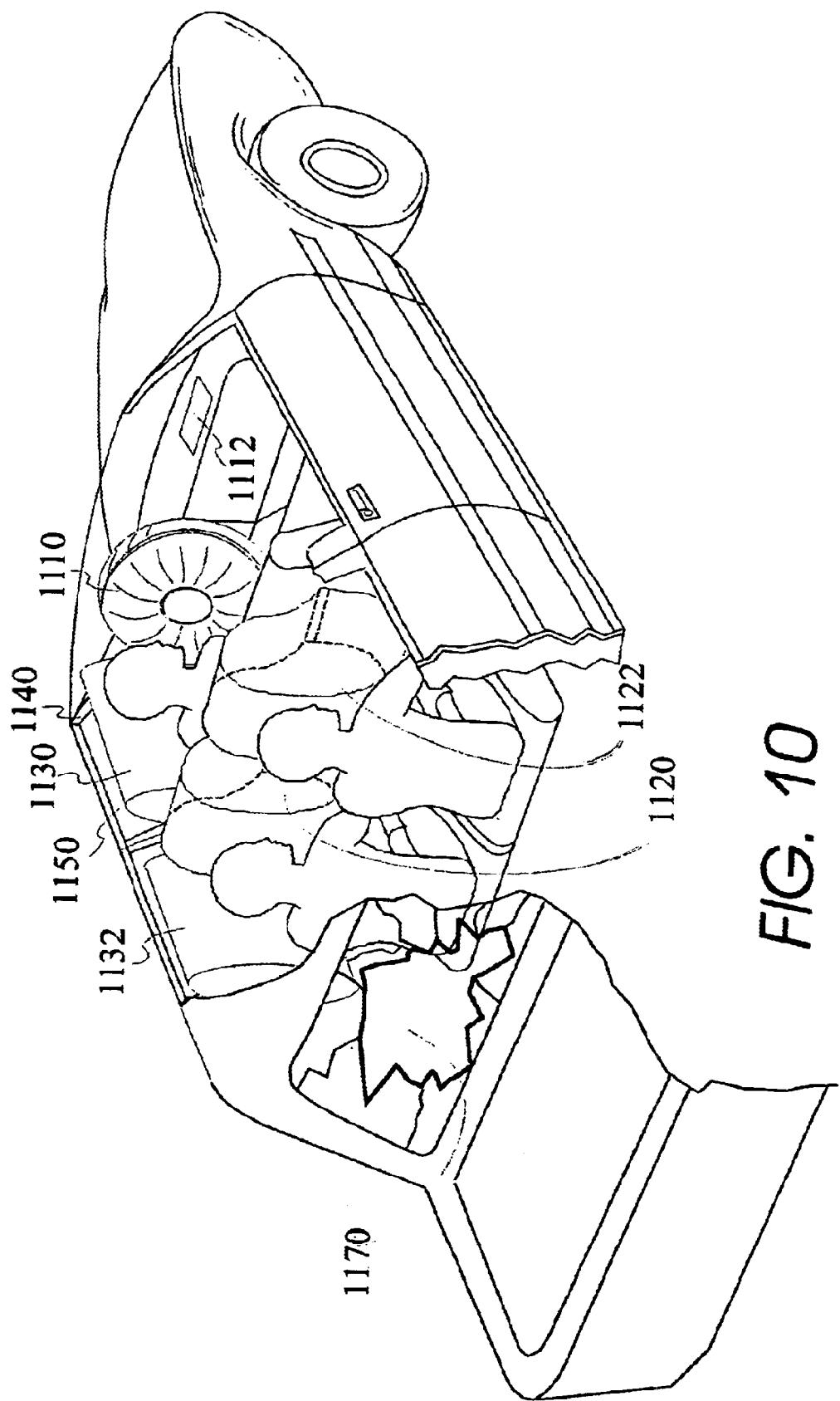
FIG. 10 is a perspective view with portions removed of a vehicle having several deployed airbags and a broken rear window.

A perspective view of a vehicle having several deployed airbags for both front and side protection is shown in FIG. 10. The vehicle includes frontal protection airbags 1110, 1112, 1120, 1122 and side/head protection airbags 1130, 1132, each of which is coupled to an airbag module (not shown) whereby each module may include one or more airbags as well as gas generation means for inflating the airbag(s), attachment means for attaching the airbag to and in fluid communication with the gas generator means and initiation means for initiating the gas generator means in response to a crash of the vehicle. A rear window 1170 of the vehicle has been broken or ejected for the reasons and in the manner described below. The driver side frontal airbag 1110 has been deployed as well as the ceiling mounted side head protection airbag 1130. In this case, the sensing system for controlling the deployment of the airbags, not shown but which is coupled to all of the airbag modules, detected that the crash had an angular component which might have resulted in head injuries to the occupant from impacts with an A-pillar 1140 or a side window 1150 of the vehicle, so the sensing system determined that deployment of the side head protection airbags 1130 and 1132 was warranted, along with deployment of the frontal protection airbags 1110, 1120 and 1122. The front passenger seat was unoccupied, which was detected by the occupant position sensor, not shown, and therefore the corresponding frontal protection airbag 1112 and left side protection airbags (not shown) were not deployed. Since both rear seats were occupied, the appropriate rear seat protection airbags 1132, 1120 and 1122 were deployed. It is thus possible to selectively control or determine which airbags of a plurality of airbags, e.g., side/head protection airbags, frontal protection airbags, in a passenger compartment of a vehicle should be deployed depending on the crash conditions to thereby avoid unnecessary airbag deployment. Although the sensing system which determines which airbags require deployment is not shown, this system may include or be connected to occupant sensing means for sensing which seats are occupied.

As described above and in U.S. Pat. No. 5,505,485, a desirable inflator for use in this airbag system is of the non-sodium azide highly aspirated type and the most desirable airbags are made from plastic films. It is contemplated that the inflators of the '485 patent may be used in accordance with the invention and the entire description of the inflators of the '485 patent are incorporated herein by reference. By using such inflators, the pressure rise in the passenger compartment resulting from deployment of the airbag is kept to a minimum. If the pressure rise is still excessive, it is easily vented by the removal of the glass from the rear window 1170 by suitable means as described below. In this case, even though multiple toxic inflators are used, the concentration of toxic gas in the vehicle is quickly reduced as a result of the absence of the window 1170 and the fact that the inflator gases are hotter than the ambient temperature and thus rise to the ceiling and then flow out of the broken window 1170.

Obviously, although the rear window 1170 was chosen for removal, any of the side windows could also have been chosen or even a sunroof if one is present, and even though a single window was chosen, multiple windows could also be removed or forcibly broken. In some cases described below, the glass in the window will be broken and in others it will be ejected. If the window is made from tempered glass, it will break into small harmless pieces that will be ejected from the vehicle due to the higher pressure within the vehicle.

The airbag systems shown in FIG. 10 provide protection of the occupant against impacts with various vehicle structural members such as the A-pillar, B-pillar and C-pillar (see the definitions above). Federal law now requires protection from impacts with these pillars, which is difficult to achieve due to the limited space available for padding, and therefore the law is weak and thus not very effective. A side impact airbag such as 1130 coming down from the ceiling can offer excellent protection from impacts with these pillars. For this reason, it will be desirable in many cases to deploy the side bags when the frontal impact airbag is deployed since a significant number of occupants are still being injured in frontal impacts, even though the airbag deployed, by impacts with the A-pillar and the B-pillar.

The airbag systems shown in FIG. 10 include airbags coming out of the steering wheel, the ceiling and the back of the front seat. It is obvious though that airbag modules can be mounted at other locations in the passenger compartment such as the lower instrument panel for knee protection or the ceiling for driver protection or rear passenger protection, as described above.

Figure 11B:
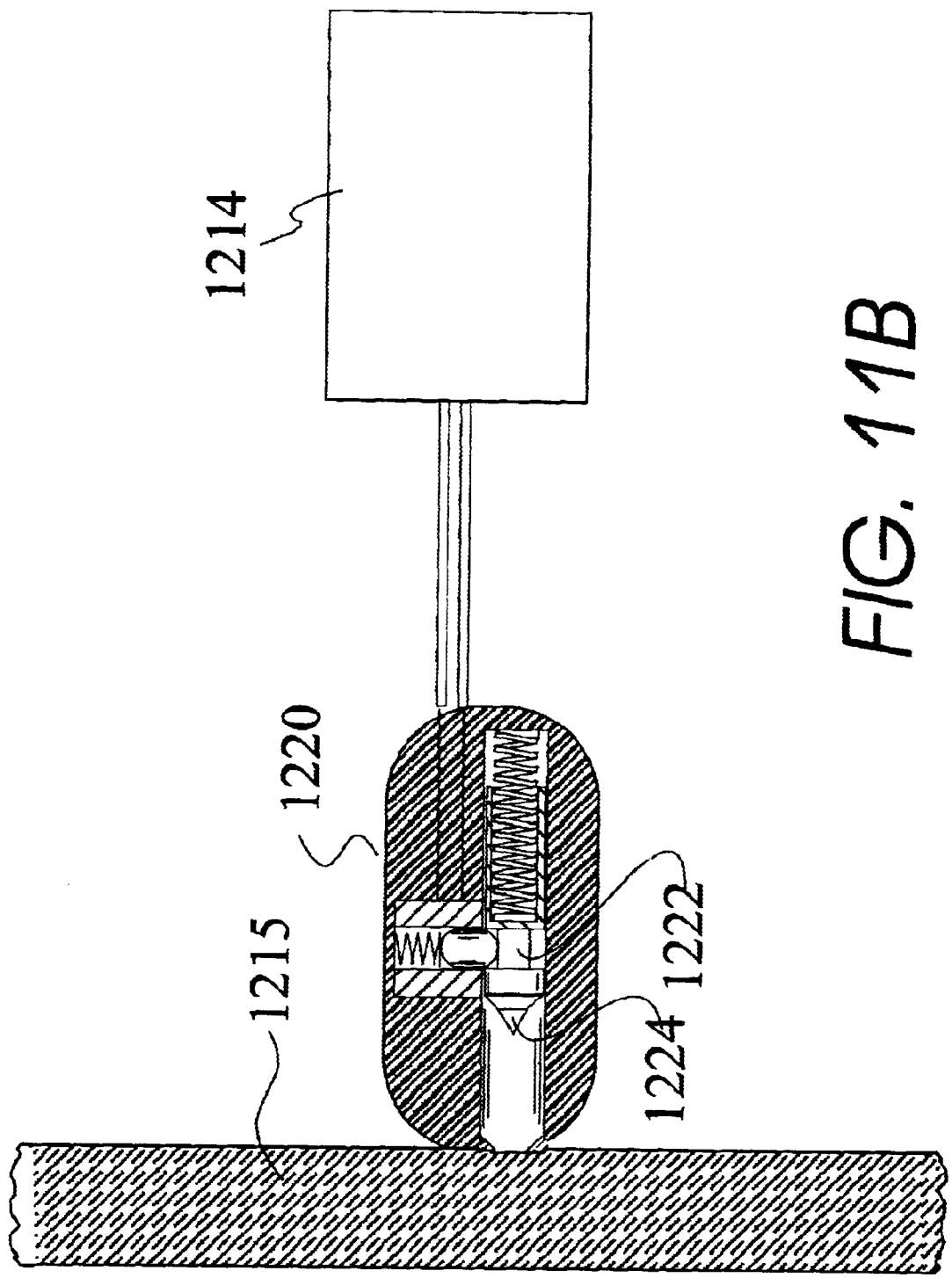
FIG. 11B is a fragmented partially schematic cross-sectional view of an electromechanical window breaking mechanism used in accordance with the present invention.

FIGS. 11A, 11B and 11C illustrate various methods by which the glass in a window can be removed, in order to provide for a reduction in the pressure generated in the passenger compartment by the deployment of airbags as well to enable the exhaust of toxic gases therefrom. In FIG. 11A, a fragmented partially schematic cross section view of a pyrotechnic window breaking mechanism is illustrated generally at 1200. It comprises a wire 1212 leading from a vehicle crash sensor system shown schematically at 1214 and an electric squib, primer or detonator 1210 which is housed in a housing and is positioned against a portion of window glass 1215. When the sensor system 1214 determines that the vehicle is experiencing a crash, for which deployment of an airbag is warranted, it sends a signal to the airbag module, not shown, and a separate circuit also carries a current or other electronic signal to the window breaking squib 1210 through wire 1212. When the squib 1210 is ignited a small but strong shock impulse is transmitted to the glass surface which is sufficient to shatter the window 1215. As noted above, the squib represents the entire class of electrically initiated pyrotechnic devices capable of releasing sufficient energy to cause a vehicle window to break. Some such devices, for example, use a heated bridge wire while others use a semiconductor bridge or a laser initiation system.

In FIG. 11B, an electromechanical window breaking mechanism is illustrated generally at 1220 and comprises a housing abutting against a portion of window glass 1215. In this embodiment, a current or other signal from the vehicle crash sensor system 1214 releases a spring loaded impacting plunger 1222 arranged in the housing and having a hardened sharp tip 1224 similar to a machinist's center punch. When the tip 1224 travels through a release aperture in the housing and impacts the glass 1215, it causes the glass 1215 to shatter. An alternative to the electrical release of the plunger 1222 would be to use a mechanical sensor which responds to the crash itself. It is well known that a spring loaded center punch if impinged onto a window of an automobile will shatter the glass. Their use by vandals and thieves for this purpose is why their sale to the general public is not permitted in at least one state.

Another method for removing the glass from a window is illustrated in FIG. 11C that is a fragmented cross section view of a window release mechanism where the window is completely ejected from the vehicle when the pressure in the vehicle exceeds a predetermined design value. This value is selected such that the window can only be ejected if more than two airbags are deployed. In this case, pressure on the glass surface 1215 creates a force along edges 1216 of the glass which is normally positioned within a mounting structure and retained therein by a gasket 1217. When that force exceeds the retaining force of the mounting gasket 1217, the window is released and is ejected by the gas pressure within the vehicle.

An alternate method to enable removal of glass during deployment of more than one airbag as a result of excessive pressure generated within the passenger compartment by deploying airbags is to design the temper in the glass so that if the glass is stressed by internal vehicle pressure above a predetermined amount, the outer surface of the window would be placed into tension at which point it shatters. The breaking of a vehicle window is not a serious condition and in fact it almost always happens in side impact accidents where an airbag is desired. In another implementations, not shown, the force created by the pressure on the entire window or door surface is used to deform all or part of a mechanism to the point that a spring loaded impacting pin is released to shatter the window in a similar manner as described above. Naturally, other methods will now be obvious to those skilled in the art.

As discussed above, in addition to providing a release for the excessive pressure associated with the deployment of multiple airbags, a prime reason for creating a large opening in the vehicle in the event of an accident, is to permit the use of propellants other than sodium azide whereby toxic gases produced by these propellants would be exhausted from the passenger compartment through the broken or removed window. If the passenger compartment of the vehicle is vented, vis-a-vis the aperture created by the shattered or removed glass, nitrocellulose, nitroguanidine, and other double and triple base formulations, tetrazole (see U.S. Pat. No. 4,909,549 to Poole et al.) or similar propellants can be used for all of the inflators in the airbag system in view of the fact that the passenger compartment is no longer sealed and any toxic gases would be vented out of the passenger compartment. This is not done now because of the excessive amount of carbon dioxide, and other contaminants, which are produced and the requirement that the gas in the passenger compartment be breathable for some set period such as one hour. If one of the above propellants is used in conjunction with a glass shattering or removal system, the size and weight of an inflator could be reduced by a factor of two or more and, if efficient aspirating systems are also used, an additional factor of about four can be achieved resulting in an inflator which is about one eighth the size of conventional inflators.

Figure 12:
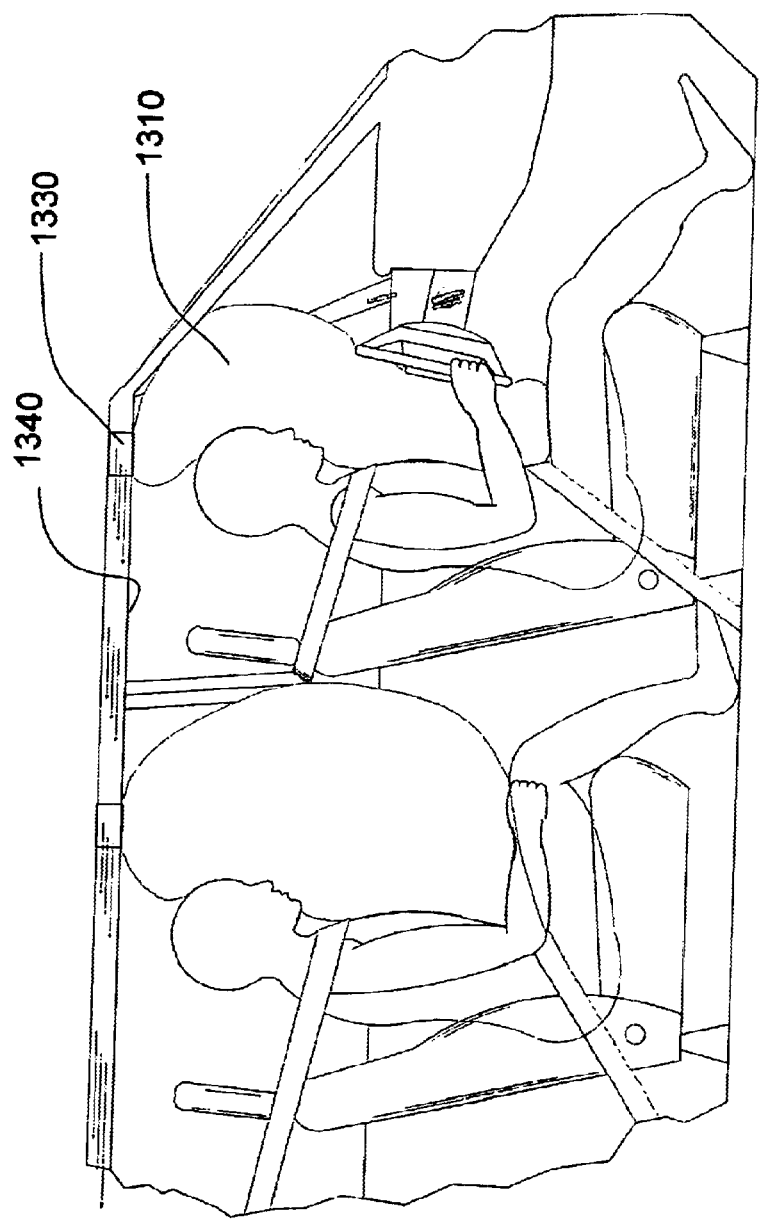
FIG. 12 is a fragmented view of a vehicle with the side removed with two inflated airbags showing the airbag gases being exhausted into the ceiling of the vehicle.

An alternate method of eliminating the buildup of toxic gas in the passenger compartment is to exhaust one or more of the airbags out of the vehicle as shown in one example in FIG. 12. In this embodiment, the gas in ceiling-mounted airbag 1310 is exhausted into a vent 1330 located in a ceiling 1340 of the vehicle. Vent 1330 leads outside of the vehicle and thus as the airbag 1310 deflates the gas does not enter the vehicle passenger compartment where it would be breathed by the occupants. Naturally, this technique could be used by other airbags which are mounted in the door or instrument panel. There has been a reluctance to use this technique for the front passenger frontal impact protection airbag since this would require that a hole be placed in the firewall partially defeating the very purpose of the firewall which is to prevent fumes or even flames from the engine compartment from entering the passenger compartment. This would not be a problem for the ceiling or door mounted airbags.

Figure 13:
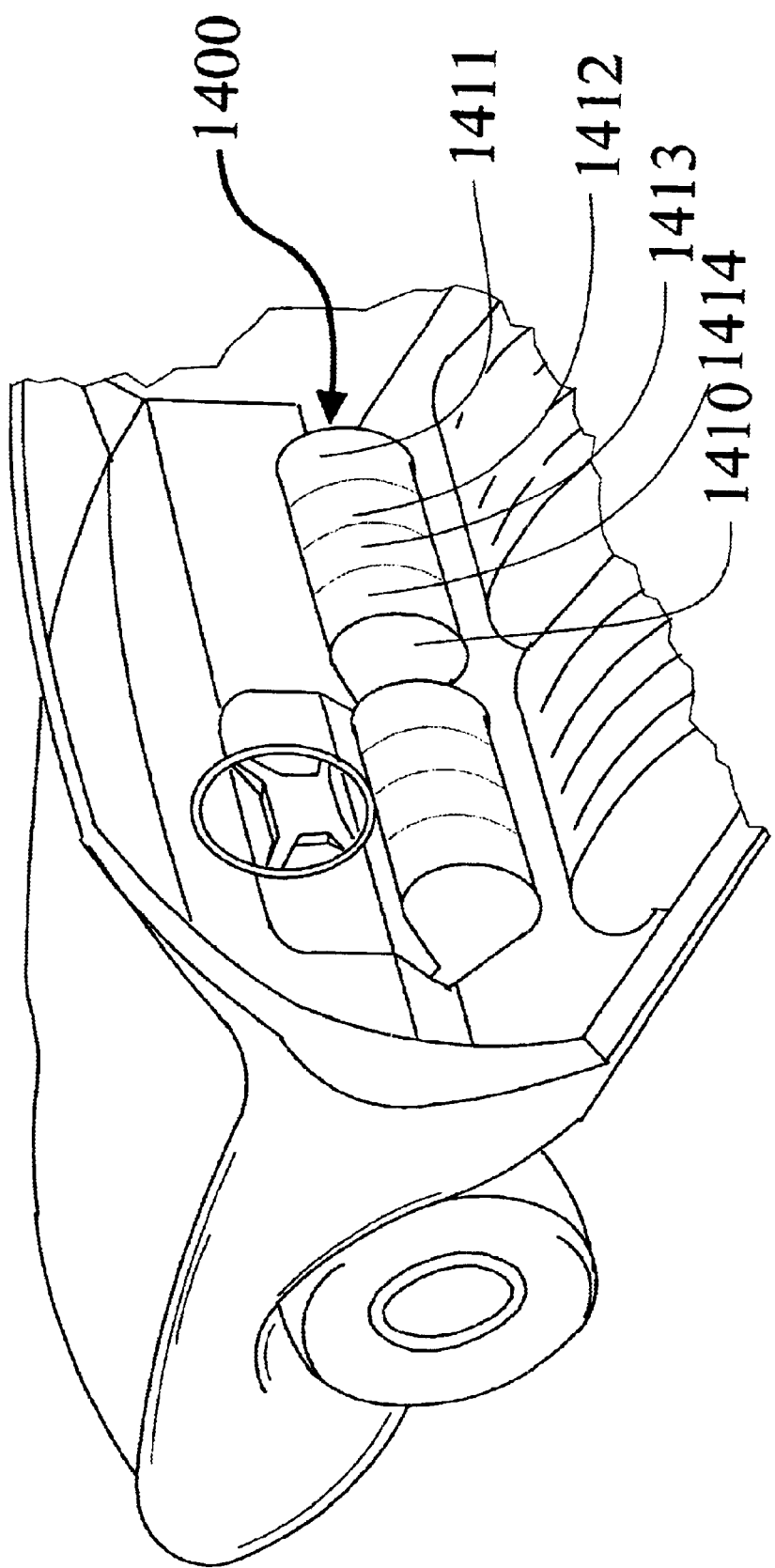
FIG. 13 is a perspective view of two knee restraint airbags of a size sufficient to support the driver's knees.

An example of a knee airbag is illustrated in FIG. 13 which is a perspective view of a knee restraint airbag illustrating the support of the driver's knees and also for a sleeping occupant lying on the passenger seat of the vehicle (not shown). The knee support airbag shown generally at 1400 comprises a film airbag 1410 which is composed of several smaller airbags 1411, 1412, 1413, and 1414 as disclosed above. Alternately, the knee airbag can be made from a single film airbag as disclosed in U.S. Pat. No. 5,653,464 referenced above. The knee support airbag can be much larger than airbags previously used for this purpose and, as a result, offers some protection for an occupant, not shown, who is lying asleep on the vehicle seat prior to the accident.

With the development of the film airbag and the inflator design above, a very thin airbag module becomes possible as disclosed in U.S. Pat. No. 5,505,485 referenced above. Such a module can be made in any length permitting it to be used at many locations within the vehicle. For example, one could be positioned on the ceiling to protect rear seat occupants. Another one would stretch the length of the car on each side to protect both front and rear occupants from head injuries in side impacts. A module of this design lends itself for use as a deployable knee restraint as shown in FIG. 13. Eventually, especially when drive-by-wire systems are implemented and the steering wheel and column are redesigned or eliminated, such an airbag system will be mounted on the ceiling and used for the protection of all of the front seat passengers and driver in frontal impacts. With the economies described above, airbags of this type will be very inexpensive, perhaps one-fifth the cost of current airbag modules offering similar protection.

As mentioned above, when multiple airbags are deployed in a crash, the sound pressure level becomes excessive to the point that injuries to human ear drums can result. To minimize such injuries, airbag system designers have resorted to staging the deployment of the driver and passenger airbags so that the peak deployment noise pressure is reduced. These systems have the delay circuitry as part of the sensor and diagnostic circuitry that complicates the design of this circuitry and increases its cost and reduces the reliability of the system. An alternate and much simpler system is disclosed in FIG. 14A which is a detailed cross section view showing the inflator squib incorporating a pyrotechnic delay element.

FIG. 14 shows an airbag module 1510 having one airbag 1500 connected therewith, although it is of course possible to have a plurality of airbags connected to a single module, and the module is connected to sensor and diagnostic circuitry, shown schematically at 1580, which sends current or a signal to all of the airbag modules connected thereto which are to be deployed in a particular crash. As shown in FIG. 14, module 1500 comprises the airbag 1510 and an inflator assembly 1520 coupled thereto. The inflator assembly 1520 comprises a chamber housing a propellant 1530, an initiator 1535 coupled through passages in the inflator assembly to the propellant 1530 and a squib assembly 1540 engaging with the initiator 1535. The squib assembly 1540 is connected to the sensor and diagnostic circuitry 1580 which will determine activation of the squib assembly 1540 and thus ignition of the propellant 1530 to generate gas for inflating the airbag 1500. The squib assembly 1540 is shown in an expanded view in FIG. 14A taken within the circle labeled 14A in FIG. 14. The squib assembly 1540 comprises a burn-wire electrically initiated squib 1541 and a pyrotechnic delay element 1542 adjacent thereto. The squib 1541 is spaced and isolated from the initiator 1535 by the delay element 1542 thereby avoiding premature initiation. The delay element 1542 is capable of providing any desired delay from fractions of a millisecond to several milliseconds and is sometimes made from a coiled tube containing a propellant or other pyrotechnic material. Such delay devices are well known to those skilled in the art of designing pyrotechnic delays primarily for military uses.

An alternate mechanical method can be used since pyrotechnic delay elements yielding a few millisecond delay are expensive. One embodiment is illustrated in FIG. 14B which shows a delay producing device where the electric squib assembly 1540 causes the ignition of a burn-wire electrically initiated squib 1541 which upon ignition releases a firing pin 1546. The firing pin 1546 is then propelled by a spring 1547 through a passage in the squib assembly 1540 into a stab primer 1548 which initiates deployment of the airbag, by means of the activation of the initiator 1535. The length of travel and the mass of the firing pin can be adjusted to provide the required delay. In the normal position, the squib 1541 retains the firing pin 1546 against the expansion force of the spring 1547.

The use of aspiration, where the gas to inflate the airbag is substantially obtained from the passenger compartment itself, is also desirable in order to reduce pressures and the amount of toxic gas within the passenger compartment of the vehicle. Aspiration systems are currently in use for passenger side frontal impact airbag systems, but the aspiration ratios are quite low. Typically, as discussed in detail above, only about 30% or less of the gas used to inflate the airbag comes from the passenger compartment with the remainder coming from the burning propellant. This percentage can be greatly increased by the careful design of the aspirating nozzle to where as much as about 90% or more of the gas comes from the passenger compartment as discussed above. The use of high aspiration ratios also permits the use of hotter gases from the gas generator since the vehicle passenger compartment air is used to dilute and thus cool the inflator gases. Thus, in general, the gas from the inflator does not need to be cooled and cooling screens are not needed. Note that cool gas is also desirable for side thorax and especially head protection airbags due to the need to keep them inflated for rollover protection.

If an airbag is attached to the vehicle ceiling and the inlet from the passenger compartment into the inflator takes the form of a narrow but long slit running along the length of the inflator, then an efficient design for the nozzle is possible as disclosed herein. In this case, the ports that are used for the gas flow from the passenger compartment to enter the airbag can also be used as the exit orifices for the gas to flow out of the airbag during the crash. An additional advantage results in this case in that the inflator gases are exhausted high in the passenger compartment of the vehicle making it even more likely that they will flow out of the vehicle through the window which has been broken open or removed for that purpose.

Figure 15:
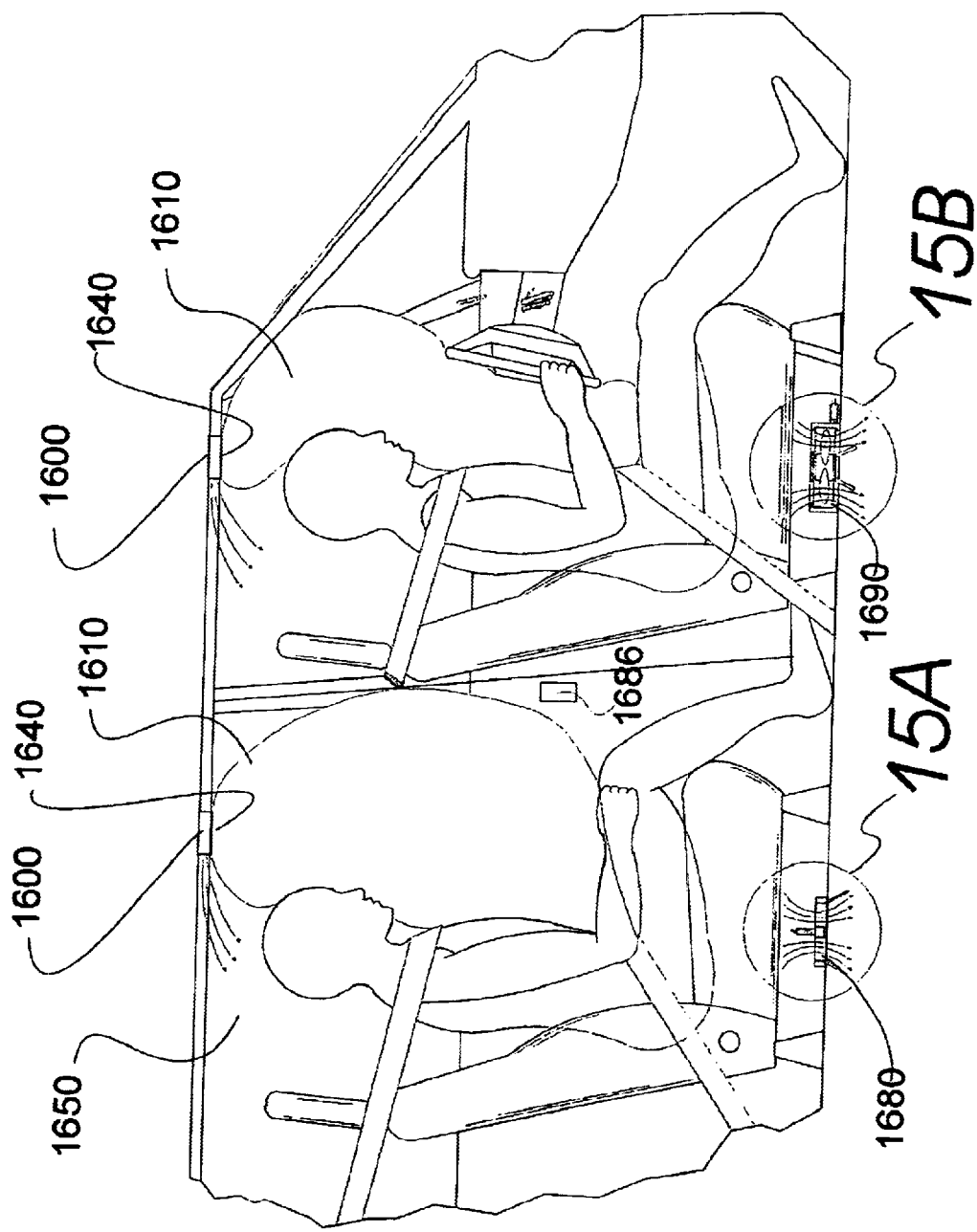
FIG. 15 is a perspective view of a ceiling mounted airbag system having exit ports at the ceiling level for gas to flow out of the airbag, a blow-out panel located low in the passenger compartment and a fan exhaust system also located low in the passenger compartment.

This is illustrated in FIG. 15 which is a perspective view of a ceiling mounted airbag system having exit ports at the ceiling level for gas to flow out of the airbag. In FIG. 15, a long thin airbag module 1600 is positioned in the vehicle ceiling as described herein. When the occupant presses against an airbag 1610 during the crash, pressure builds within the airbag 1610 causing the gas within the airbag to flow back through the module opening 1640 and into the passenger compartment 1650 at the ceiling level. Since the exiting gas is hot, it flows out of the rear window, not shown, which has been broken or removed, and thus out of the passenger compartment and into the atmosphere. By using the aspirating nozzle as an exit orifice, it is unnecessary to place vent holes within the airbag itself. This is particularly an advantage when film airbags are used.

In some implementations, either due to the geometry of the vehicle, the inability to achieve high aspiration ratios, or the necessity to cool the inflator gases, the breaking of one or more windows may not be sufficient to remove enough of the toxic gases to pass the required breathability tests. The main toxic gas will be carbon dioxide which as it cools will settle in the lower parts of the vehicle. If an occupant, because of unconsciousness or for some other reason, has his mouth below the window level, he may be forced to breath an excessive amount of the toxic gas and be injured. For these cases, it is necessary to create an air passage lower in the vehicle than the possible locations of the occupant's mouth. One implementation is illustrated in FIG. 15 which is a partial view of the interior of a vehicle showing a blowout panel located in a low position in the passenger compartment.

Figure 15B:
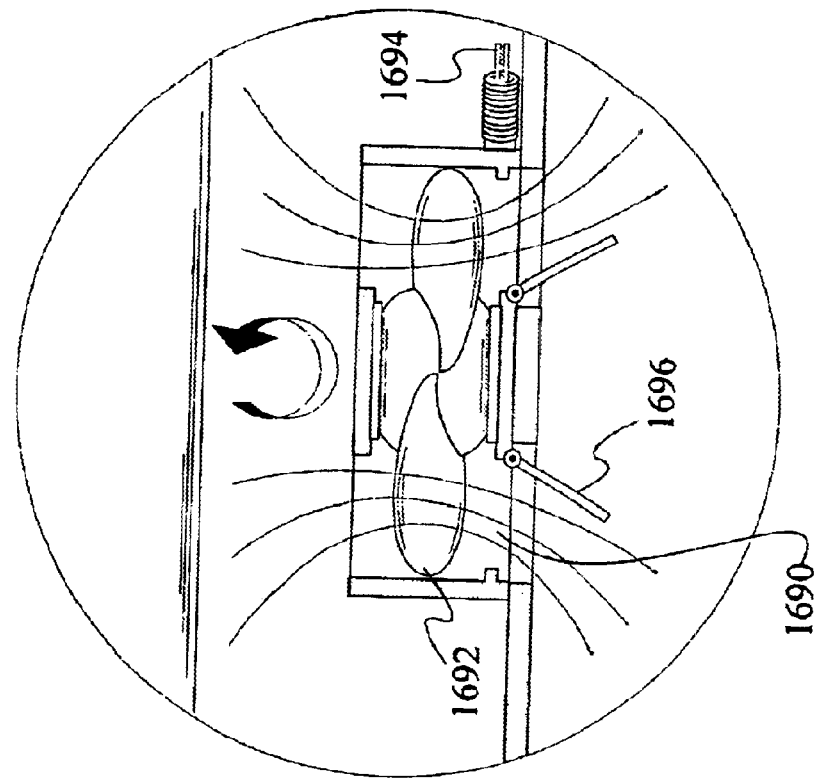
FIG. 15B is an enlargement of the exhaust fan of FIG. 15.
Figure 15A:
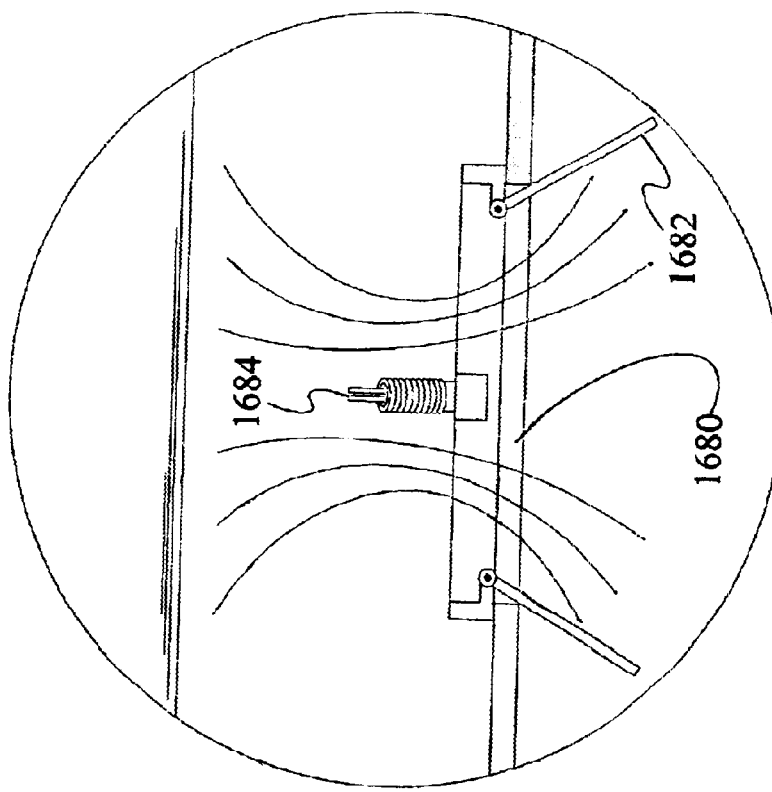
FIG. 15A is an enlargement of the blow-out panel of FIG. 15.

As shown in FIG. 15, and in more detail in FIG. 15A, a hole 1680 has been pyrotechnically opened in a location below the seat by shattering a frangible seal in cover 1682 by means of a squib 1684. The squib 1684 is connected to and initiated by the same sensor and diagnostic circuitry which is used as discussed above for breaking the glass in a window. Naturally, many other techniques exist for creating an air passage low in the vehicle. In some cases, for example, it might even be desirable to blow open a vehicle door perhaps 10 seconds after the accident, which may be achieved by appropriate door opening mechanisms (represented schematically in FIG. 15 as 1686). This has the added advantage of helping to provide egress for injured occupants.

In rare cases, the ventilation provided by breaking a window even with the addition of a hole in the lower part of the passenger compartment is insufficient to remove the toxic gas in time to prevent any danger of injury to the occupants. When this occurs, a small electrically or pyrotechnically driven fan can be mounted in an opening 1690 as shown in FIGS. 15 and 15B. This fan shown at 1692 in FIG. 15B which is a partial perspective view of the fan assembly of FIG. 15. In the event of an accident which requires deployment of more than one airbag, a fan 1692 powered by the vehicle's electrical system through wires 1694 is turned on for a period of time to pull gas from the lower part of the vehicle forcing it to flow through doors 1696. Alternately, the fan can be powered by its own power supply comprising a battery or capacitor, or even by pyrotechnic means.

As mentioned above, several propellants, including nitrocellulose, nitroguanidine, and other double base and triple base formulations and tetrazole, now become candidates for use in vehicles with more than one airbag module. One of the primary advantages of this invention is that the gases produced can be breathed for a short time by occupants without causing injury. The time period would of course depend on the vehicle and the method chosen for exhausting the toxic gas from the passenger compartment. All such propellants that fall into this class, that is propellants that can be safely breathed only for short periods of time, are referred to here as toxic airbag propellants. Other propellants of course exist which are so toxic that they would never be considered as candidates for airbag inflators. This class of propellants are not even considered here and therefore fall outside the class of toxic airbag propellants as used herein. Toxic, as applied to a gas for the purposes herein, means non breathable for more than a few minutes without causing harm to humans.

Naturally, if the total number of airbags deployed in an accident can be reduced, then the above disclosed methods of removing the toxic gas may not be required. Therefore, in another preferred embodiment of this invention, each airbag has an associated occupant position sensor to assure that there is an occupant present at a particular seating position before the airbags associated with that seating position are deployed. Generally, there would be no reason to deploy an airbag if the seat is unoccupied. More sophisticated versions of occupant position sensors can also determine out of position occupants, the presence of a rear facing child seat and of children laying on the seat.

In a refinement of this embodiment, more of the electronics associated with the airbag system is decentralized and housed within or closely adjacent to each of these airbag modules. Each module has its own electronic package containing a power supply and diagnostic and sometimes also the occupant sensor electronics. One sensor system is still used to initiate deployment of all airbags associated with the frontal impact. To avoid the detrimental noise effects of all airbags deploying at the same time, each module sometimes has its own, preferably pyrotechnic, delay as discussed above. The modules for the rear seat, for example, can have a several millisecond firing delay compared to the module for the driver, and the front passenger module can have a lesser delay. Each of the modules sometimes also has its own occupant position sensor and associated electronics. In this configuration, there is a minimum reliance on the transmission of power and data to and from the vehicle electrical system which is the least reliable part of the airbag system, especially during a crash. Once each of the modules receives a signal from the crash sensor system, it is on its own and no longer needs either power or information from the other parts of the system. The main diagnostics for a module can also reside within the module which transmits either a ready or a fault signal to the main monitoring circuit which now needs only to turn on a warning light if any of the modules either fails to transmit a ready signal or sends a fault signal.

The placement of electronic components in or near the airbag module is quite important. The placement of the occupant sensing as well as the diagnostics electronics within or adjacent to the airbag module has additional advantages to solving several current important airbag problems. There have been numerous inadvertent airbag deployments caused by wires in the system becoming shorted. Then, when the vehicle hits a pothole, which is sufficient to activate the arming sensor or otherwise disturb the sensing system, the airbag deploys. Such an unwanted deployment of course can directly injure an occupant who is out-of-position or cause an accident that results in occupant injuries. If the sensor were to send a coded signal to the airbag module rather than a DC voltage with sufficient power to trigger the airbag, and if the airbag module had stored within its electronic circuit sufficient energy to initiate the inflator, then these unwanted deployments would be prevented. A shorted wire cannot send a coded signal and the short can be detected by the module resident diagnostic circuitry.

This would require that the airbag module contain the backup power supply which further improves the reliability of the system since the electrical connection to the sensor, or to the vehicle power, can now partially fail, as might happen during an accident, and the system will still work properly. It is well known that the electrical resistance in the "clockspring" connection system, which connects the steering wheel mounted airbag module to the sensor and diagnostic system, is marginal in design and prone to failure. The resistance of this electrical connection must be very low or there will not be sufficient power to reliably initiate the inflator squib. To reduce the resistance to the level required, high quality gold plated connectors are used and the wires must also be of unusually high quality. Due to space constraints, however, these wires have only a marginally adequate resistance thereby reducing the reliability of the driver airbag module and increasing its cost. If, on the other hand, the power to initiate the airbag were already in the module then only a coded signal need be sent to the module rather than sufficient power to initiate the inflator. Thus, the resistance problem disappears and the module reliability is increased. Additionally, the requirements for the clockspring wires become less severe and the design can be relaxed reducing the cost and complexity of the device. It may even be possible to return to the slip ring system that existed prior to the implementation of airbags.

Under this system, the power supply can be charged over a few seconds, since the power does not need to be sent to the module at the time of the required airbag deployment because it is already there. Thus, all of the electronics associated with the airbag system except the sensor and its associated electronics, if any, would be within or adjacent to the airbag module. This includes optionally the occupant sensor, the diagnostics and the backup power supply, which now becomes the primary power supply, and the need for a backup disappears. When a fault is detected a message is sent to a display unit located typically in the instrument panel.

The placement of the main electronics within each module follows the development path that computers themselves have followed from a large centralized mainframe base to a network of microcomputers. The computing power required by an occupant position sensor, airbag system diagnostics and backup power supply is greater than that required by a single point sensor. For this reason, it is more logical to put this electronic package within or adjacent to each module. In this manner, the advantages of a centralized single point sensor and diagnostic system fade since most of the intelligence will reside within or adjacent to the individual modules and not the centralized system. A simple and more effective CrushSwitch sensor such as disclosed in U.S. Pat. No. 5,441,301, for example, now becomes more cost effective than the single point sensor and diagnostic system which is now being widely adopted. Finally, this also is consistent with the migration to a bus system where the power and information are transmitted around the vehicle on a single bus system thereby significantly reducing the number of wires and the complexity of the vehicle wiring system. The decision to deploy an airbag is sent to the airbag module sub-system as a signal not as a burst of power. Although it has been assumed that the information would be sent over a wire bus, it is also possible to send the deploy command by a variety of wireless methods.

Figure 16:
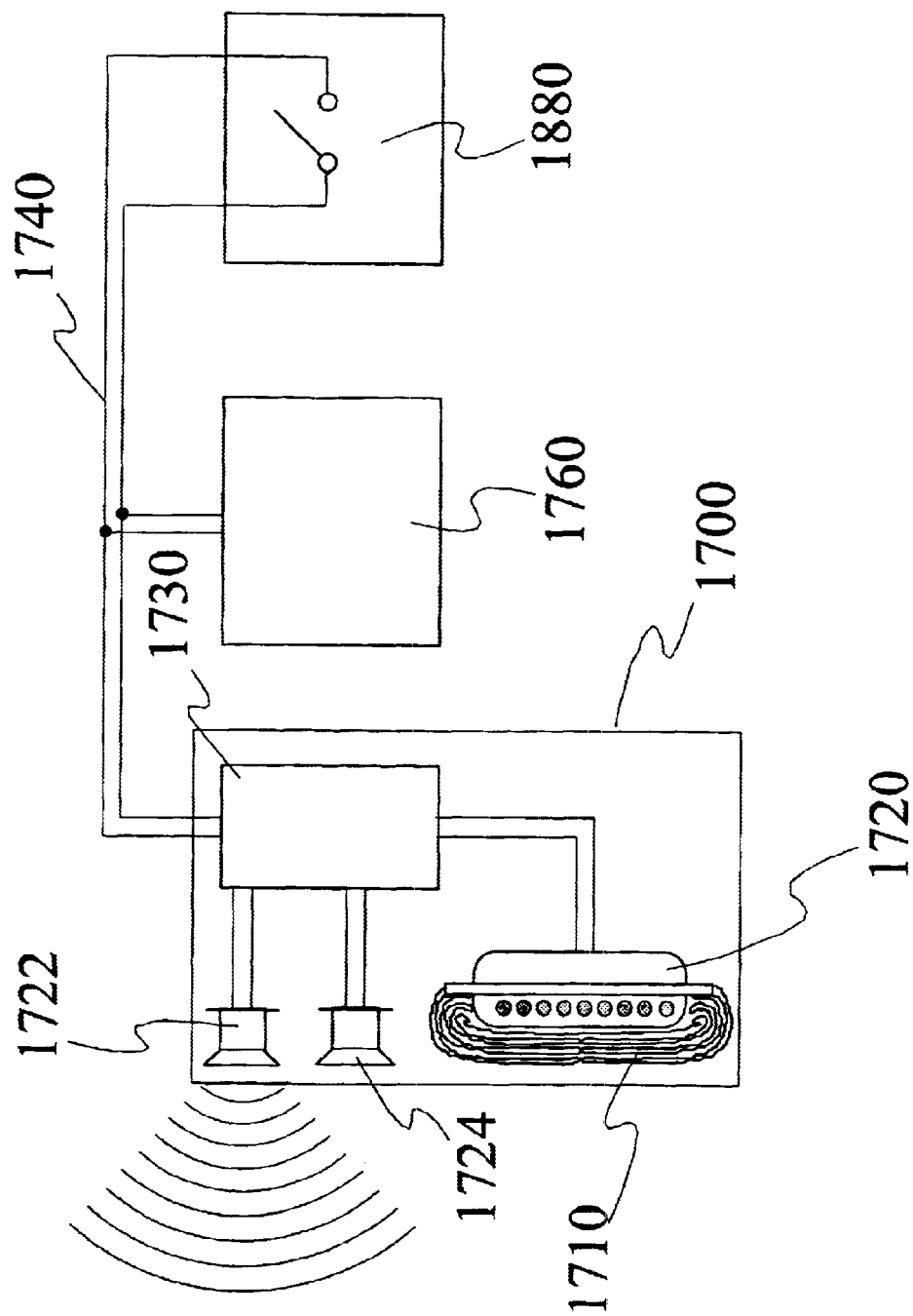
FIG. 16 is a perspective view of the combination of an occupant position sensor, diagnostic electronics and power supply and airbag module designed to prevent the deployment of the airbag if the seat is unoccupied.

A partial implementation of the system as just described is depicted schematically in FIG. 16 which shows a view of the combination of an occupant position sensor and airbag module designed to prevent the deployment of the airbag for a seat which is unoccupied or if the occupant is too close to the airbag and therefore in danger of deployment induced injury. The module, shown generally at 1700, includes a housing which comprises an airbag 1710, an inflator assembly 1720 for the airbag 1710, an occupant position sensor comprising an ultrasonic transmitter 1722 and an ultrasonic receiver 1724. Other occupant position sensors can also be used instead of the ultrasonic transmitter/receiver pair to determine the position of the occupant to be protected by the airbag 1710, and also the occupant position sensor may be located outside of the housing of the module 1700. The housing of the module 1700 also contains an electronic module or package 1730 coupled to each of the inflator assembly 1720, the transmitter 1722 and the receiver 1724 and which performs the functions of sending the ultrasonic signal to the transmitter 1722 and processing the data from the occupant position sensor receiver 1724. Electronics module 1730 may be arranged within the housing of the module 1700 as shown or adjacent or proximate the housing of the module 1700. Module 1700 also contains a power supply (not shown) for supplying power upon command by the electronics module 1730 to the inflator assembly 1720 to cause inflation of the airbag 1710. Thus, electronics module 1730 controls the inflation or deployment of the airbag 1710 and may sometimes herein be referred to as a controller or control unit. In addition, the electronic module 1730 monitors the power supply voltage, to assure that sufficient energy is stored to initiate the inflator assembly 1720 when required, and power the other processes, and reports periodically over the vehicle bus 1740 to the central diagnostic module, shown schematically at 1760, to indicate that the module is ready, i.e., there is sufficient power to inflate or deploy the airbag 1710 and operate the occupant position sensor transmitter/receiver pair, or sends a fault code if a failure in any component being monitored has been detected. A CrushSwitch sensor is also shown schematically at 1880, which is the only discriminating sensor m the system. Sensor 1880 is coupled to the vehicle bus 1740 and transmits a coded signal over the bus to the electronics module 1730 to cause the electronics module 1730 to initiate deployment of the airbag 1710 via the inflator assembly 1720. The vehicle bus 1740 connects the electronic package 1730, the central sensor and diagnostic module 1760 and the CrushSwitch sensor 1880. Bus 1740 may be the single bus system, i.e., consists of a pair of wires, on which power and information are transmitted around the vehicle as noted immediately above. Instead of CrushSwitch sensor 1880, other crash sensors may be used.

Figure 16A:
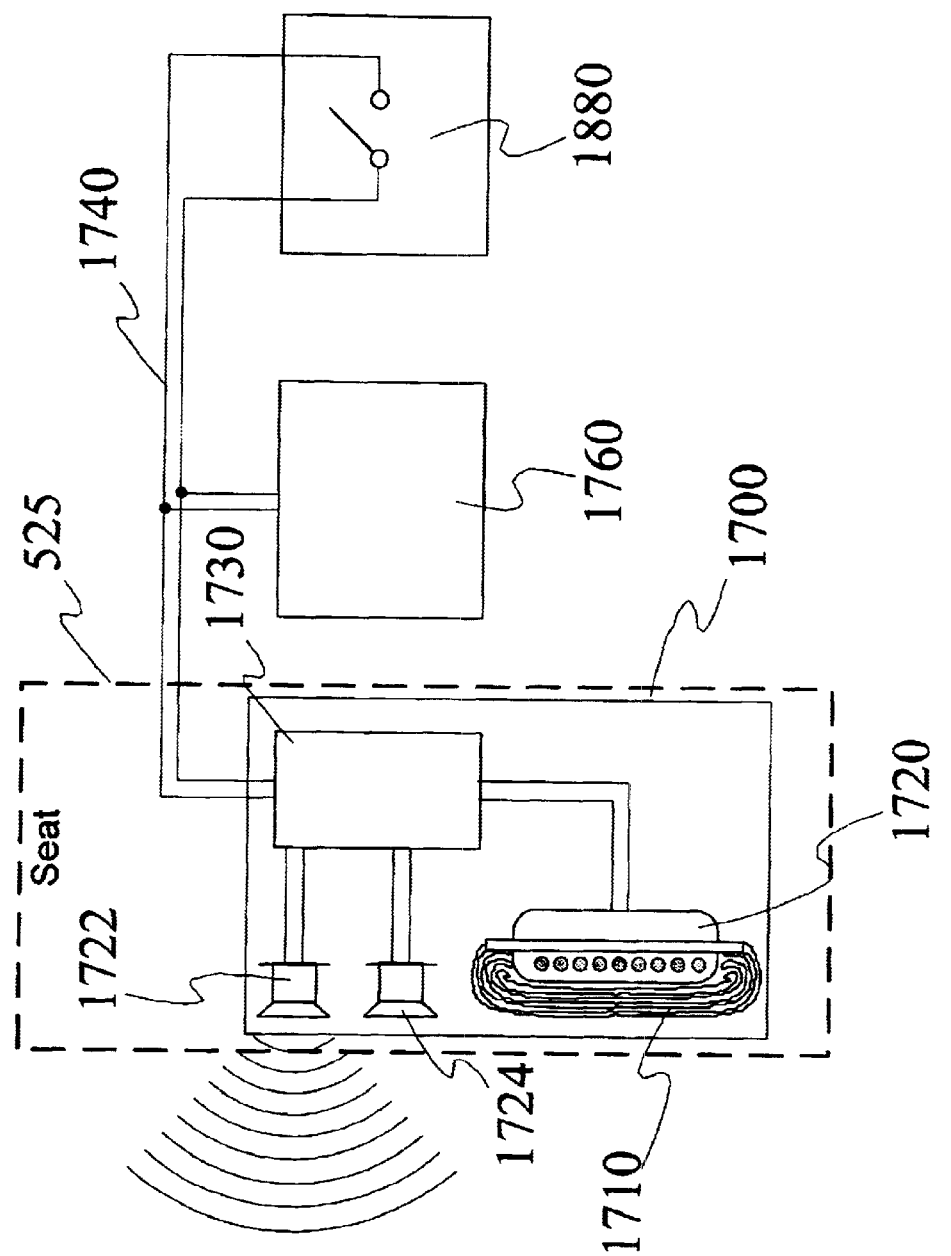
FIG. 16A is a perspective view of the combination of an occupant position sensor, diagnostic electronics and power supply and airbag module arranged in a seat in the vehicle.

It should be understood that airbag module 1700 is a schematic representation only and thus, may represent any of the airbag modules described above in any of the mounting locations. For example, airbag module 1700 may be arranged in connection with the seat 525 as module 510 is in FIG. 8. As such, the bus, which is connected to the airbag module 1700, would inherently extend at least partially into and within the seat. This embodiment is shown in FIG. 16A, wherein the airbag module 1700 is shown in the seat 525 (the outline of which is depicted by dotted lines). As can be seen, the bus 1740 is at least partially in the seat 525.

Figure 17:
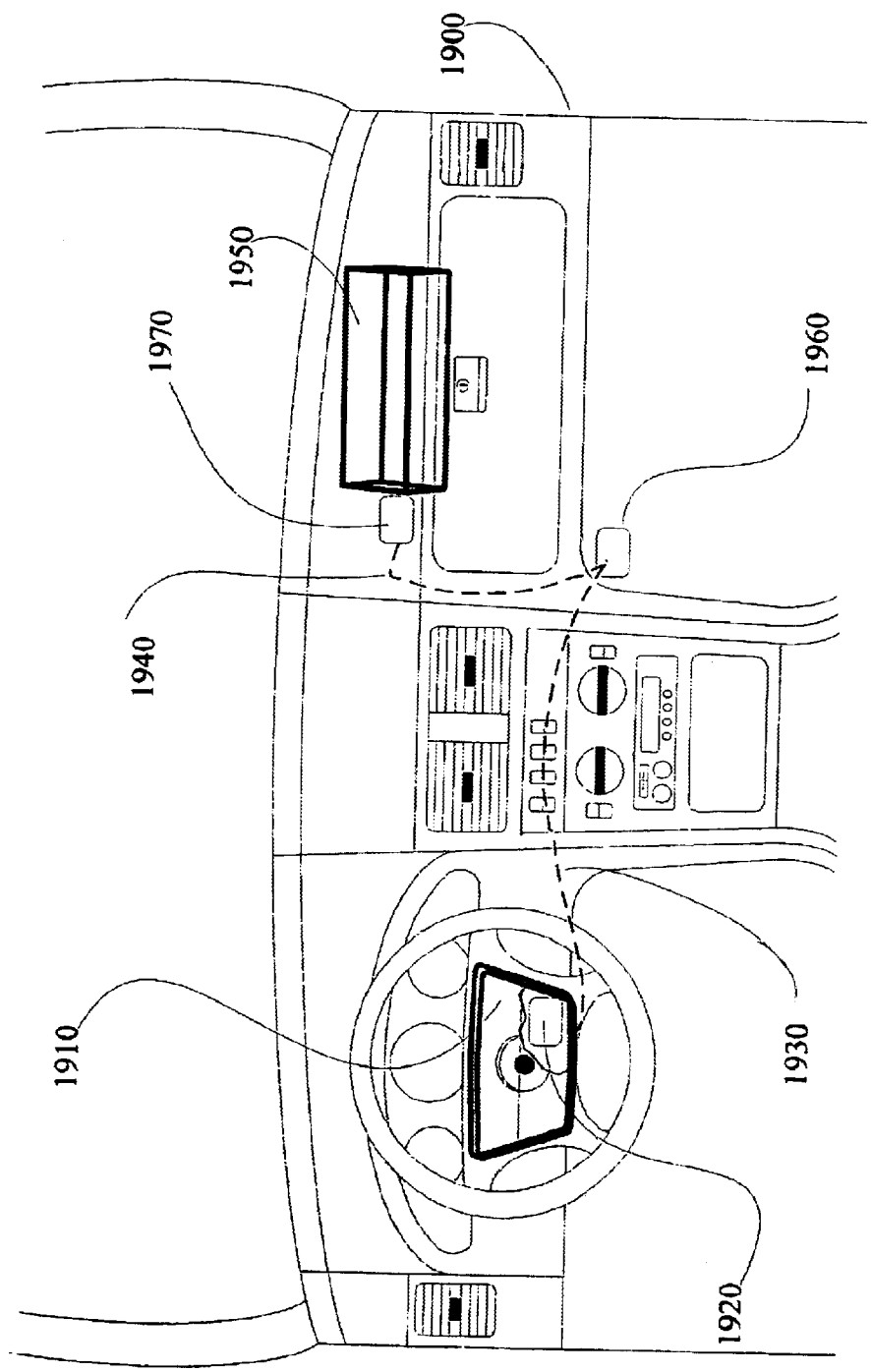
FIG. 17 is another implementation of the invention incorporating the electronic components into and adjacent the airbag module.

Another implementation of the invention incorporating the electronic components into and adjacent to the airbag module as illustrated in FIG. 17 which shows the interior front of the passenger compartment generally at 1900. Driver airbag module 1910 is partially cutaway to show an electronic module 1920 incorporated within the airbag module 1910. Electronic module 1920 may be comparable to electronic module 1730 in the embodiment of FIG. 16 in that it can control the deployment of the airbag in airbag module 1910. Electronic airbag module 1910 is connected to an electronic sensor illustrated generally as 1960 by wire 1930. The electronic sensor 1960 is, e.g., an electronic single point crash sensor that initiates the deployment of the airbag when it senses a crash. Passenger airbag module 1950 is illustrated with its associated electronic module 1970 outside of but adjacent or proximate to the airbag module. Electronic module 1970 may be comparable to electronic module 1730 in the embodiment of FIG. 16 in that it can control the deployment of the airbag in airbag module 1950. Electronic module 1970 is connected by a wire 1940, which could also be part of a bus, to the electronic sensor 1960. One or both of the electronic modules 1920 and 1970 can contain diagnostic circuitry, power storage capability (either a battery or a capacitor), occupant sensing circuitry, as well as communication electronic circuitry for either wired or wireless communication.

It should be understood that although only two airbag modules 1910, 1950 are shown, it is envisioned that an automotive safety network may be designed with several and/or different types of occupant protection devices. Such an automotive network would comprises one or more occupant protection devices connected to the bus, each comprising a housing and a component deployable to provide protection for the occupant, at least one sensor system for providing an output signal relevant to deployment of the deployable component(s) (such as the occupant sensing circuitry), deployment determining means for generating a signal indicating for which of the deployable components deployment is desired (such as a crash sensor) and an electronic controller arranged in, proximate or adjacent each housing and coupled to the sensor system(s) and the deployment determining means. The electrical bus electrically couples the sensor system(s), the deployment determining means and the controllers so that the signals from one or more of the sensor systems and the deployment determining means are sent over the bus to the controllers. Each controller controls deployment of the deployable component of the respective occupant protection device in consideration of the signals from the sensor system(s) and the deployment determining means. The crash sensor(s) may be arranged separate and at a location apart from the housings and generate a coded signal when deployment of any one of the deployable components is desired. Thus, the coded signal varies depending on which of deployment components are to be deployed. If the deployable component is an airbag associated with the housing, the occupant protection device would comprise an inflator assembly arranged in the housing for inflating the airbag.

To expand on the foregoing description of a vehicular bus system, the following terms are defined as follows:

The term "component" as used herein will generally refer to any part or assembly of parts which is mounted to or a part of a motor vehicle and which is capable of emitting a signal representative of its operating state. The following is a partial list of general automobile and truck components, the list not being exhaustive:

engine;

transmission;

brakes and associated brake assembly;

tires;

wheel;

steering wheel and steering column assembly;

water pump;

alternator;

shock absorber;

wheel mounting assembly;

radiator;

battery;

oil pump;

fuel pump;

air conditioner compressor;

differential gear;

exhaust system;

fan belts;

engine valves;

steering assembly;

vehicle suspension including shock absorbers;

vehicle wiring system; and engine cooling fan assembly.

The term "sensor" as used herein will generally refer to any measuring, detecting or sensing device mounted on a vehicle or any of its components including new sensors mounted in conjunction with the diagnostic module in accordance with the invention. A partial, non-exhaustive list of common sensors mounted on an automobile or truck is:

airbag crash sensor;

accelerometer;

microphone;

camera;

antenna, capacitance sensor or other electromagnetic wave sensor;

stress or strain sensor pressure sensor;

weight sensor;

magnetic field sensor;

coolant thermometer;

oil pressure sensor;

oil level sensor;

air flow meter;

voltmeter;

ammeter;

humidity sensor;

engine knock sensor;

oil turbidity sensor;

throttle position sensor;

steering wheel torque sensor;

wheel speed sensor;

tachometer;

speedometer;

other velocity sensors;

other position or displacement sensors;

oxygen sensor;

yaw, pitch and roll angular sensors;

clock;

odometer;

power steering pressure sensor;

pollution sensor;

fuel gauge;

cabin thermometer;

transmission fluid level sensor;

yaw sensor;

coolant level sensor;

transmission fluid turbidity sensor;

gyroscopes or other angular rate sensors including yaw, pitch and roll rate sensors;

coolant level sensor;

transmission fluid turbidity sensor;

break pressure sensor;

tire pressure sensor;

tire temperature sensor, and coolant pressure sensor;

occupant position sensor; and occupant weight sensor.

The term "actuator" as used herein will generally refer to a device that performs some action upon receiving the proper signal. Examples of actuators include:

window motor;

door opening and closing motor;

electric door lock;

deck lid lock;

airbag inflator initiator;

fuel injector;

brake valves;

pumps;

relays; and steering assist devices.

The term "signal" as used herein will generally refer to any time varying output from a component including electrical, acoustic, thermal, or electromagnetic radiation, or mechanical vibration.

Sensors on a vehicle are generally designed to measure particular parameters of particular vehicle components and thus much is to be gained by adding all sensors to a common vehicle bus and not limit it to the safety system. However, frequently these sensors also measure outputs from other vehicle components. For example, electronic airbag crash sensors currently in use contain an accelerometer for determining the accelerations of the vehicle structure so that the associated electronic circuitry of the airbag crash sensor can determine whether a vehicle is experiencing a crash of sufficient magnitude so as to require deployment of the airbag. This accelerometer continuously monitors the vibrations in the vehicle structure regardless of the source of these vibrations. If a wheel is out of balance, or if there is extensive wear of the parts of the front wheel mounting assembly, or wear in the shock absorbers, the resulting abnormal vibrations or accelerations can, in many cases, be sensed by the crash sensor accelerometer. There are other cases, however, where the sensitivity or location of the airbag crash sensor accelerometer is not appropriate and one or more additional accelerometers may be mounted onto a vehicle for the purposes of this invention.

Every component of a vehicle emits various signals during its life. These signals can take the form of electromagnetic radiation, acoustic radiation, thermal radiation, vibrations transmitted through the vehicle structure, and voltage or current fluctuations, depending on the particular component. When a component is functioning normally, it may not emit a perceptible signal. In that case, the normal signal is no signal, i.e., the absence of a signal. In most cases, a component will emit signals that change over its life and it is these changes which contain information as to the state of the component, e.g., whether failure of the component is impending. Usually components do not fail without warning. However, most such warnings are either not perceived or if perceived are not understood by the vehicle operator until the component actually fails and, in some cases, a breakdown of the vehicle occurs. In a few years, it is expected that various roadways will have systems for automatically guiding vehicles operating at high speed thereon. Such systems have been called "smart Highways" and are part of the field of intelligent transportation systems (ITS). If a vehicle operating on such a smart highway were to breakdown, serious disruption of the system could result and the safety of other users of the smart highway could be endangered.

Each of these signals emitted by the vehicle components can be is converted into electrical signals and then digitized (e.g., the analog signal is converted into a digital signal) to create numerical time series data which is then entered into a processor. One or more pattern recognition algorithms then are applied in the processor to attempt to identify and classify patterns in this time series data. For a particular component, such as a tire for example, the algorithm attempts to determine from the relevant digital data whether the tire is functioning properly or whether it requires balancing, additional air, or perhaps replacement.

A connector for joining two coaxial cables 41 and 42 is illustrated in FIG. 18A generally at 40. A cover 40a is hingably attached to a base 43 and includes a catch 52 (see FIG. 18A). A connector plate 45 is slidably inserted into base 43 and contains two abrasion and connection sections 47 and 48 having a serrated part and a particle-coated section (see FIGS. 18B and 18D). More particularly, as shown in FIG. 18C, the base 43 includes a slot into which the connector plate 45 is placed. A second connecting plate 49 contains two connecting pins 46, one corresponding to each cable to be connected (see FIGS. 18B and 18C). To connect the two coaxial cables 41 and 42 together, they are first inserted into their respective holes 50 and 51 in base 43 until they are engaged by pins 46. Sliding connector plate 45 is then inserted into the slot in the base 43 and cover 40*a* rotated pushing connector plate 45 downward until the catch 52 snaps over a mating catch 53 on the base 43. Other latching means are of course usable in accordance with the invention. During this process, the serrated part of the abrasion and connection sections 47 and 48 of connector plate 45 abrades the insulating cover off of the outside of the respective cable 41 and 42 exposing the outer conductor of the cable. The particle coated section of the abrasion and connection sections 47 and 48 of connector plate 45 then engages and makes electrical contact with the outer conductor of the coaxial cables 41 and 42. In this manner, the two coaxial cables 41,42 are electrically connected together in a very simple manner.

In FIG. 19, a generalized component 2000 emitting several signals which are transmitted along a variety of paths, sensed by a variety of sensors and analyzed by the diagnostic device in accordance with the invention is illustrated schematically. Component 2000 is mounted to a vehicle 2005 and during operation it emits a variety of signals such as acoustic 2010, electromagnetic radiation 2015, thermal radiation 2020, current and voltage fluctuations in conductor 2025 and mechanical vibrations 2030. Various sensors are mounted in the vehicle to detect the signals emitted by the component 2000. These include a vibration sensor (accelerometer) 2035 also mounted to the vehicle, acoustic sensor 2040, electromagnetic radiation sensor 2045, heat radiation sensor 2050, and voltage or current sensor 2080. In addition, various other sensors 2055, 2060, 2065, and 2070 measure other parameters of other components that in some manner provide information directly or indirectly on the operation of component 2000. All of the sensors illustrated on FIG. 19 are connected to a data bus 2085. A diagnostic module 2075, in accordance with the invention, is also attached to the vehicle data bus 2085 and receives the signals generated by the various sensors.

As shown in FIG. 19, the diagnostic module 2075 has access to the output data of each of the sensors that have information relative to the component 2000. This data appears as a series of numerical values each corresponding to a measured value at a specific point in time. The cumulative data from a particular sensor is called a time series of individual data points. The diagnostic module 2075 compares the patterns of data received from each sensor individually, or in combination with data from other sensors, with patterns for which the diagnostic module has been trained to determine whether the component is functioning normally or abnormally. Note that although a general vehicle component diagnostic system is being described, the state of some vehicle components can provide information to the vehicle safety system. A tire failure, for example, can lead to a vehicle rollover.

Central to the diagnostic teachings of this invention is the manner in which the diagnostic module 2075 determines a normal pattern from an abnormal pattern and the manner in which it decides what data to use from the vast amount of data available. This is accomplished using pattern recognition technologies, such as artificial neural networks, and training. The theory of neural networks including many examples can be found in several books on the subject including: *Techniques And Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; J. M. Zaruda, *Introduction to Artificial Neural Systems*, West Publishing Co., N.Y., 1992 and, *Digital Neural Networks*, by Kung, S. Y., PTR Prentice Hall, Englewood Cliffs, N.J., 1993, Eberhart, R., Simpson, P. and Dobbins, R., *Computational Intelligence PC Tools*, Academic Press, Inc., 1996, Orlando, Fla., all of which are included herein by reference. The neural network pattern recognition technology is one of the most developed of pattern recognition technologies. Newer and more efficient systems are now being developed such as the neural network system which is being developed by Motorola and is described in U.S. Pat. Nos. 5,390,136 and 5,517,667. The neural network will be used here to illustrate one example of a pattern recognition technology but it is emphasized that this invention is not limited to neural networks. Rather, the invention may apply any known pattern recognition technology. A brief description of the neural network pattern recognition technology is set forth below.

Neural networks are constructed of processing elements known as neurons that are interconnected using information channels call interconnects. Each neuron can have multiple inputs but only one output. Each output however is connected to all other neurons in the next layer. The neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition, and handwriting analysis.

To train a neural network, data is provided in the form of one or more time series that represents the condition to be diagnosed as well as normal operation. As an example, the simple case of an out of balance tire will be used. Various sensors on the vehicle are used to extract information from signals emitted by the tire such as the airbag accelerometer, a torque sensor on the steering wheel or the pressure output of the power steering system. Other sensors that might not have an obvious relationship to tire unbalance are also included such as, for example, the vehicle speed or wheel speed. Data is taken from a variety of vehicles where the tires were accurately balanced under a variety of operating conditions also for cases where varying amounts of unbalance was intentionally introduced. Once the data has been collected, some degree of preprocessing is usually performed to reduce the total amount of data fed to the neural network. In the case of the unbalanced tire, the time period between data points might be chosen such that there are at least ten data points per revolution of the wheel. For some other application, the time period might be one minute or one millisecond.

Once the data has been collected, it is processed by a neural network generating program, for example, if a neural network pattern recognition system is to be used. Such programs are available commercially, e.g., from NeuralWare of Pittsburgh, Pa. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm that is programmed onto a microprocessor, microcontroller, neural processor, or DSP (herein collectively referred to as a microprocessor or processor). Such a microprocessor appears inside the diagnostic module 2075 in FIG. 19. Once trained, the neural network, as represented by the algorithm, will now recognize an unbalanced tire on a vehicle when this event occurs. At that time, when the tire is unbalanced, the diagnostic module 2075 will output a message to the driver indicating that the tire should be now be balanced as described in more detail below. The message to the driver is provided by output means coupled to or incorporated within the module 2075 and may be, e.g., a light on the dashboard, a vocal tone or any other recognizable indication apparatus. Messages can also be transmitter to others outside of the vehicle such as other vehicles or to a vehicle dealer. In some cases, control of the vehicle may be taken over by a vehicle system in response to a message. In some cases, the vehicle component failure portends an oncoming accident and one or more parts of the restraint system can be deployed Discussions on the operation of a neural network can be found in the above references on the subject and are well understood by those skilled in the art. Neural networks are the most well known of the pattern recognition technologies based on training, although neural networks have only recently received widespread attention and have been applied to only very limited and specialized problems in motor vehicles. Other non-training based pattern recognition technologies exist, such as fuzzy logic. However, the programming required to use fuzzy logic, where the patterns must be determine by the programmer, render these systems impractical for general vehicle diagnostic problems such as described herein. Therefore, preferably the pattern recognition systems that learn by training are used herein. On the other hand, the combination of neural networks and fuzzy logic, such as in a Neural-Fuzzy system, are applicable and can result in superior results.

The neural network is the first highly successful of what will be a variety of pattern recognition techniques based on training. There is nothing that suggests that it is the only or even the best technology. The characteristics of all of these technologies which render them applicable to this general diagnostic problem include the use of time-based input data and that they are trainable. In all cases, the pattern recognition technology learns from examples of data characteristic of normal and abnormal component operation.

The neural network process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm. For the unbalanced tire, using the data from an accelerometer, the digital acceleration values from the analog to digital converter in the accelerometer are entered into nodes 1 through n and the neural network algorithm compares the pattern of values on nodes 1 through n with patterns for which it has been trained as follows.

Each of the input nodes is connected to each of the second layer nodes, h-1, h-2, . . . , h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node representing the decision to notify the driver of the unbalanced tire. During the training phase, an output node value of 1, for example, is assigned to indicate that the driver should be notified and a value of 0 is assigned to not doing so. Once again, the details of this process are described in above-referenced texts and will not be presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design. For an example of the use of a neural network crash sensor algorithm see U.S. Pat. No. 5,684,701 which is included herein by reference. Note that the inventors of this invention contemplate all combinations of the teachings of the '701 patent and those disclosed herein.

It is also possible to apply modular neural networks in accordance with the invention wherein several neural network are trained, each having a specific function relating to the detection of the abnormality in the operation of the component. The particular neural network(s) used, i.e., those to which input is provided or from which output is used, can be determined based on the measurements by one or more of the sensors.

Briefly, the neural network described above defines a method, using a pattern recognition system, of sensing an unbalanced tire and determining whether to notify the driver and comprises the steps of:

(a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from (e.g. may employ a different weight) that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is in general different from (e.g. may employ a different weight) that operation performed on some other second series node data;

(g) combining the operated on data from all of the second series nodes into each output series node to form a value at each output series node; and, (h) notifying a driver or taking some other action if the value on one output series node is within a chosen range signifying that a tire requires balancing.

This method can be generalized to a method of predicting that a component of a vehicle will fail comprising the steps of:

(a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver or taking some other action, including, in some cases, deployment of an occupant restraint system, if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" will be defined as a system wherein the data to be processed is separated into discrete values which are then operated on and combined in at least a two stage process and where the operation performed on the data at each stage is in general different for each discrete value and where the operation performed is at least determined through a training process.

The implementation of neural networks can take on at least two forms, an algorithm programmed on a digital microprocessor or in a neural computer. In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 2075 contains preprocessing and neural network algorithms for a number of component failures. The neural network algorithms are generally relatively simple, requiring only a few dozen or a few hundred lines of computer code. A single general neural network program can be used for multiple pattern recognition cases by specifying different coefficients for the various terms, one set for each application. Thus, adding different diagnostic checks has only a small affect on the cost of the system. Also, the system has available to it all of the information available on the data bus. During the training process, the pattern recognition program sorts out from the available vehicle data on the data bus, those patterns that predict failure of a particular component.

Figure 20:
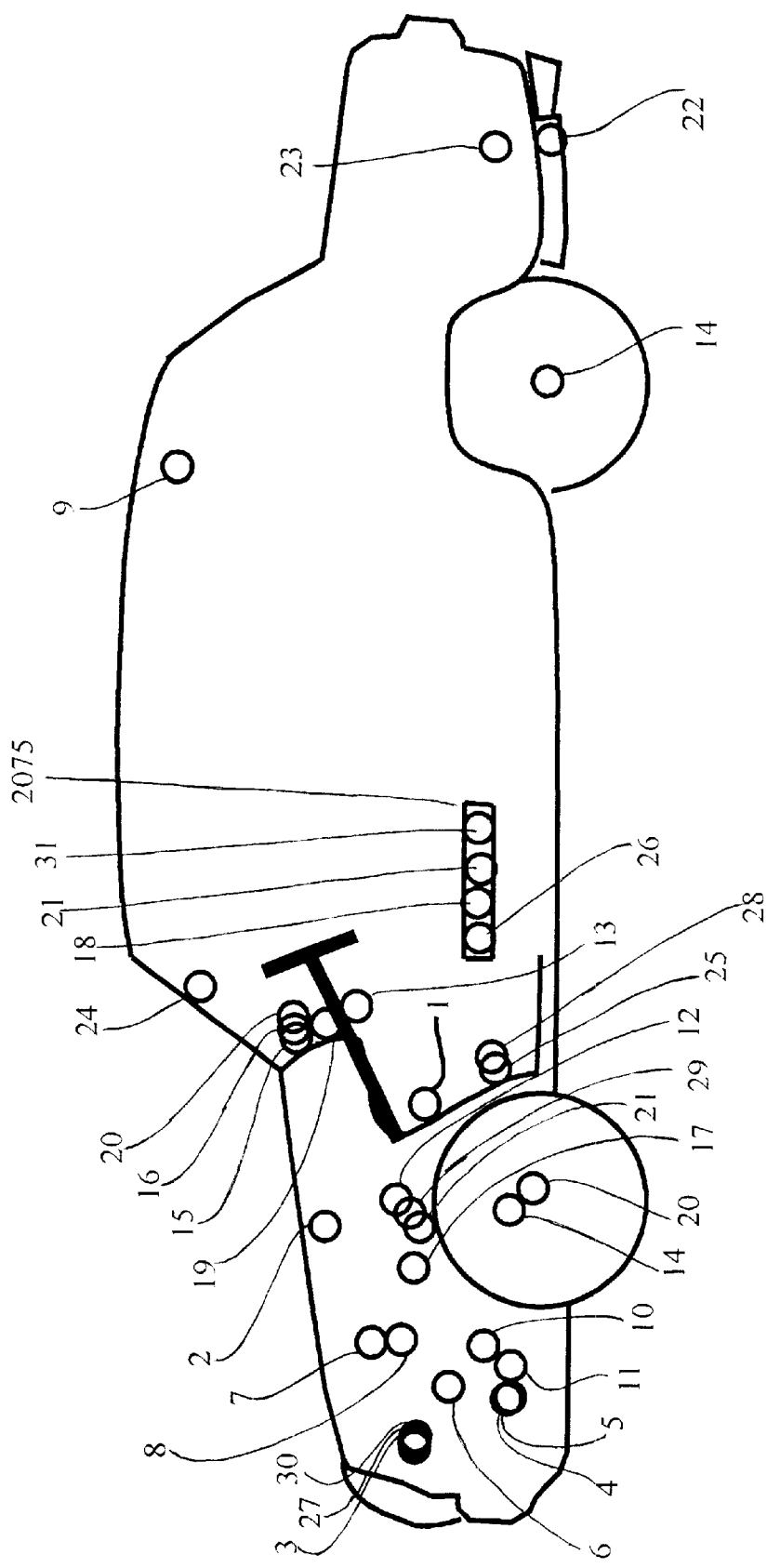
FIG. 20 is a schematic of a vehicle with several components and several sensors and a total vehicle diagnostic system in accordance with the invention utilizing a diagnostic module in accordance with the invention and which may be used in a method in accordance with the invention.
Figure 21:
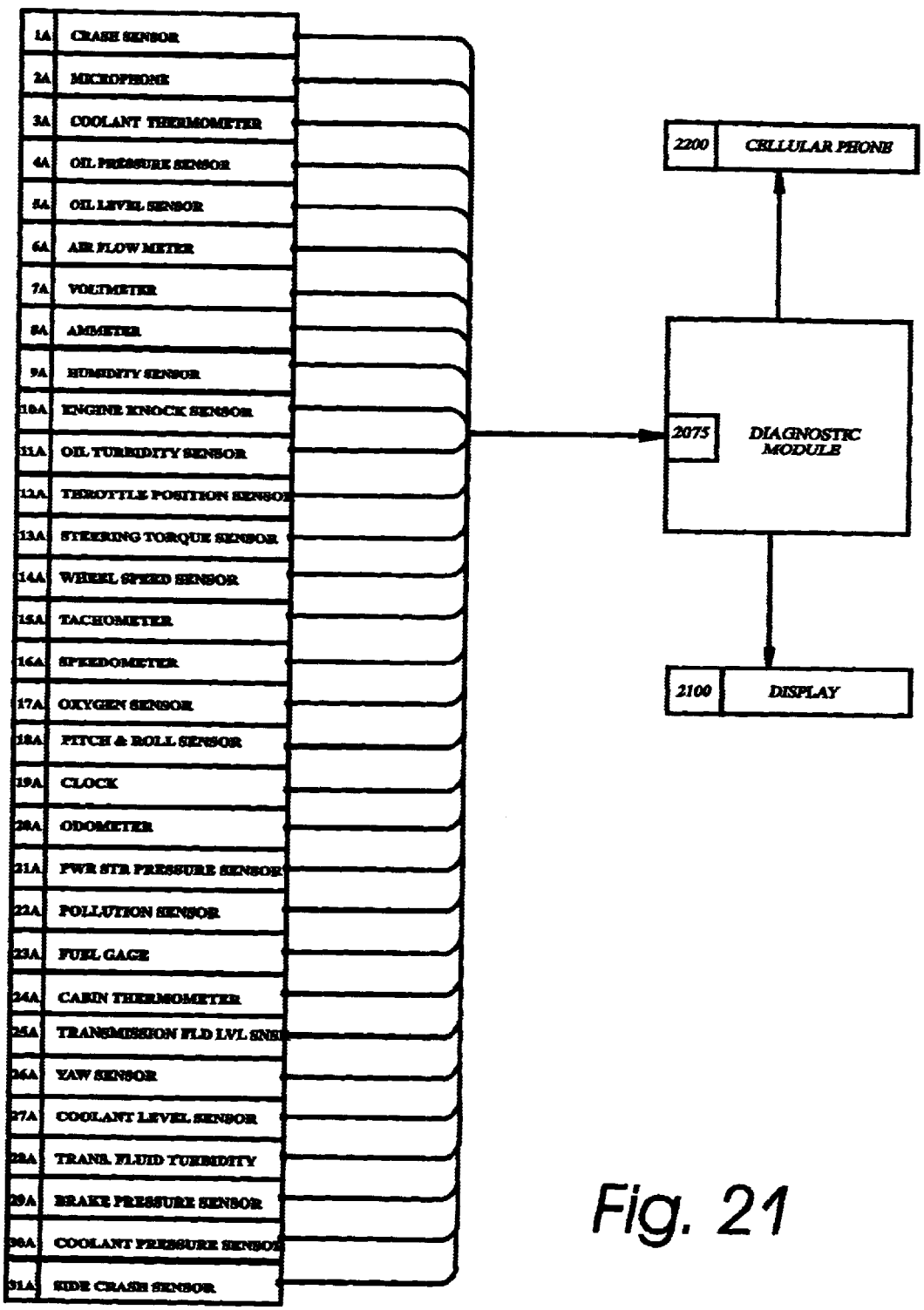
FIG. 21 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

In FIG. 20, a schematic of a vehicle with several components and several sensors is shown in their approximate locations on a vehicle along with a total vehicle diagnostic system in accordance with the invention utilizing a diagnostic module in accordance with the invention. A flow diagram of information passing from the various sensors shown on FIG. 20 onto the vehicle data bus and thereby into the diagnostic device in accordance with the invention is shown in FIG. 21 along with outputs to a display for notifying the driver and to the vehicle cellular phone for notifying the dealer, vehicle manufacturer or other entity concerned with the failure of a component in the vehicle. If the vehicle is operating on a smart highway, for example, the pending component failure information may also be communicated to a highway control system and/or to other vehicles in the vicinity so that an orderly exiting of the vehicle from the smart highway can be facilitated. FIG. 21 also contains the names of the sensors shown numbered on FIG. 20.

Sensor 1 is a crash sensor having an accelerometer (alternately a dedicated accelerometer can be used), sensor 2 is a microphone, sensor 3 is a coolant thermometer, sensor 4 is an oil pressure sensor, sensor 5 is an oil level sensor, sensor 6 is an air flow meter, sensor 7 is a voltmeter, sensor 8 is an ammeter, sensor 9 is a humidity sensor, sensor 10 is an engine knock sensor, sensor 11 is an oil turbidity sensor, sensor 12 is a throttle position sensor, sensor 13 is a steering torque sensor, sensor 14 is a wheel speed sensor, sensor 15 is a tachometer, sensor 16 is a speedometer, sensor 17 is an oxygen sensor, sensor 18 is a pitch/roll sensor (such as using an angular rate sensor from the Systron Donner company), sensor 19 is a clock, sensor 20 is an odometer, sensor 21 is a power steering pressure sensor, sensor 22 is a pollution sensor, sensor 23 is a fuel gauge, sensor 24 is a cabin thermometer, sensor 25 is a transmission fluid level sensor, sensor 26 is a yaw sensor, sensor 27 is a coolant level sensor, sensor 28 is a transmission fluid turbidity sensor, sensor 29 is brake pressure sensor and sensor 30 is a coolant pressure sensor. Other possible sensors include a temperature transducer, a pressure transducer, a liquid level sensor, a flow meter, a position sensor, a velocity sensor, a RPM sensor, a chemical sensor and an angle sensor.

Consider now some examples. The following is a partial list of potential component failures and the sensors from the list on FIG. 22 that might provide information to predict the failure of the component.

| | |
|---|---|
| Out of balance tires | 1, 13, 14, 15, 20, 21 |
| Front end out of alignment | 1, 13, 21, 26 |
| Tune up required | 1, 3, 10, 12, 15, 17, 20, 22 |
| Oil change needed | 3, 4, 5A, 11 |
| Motor failure | 1, 2, 3, 4, 5, 6, 10, 12, 15, 17, 22 |
| Low tire pressure | 1, 13, 14, 15, 20, 21 |
| Front end looseness | 1, 13, 16, 21, 26 |
| Cooling system failure | 3, 15, 24, 27, 30 |
| Alternator problems | 1, 2, 7, 8, 15, 19, 20 |
| Transmission problems | 1, 3, 12, 15, 16, 20, 25, 28 |
| Differential problems | 1, 12, 14 |
| Brakes | 1, 2, 14, 18, 20, 26, 29 |
| Catalytic converter and muffler | 1, 2, 12, 15, 22 |
| Ignition | 1, 2, 7, 8, 9, 10, 12, 17, 23 |
| Tire wear | 1, 13, 14, 15, 18, 20, 21, 26 |
| Fuel leakage | 20, 23 |
| Fan belt slippage | 1, 2, 3, 7, 8, 12, 15, 19, 20 |
| Alternator deterioration | 1, 2, 7, 8, 15, 19 |
| Coolant pump failure | 1, 2, 3, 24, 27, 30 |
| Coolant hose failure | 1, 2, 3, 27, 30 |
| Starter failure | 1, 2, 7, 8, 9, 12, 15 |
| Dirty air filter | 2, 3, 6, 11, 12, 17, 22 |

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed can not be obtained by observing one data point in time as is now done by most vehicle sensors. Usually an analysis of the variation in a parameter as a function of time is necessary. In fact, the association of data with time to create a temporal pattern for use in diagnosing component failures in automobile is unique to this invention. Fourth, the vibration measuring capability of the airbag crash sensor, or other accelerometer, is useful for most of the cases discussed above yet there is no such current use of this sensor. The airbag crash sensor is used only to detect crashes of the vehicle. Fifth, the second most used sensor in the above list, a microphone, does not currently appear on any automobiles yet sound is the signal most often used by vehicle operators and mechanics to diagnose vehicle problems. Another sensor that is listed above which also does not currently appear on automobiles is a pollution sensor. This is typically a chemical sensor mounted in the exhaust system for detecting emissions from the vehicle. It is expected that this and other chemical sensors will be used in the future.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise, it is also possible to provide for a multiplicity of sensors each receiving a different signal related to a specific component which are then analyzed by the processor to determine if that component is operating in an abnormal state.

The discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system coupled to the diagnostic module or system in accordance with the invention, when a component is likely to fail. As envisioned, on some automobiles, when the diagnostic module 2075 detects a potential failure it not only notifies the driver through a display 2100, but also automatically notifies the dealer through a vehicle cellular phone 2200. The dealer can thus phone the vehicle owner and schedule an appointment to undertake the necessary repair at each party's mutual convenience. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases, it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn off all non-essential devices which use electricity thereby conserving electrical energy and maximizing the time and distance that the vehicle can travel before exhausting the energy in the battery. Similarly, in the event of a crash, the system can turn off all safety impacting devices such as the fuel pump to minimize the chance of a fire, for example.

In the discussion above, the diagnostic module of this invention assumes that a vehicle data bus exists which is used by all of the relevant sensors on the vehicle. Most vehicles today do not have a data bus although it is widely believed that most vehicles will have one in the future. Naturally, the relevant signals can be transmitted to the diagnostic module through a variety of coupling means other than through a data bus and this invention is not limited to vehicles having a data bus, nor must all devices by on a single or even multiple buses or one or more "data buses" can be wireless using Bluetooth or other system.

As can be appreciated from the above discussion, the invention described herein brings several new improvements to automobiles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure in time so that the failure can be averted and vehicle breakdowns substantially eliminated.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). The data from the test are used to generate the pattern recognition algorithm, e.g., neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as tests in which two or more components are operating abnormally. In this manner, the diagnostic module may be able to determine based on one set of signals from the sensors during use that either a single component or multiple components are operating abnormally.

Furthermore, the pattern recognition algorithm may be trained based on patterns within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components.

The invention is also particularly useful in light of the foreseeable implementation of smart highways. Smart highways will result in vehicles traveling down highways under partial or complete control of an automatic system, i.e., not being controlled by the driver. The on-board diagnostic system will thus be able to determine failure of a component prior to or upon failure thereof and inform the vehicle's guidance system to cause the vehicle to move out of the stream of traffic, i.e., onto a shoulder of the highway, in a safe and orderly manner. Moreover, the diagnostic system may be controlled or programmed to prevent the movement of the disabled vehicle back into the stream of traffic until the repair of the component is satisfactorily completed.

In a method in accordance with this embodiment, the operation of the component would be monitored and if abnormal operation of the component is detected, e.g., by any of the methods and apparatus disclosed herein (although other component failure systems may of course be used in this implementation), the guidance system of the vehicle which controls the movement of the vehicle would be notified, e.g., via a signal from the diagnostic module to the guidance system, and the guidance system would be programmed to move the vehicle out of the stream of traffic, or off of the restricted roadway, possibly to a service station or dealer, upon reception of the particular signal from the diagnostic module. The automatic guidance systems for vehicles traveling on highways may be any existing system or system being developed, such as one based on satellite positioning techniques or ground-based positioning techniques. Since the guidance system may be programmed to ascertain the vehicle's position on the highway, it can determine the vehicle's current position, the nearest location out of the stream of traffic, or off of the restricted roadway, such as an appropriate shoulder or exit to which the vehicle may be moved, and the path of movement of the vehicle from the current position to the location out of the stream of traffic, or off of the restricted roadway. The vehicle may thus be moved along this path under the control of the automatic guidance system. In the alternative, the path may be displayed to a driver and the driver can follow the path, i.e., manually control the vehicle. The diagnostic module and/or guidance system may be designed to prevent re-entry of the vehicle into the stream of traffic, or off of the restricted roadway, until the abnormal operation of the component is satisfactorily addressed.

Several technologies have been described above all of which have the objective of improving the reliability and reducing the complexity of the wiring system in an automobile and particularly the safety system. Most importantly the bus technology described has as its objective simplification and increase in reliability of the vehicle wiring system. This wiring system was first conceived of as a method of permitting the location of airbag crash sensors at locations where they can most effectively sense a vehicle crash and yet permit that information to be transmitted to airbag control circuitry which may be located in a protective portion of the interior of the vehicle or may even be located on the airbag module itself. To protect this affirmation transmission requires a wiring system that is far more reliable and resistant to being destroyed in the vary crash that the sensor is sensing. This led to the realization that the data bus that carries the information from the crash sensor must be particularly reliable. Upon designing such a data bus, however, it was found that the capacity of that data bus far exceeded the needs of the crash sensor system. This then led to a realization that the capacity, or bandwidth, of such a bus would be sufficient to carry all of the vehicle information requirements. In some cases this requires the use of high bandwidth bus technology such as twisted pair wires, shielded twisted pair wires, or coax cable. Naturally if a subset of all of the vehicle devices is included on the bus then the bandwidth requirements are less and simpler bus technologies can be used in place of the coax cable, for example. The economics that the accompany a data bus design which lies the highest reliability, highest bandwidth, is justified if all of the vehicle devices use the same system. This is where the greatest economies and greatest reliability occur. As described above this permit, for example, the placement of the airbag firing electronics into the same housing that contains the airbag inflator. Once the integrity of the data bus is assured, such that it will not be destroyed during the crash itself, then the proper place for the airbag intelligence is in the airbag module itself. This further proves the reliability of the system since the shorting of the wires to the airbag module will not inadvertently set off the airbag as has happened frequently in the past.

When operating on the vehicle data bus, each device should have a unique address and each associated device must know that address. For most situations, therefore, this address must be predetermined and then assigned through an agreed-upon standard for all vehicles. Thus, the left rear tail light must have a unique address so that when the turn signal is turned to flash that light, it does not also flash the right rear tail light, for example. Similarly, the side impact crash sensor which will operate on the same data bus as the frontal impact crash sensor, must issue a command to the side impact airbag and not to the frontal impact airbag.

One of the key advantages of a single bus system connecting all sensors in the vehicle together is the possibility of using this data bus to diagnose the health of the entire vehicle, as described in the detail above. Thus we can see the synergistic advantages of all the disparate technologies described above.

The design, construction, installation, and maintenance a vehicle data bus network requires attention to a many issues, including: an appropriate communication protocol, physical layer transceivers for the selected media, capable microprocessors for both application and protocol execution, device controller hardware & software for the required sensors and actuators, etc. Such activities are known to those skilled in the art and will not be described in detail here.

An intelligent distributed system as described above can be based on the CAN Protocol, for example, which is a common protocol used in the automotive industry. CAN is a full function network protocol that provides both message checking and correction to insure communication integrity. Many of the devices on the system will have special diagnostics designed into them. For instance, some of the inflator controls can send warning messages if their backup power supply has insufficient charge. In order to assure the integrity and reliability of the bus system, most devices will be equipped with bi-directional communication as described above. Thus, when a message is sent to the rear right taillight to turn on, the light can return a message that it has executed the instruction.

Figure 22:
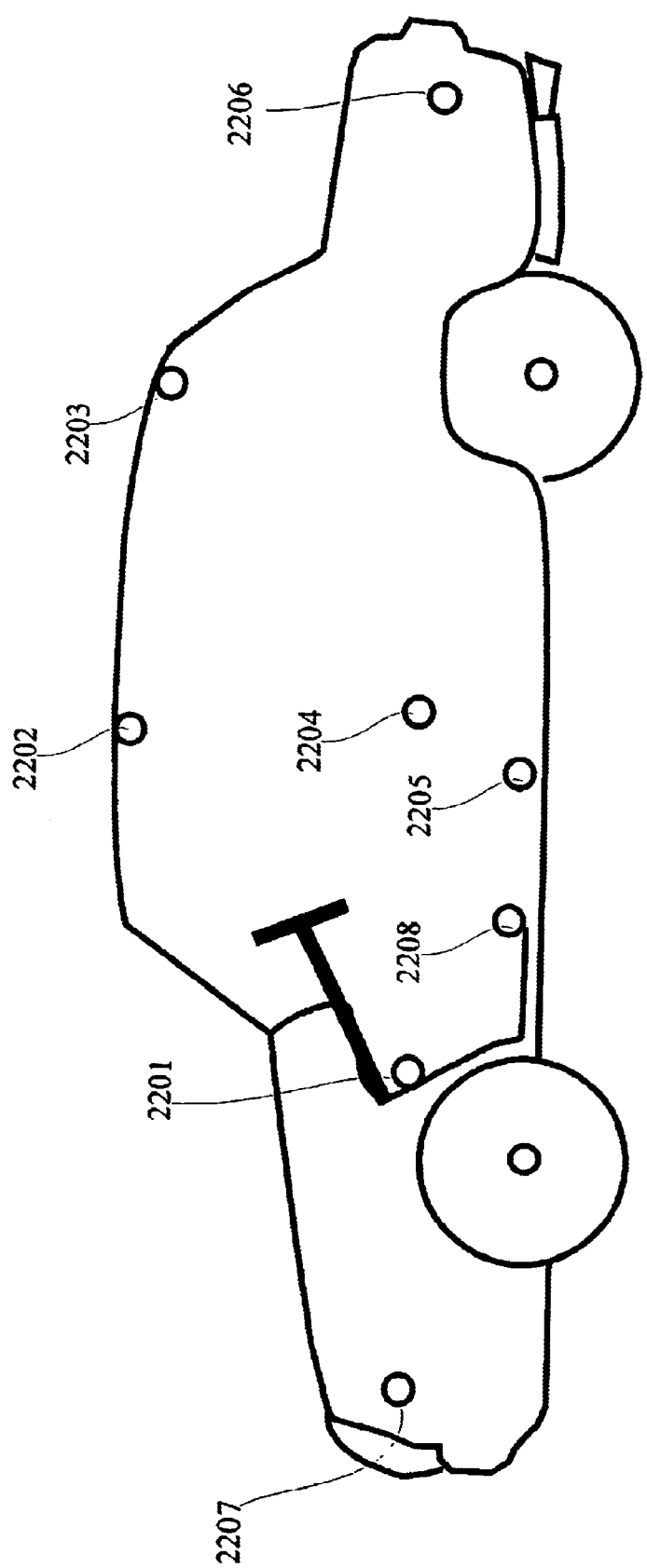
FIG. 22 is a schematic of a vehicle with several accelerometers and/or gyroscopes at preferred locations in the vehicle.

FIG. 22 illustrates the placement of a variety of sensors, primarily accelerometers and/or gyroscopes, which can be used to diagnose the state of the vehicle itself. Sensor 2201 can measure the acceleration of the firewall or instrument panel and is located thereon generally midway between the two sides of the vehicle. Sensor 2202 can be located in the headliner or attached to the vehicle roof above the side door. Typically, there will be two such sensors one on either side of the vehicle. Sensor 2203 is shown in a typical mounting location midway between the sides of the vehicle attached to or near the vehicle roof above the rear window. Sensor 2206 is shown in a typical mounting location in the vehicle trunk adjacent the rear of the vehicle. One, two or three such sensors can be used depending on the application. If three such sensors are use one would be adjacent each side of vehicle and one in the center. Sensor 2204 is shown in a typical mounting location in the vehicle door and sensor 2205 is shown in a typical mounting location on the sill or floor below the door. Finally, sensor 2207, which can be also multiple sensors, is shown in a typical mounting location forward in the crush zone of the vehicle. If three such sensors are used, one would be adjacent each vehicle side and one in the center.

In general, sensors 2201–2207 measure a physical property of the location at which they are mounted. For example, the physical property would be the acceleration of the mounting location if the sensor is an accelerometer and would be angular inclination if the sensor is a gyroscope. Another way of looking at would be to consider that sensors 2201–2207 provide a measurement of the state of the sensor, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. However, any described use or function of the sensors 2201–2207 above is merely exemplary and is not intended to limit the form of the sensor or its function.

Each of the sensors 2201–2207 may be single axis, double axis or triaxial accelerometers and/or gyroscopes typically of the MEMS type. These sensors 2201–2207 can either be wired to the central control module or processor directly wherein they would receive power and transmit information, or they could be connected onto the vehicle bus or, in some cases, using RFID technology, the sensors can be wireless and would receive their power through RF from one or more interrogators located in the vehicle. (RFID stands for "radio frequency identification technology" wherein sensors are each provided with an identification code and designed to be powered by the energy in a radio frequency wave containing that code which is emitted by an interrogator.) In this case, the interrogators can be connected either to the vehicle bus or directly to control module. Alternately, an inductive or capacitive power and information transfer system can be used.

One particular implementation will now be described. In this case, each of the sensors 2201–2207 is a single or dual axis accelerometer. They are made using silicon micromachined technology such as disclosed in U.S. Pat. Nos. 5,121,180 and 5,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications. On the other hand, typical MEMS gyroscopes are not sufficiently accurate for many control applications.

The angular rate function can be obtained through placing accelerometers at two separated, non-co-located points in a vehicle and using the differential acceleration to obtain an indication of angular motion and angular acceleration. From the variety of accelerometers shown on FIG. 22, it can be readily appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes.

Instead of using two accelerometers at separate locations on the vehicle, a single conformal MEMS-IDT gyroscope may be used. (A MEMS-IDT gyroscope is a microelectromechanical system-interdigital transducer gyroscope.) Such a conformal MEMS-IDT gyroscope is described in a paper by V. K. Karadan, "Conformal MEMS-IDT Gyroscopes and Their Comparison With Fiber Optic Gyro", incorporated in its entirety herein. The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures.

The system of FIG. 22 using dual axis accelerometers, therefore provide a complete diagnostic system of the vehicle itself and its dynamic motion. Such a system is far more accurate than any system currently available in the automotive market. This system provides very accurate crash discrimination since the exact location of the crash can be determined and, coupled with a knowledge of the force deflection characteristics of the vehicle at the accident impact site, an accurate determination of the crash severity and thus the need for occupant restraint deployment can be made. Similarly, the tendency of a vehicle to roll over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to the slide or skid can be considerably more accurately determined and again the steering, braking and throttle systems commanded to minimize the unstable vehicle behavior.

Thus, through the sample deployment of inexpensive accelerometers and MEMS gyroscopes, particularly MEMS-IDT gyroscopes, at a variety of locations in the vehicle, significant improvements are many in the vehicle stability control, crash sensing, rollover sensing, and resulting occupant protection technologies.

Finally, as mentioned above, the combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting. This can be done by observing the acceleration signals from the sensors of FIG. 22 and simultaneously the dynamic strain gage measurements from the seat mounted strain gages. The accelerometers provide the input function to the seat and the strain gages measure the reaction of the occupying item to the vehicle acceleration and thereby provide a method for dynamically determining the mass and other inertial properties of the occupying item and its location. This is particularly important for occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

For this embodiment, sensor 2208 represents one or more strain gage weight sensors mounted on the seat or in connection with the seat or its support structure. Suitable mounting locations and forms of weight sensors are discussed in the current assignee's U.S. patent application Ser. No. 09/193,209 and contemplated for use in this invention as well. The mass or weight of the occupying item of the seat can thus be measured based on the dynamic measurement of the strain gages with optional consideration of the measurements of accelerometers on the vehicle, which are represented by any of sensors 2201–2207.

In view of the foregoing, disclosed herein is an airbag deployment system which comprises at least one module housing, at least one deployable airbag associated with each housing, inflator means associated with each housing for inflating the airbag(s) to deploy, e.g., into the passenger compartment, airbag inflation determining means for determining that deployment of the airbag(s) is/are desired, and respective electronic control means arranged within or proximate each housing and coupled to a respective inflator means and to the airbag inflation determining means for initiating the inflator means to inflate the airbag(s) in the respective housing upon receiving a signal from the airbag inflation determining means. The control means include a power supply for enabling initiation of the inflator means. The airbag inflation determining means preferably generate a coded signal when deployment of the airbag(s) is desired and the control means receive the coded signal and initiate the inflator means based thereon.

The system may also comprise an occupant position sensor or position-sensing means coupled to the control means of each housing for detecting the position of an occupant to be protected by the deployment of the airbag from the housing. In this case, the control means initiate the respective inflator means to inflate the airbag(s) in the respective housing in consideration of (or based in part on) the detected position of the occupant. Also, the position sensing means may comprise a wave transmitter for transmitting waves into the passenger compartment and a wave receiver for receiving waves from the passenger compartment, the wave transmitter and wave receiver both being coupled to the control means. The control means may send a signal to the wave transmitter to cause the wave transmitter to transmit the waves into the passenger compartment. In some embodiments, there are several housings and the system thus may include delay means arranged in association with at least one housing for providing a delay in the inflation of the airbag(s) therein initiated by the control means associated with the housing upon receiving the signal from the airbag inflation determining means. The delay means provide variable delays in the inflation of the airbag(s) in the housings such that the airbag(s) in the housings inflate at different times.

The system may also include diagnostic means arranged within each housing for determining the status of the control means, and monitoring means coupled to each diagnostic means for receiving the status of the control means associated with each module and providing a warning if the control means of any module fails. The airbag inflation determining means and control means may be arranged on a single vehicle bus.

The aspect of reducing the concentration of toxic gas in the passenger compartment resulting from airbag deployment in the present invention is centered around solving the problem of an excess build up of pressure when more than two airbags (or an unconventionally large airbag) are deployed in an accident by reducing the pressure before, during and/or after deployment of a plurality of airbags. Initially, care is taken to reduce the problem by not deploying any unnecessary airbags by detecting the presence of occupants on particular seats. Thus, if there is no front seat passenger present then the airbags designed to protect such an occupant are not inflated. This is not for the purpose of minimizing the repair costs as is the object of other similar systems, but to control the pressure buildup when multiple airbags are deployed. After a decision is made as to what seats need to be protected, the next step is to determine how many airbags are needed to provide the best protection to the vehicle occupants in those seats. This might require the deployment of a knee airbag, especially if the occupant is not wearing a seatbelt, and of a side head protection airbag if the frontal impact has an angular component which might cause the occupant's head to strike the A-pillar of the vehicle, for example. When the total number of airbags deployed exceeds a given number, means are then provided to open a hole in the vehicle to reduce the pressure buildup.

Other factors are taken into account to determine the particular given number of deploying airbags that necessitate the opening of a hole. These include the use of highly aspirated airbags systems. Aspirated systems are in use today but not for the purpose of reducing the pressure buildup in the vehicle caused by the deployment of multiple airbags. Indeed, it has been the case that no more than two airbags have yet been deployed in a vehicle accident.

An unexpected result of the pressure reducing features of the present invention is the fact that now propellants which have heretofore not been considered for airbags can now be used which substantially reduce the cost and improve the performance of airbag systems.

A further unexpected result of the incorporation of the electronics into the module feature of the present invention is that the reliability of the system is substantially improved.

In one embodiment disclosed herein, the airbag module in accordance with the invention is long and thin and can conveniently be made in any length and bent into almost any generally linear shape. This module is typically mounted on or slightly below a surface in the passenger compartment such as the ceiling, instrument panel, seat or knee bolster support structure. When the deployment of the module is initiated, a cover is released and a thin, preferably film, airbag is inflated using a highly aspirated inflator using a clean propellant which if undiluted might be toxic to humans.

More particularly, in certain embodiments in accordance with the invention, the airbag module comprises an elongate housing having a length in the longitudinal direction which is substantially larger than a width or thickness thereof in a direction transverse to the longitudinal direction, an airbag situated within the housing, inflator means arranged in the housing for producing pressurized gas to inflate the airbag, mounting means for mounting the module in the passenger compartment, initiation means for initiating the inflator means to produce the pressurized gas in response to the crash of the vehicle, and the housing comprises cover means for releasably retaining the airbag. Preferably, the length of the housing is at least ten times larger than the width or the thickness of the housing thereby permitting mounting of the module with minimal penetration below a mounting surface of the passenger compartment. In one embodiment, the inflator means and airbag extend in the longitudinal direction of the housing and the inflator means are elongate and have a length which is more than half the length of the airbag measured in the longitudinal direction when the airbag is inflated. The airbag system also optionally includes means for reducing the concentration of toxic gas in the passenger compartment which are ideally activated upon deployment of the airbag.

The inflator means may comprise a gas generator having a length substantially in the longitudinal direction of the housing exceeding ten times a width or thickness of the gas generator in a direction transverse to the longitudinal direction.

Furthermore, the housing includes an elongate support base mounted to a surface of the passenger compartment by the mounting means and which has a catch at each longitudinal side. In this embodiment, the cover means comprise a tab engaging with the catch to retain the cover means, the tab being released from the catch during deployment of the airbag.

In another embodiment disclosed herein, the inflator means comprise an elongate gas generator including a propellant for producing pressurized gas to inflate the airbag which has a length at least ten times its width or thickness. The mounting means are then structured and arranged to mount the module substantially onto a peripheral surface of the passenger compartment while the initiation means are structured and arranged to initiate the gas generator to produce the pressurized gas in response to the crash of the vehicle. The cover means cover the airbag prior to the production of the pressurized gas and the housing further includes removal means for enabling removal of the cover means to permit the deployment of the airbag. The surface of the passenger compartment to which the module is mounted is a back surface of a front seat of the vehicle, an instrument panel in the vehicle, possibly in such a position as to afford protection to the knees of a front seat occupant during the crash of the vehicle, or the ceiling of the vehicle, e.g., at a location in front of a front seat of the vehicle and suitable for mounting the module for protecting occupants of the front seat in a frontal impact or at a location along a side of the vehicle and suitable for mounting the module for protecting occupants of both front and rear seats in a side impact or at a location behind a front seat of the vehicle.

In yet another embodiment disclosed herein, the inflator means comprises an elongate gas generator for producing the pressurized gas to inflate the airbag and therefore, the initiation means are structured and arranged to initiate the gas generator to produce the pressurized gas in response to the crash of the vehicle. The module further includes aspiration means for combining gas from the passenger compartment with the pressurized gas from the gas generator and directing the combined gas into the airbag. Such aspiration means may comprise a linear nozzle leading from a combustion chamber in the gas generator and having a converging section followed by a diverging section and ending at a mixing chamber in the module, whereby the pressurized gas flows from the combustion chamber through the linear nozzle into the mixing chamber, and means defining at least one aspiration inlet port such that gas from the passenger compartment flows through the aspiration inlet port into the mixing chamber. The mixing length is at least fifty times the minimum thickness of a jet of the pressurized gas from the gas generator within the nozzle. The mixing chamber comprises nozzle means defining a converging section and a diverging section arranged after the converging section in a direction of flow of the combined pressurized gas and gas from the passenger compartment. The dimensions of the converging-diverging nozzle and aspiration inlet port(s) are selected so that the gas entering the airbag is at least about 80 percent from the passenger compartment. The aspiration means may also comprise a pair of nozzle walls extending in the longitudinal direction at a respective side of the gas generator, such that the gas generator is situated between the nozzle walls and the pressurized gas from the gas generator is directed into a mixing chamber defined in part between the nozzle walls, and springs for connecting the nozzle walls to the support base. The springs have a first position in which the nozzle walls are proximate to the support base and a second position in which the nozzle walls are spaced apart from the support base. The springs are extended to the second position during production of the pressurized gas to separate the nozzle walls from the support base to define aspiration inlet ports between the nozzle walls and the support base. In this case, the module also includes support shields connected to and extending between the nozzle walls. The support shields define the mixing chamber prior to deployment of the airbag and are forced outward to define a second converging-diverging nozzle leading from the mixing chamber to the airbag through which the pressurized gas flows.

The gas generator preferably comprises an elongate housing, which may be made of plastic, having a length at least 10 times its thickness or width, propellant dispersed in an interior of and substantially along the length of the gas generator housing, igniter means for initiating burning of the propellant; and gas generator mounting means for mounting the gas generator in the passenger compartment. The gas generator housing comprises at least one opening through which gas passes from the interior of the gas generator into the airbag. The opening(s) has/have a variable size depending on the pressure of the gas in the interior of the gas generator housing.

The present invention also relates to an occupant protection system for a vehicle including an airbag module and having power steering means comprising a steering wheel opposed to a driver side portion of a front seat, a servo control system and means for connecting the steering wheel to the control system, e.g., a deformable support member. The mounting means mount the module in the passenger compartment apart from the steering wheel of the vehicle. In this case, the occupant protection system comprises yieldable steering wheel support means for enabling the steering wheel to be displaced away from a position opposed to a driver when situated in the driver side portion of the front seat. The module is thus structured and arranged such that the airbag after deployment cushions the driver from impact with surfaces of the passenger compartment. As such, it is possible to provide a single airbag module to provide protection for the entire front seat which would deploy an airbag from one side of the vehicle to the other side.

It is also envisioned that a single airbag module can provide protection for both a front seat occupant and a rear seat occupant on the same side of the vehicle, In this case, the mounting means mount the airbag module to a surface of the passenger compartment such that it extends in a horizontal direction from a front portion of the passenger compartment toward a rear portion of the passenger compartment adjacent a side of the vehicle. The module would deploy an airbag extending substantially across the entire side of the vehicle alongside the front seat and the rear seat.

Furthermore, it will be appreciated by those skilled in the art, and as explained below, that it is ideal to vary the size of the nozzle of the gas generator through which gas generated by the burning propellant flows in response to variations in the pressure in the chamber in which the propellant is burning. To this end, the present invention includes a gas generator having a housing, propellant dispersed in an interior thereof, igniter means for initiating burning of the propellant, and gas generator mounting means for mounting the gas generator housing to the support base and spaced from the support base to define a nozzle therebetween and which comprise elastic support brackets arranged in the nozzle between the gas generator housing and the support base or strips of deformable material, which deforms as a function of temperature variation, arranged in the nozzle between the gas generator housing and the support base.

In yet another embodiment disclosed herein, the airbag module comprises an airbag, an inflator for producing pressurized gas to inflate the airbag and which comprises a housing, a gas generator arranged therein, and a variable exit opening from the housing through which gas from the gas generator flows to inflate the airbag. The size of the variable exit opening is controlled by the pressure within the housing. The remaining structure of this module may be as described above.

One embodiment of the vehicle electrical system in accordance with the invention discussed above includes a plurality of electrical devices used in the operation of the vehicle, a single communication bus, all of the devices being connected to the communication bus and a single power bus, all of the devices being connected to the power bus (which may be one and the same as the communication bus). The devices are preferably provided with individual device addresses such that each device will respond only to its device address. Each bus may comprise a pair of wires connected to all of the devices. The devices are, e.g., actuators, sensors, airbag modules, seatbelt retractors, lights and switches. If each device is assigned a unique address, the communication bus may be arranged to transfer data in the form of messages each having an address of a respective device such that only the respective device assigned to that address is responsive to the message having the address. Each device thus includes means for determining whether the messages of the communication bus include the address assigned to the device, e.g., a microprocessor. The communication bus may also include a token ring network to provide a protocol for the transfer of messages through the communication bus. Each device may be arranged to acknowledge receipt of a communication via the communication bus and indicate operability of the device upon ignition of the vehicle.

Another electrical system for a vehicle in accordance with the invention comprises a plurality of devices used in the operation of the vehicle, and a single network constituting both a power distribution and a communication/information bus. The network may be a time multiplex network or a code division multiple access or other shared network and consists of a single wire, or a pair of wires, connecting all of the devices. For the single wire case, each device is grounded to an adjacent part of the vehicle.

Still another electrical system for a vehicle in accordance with the invention comprises a plurality of sensors, each detecting a physical characteristic, property or state of the vehicle, and a data bus, all of the sensors being connected to the data bus. A module is also preferably connected to the data bus and arranged to receive signals from the sensors and process the signals to provide information derived from the physical characteristics, properties or states detected by the sensors. The module may be arranged to process the physical characteristics, properties or states detected by the sensors to determine whether a component in the vehicle is operating normally or abnormally. A display, e.g., a light on the vehicle dashboard, may be coupled to the module for displaying the information derived from the physical characteristics, properties or states detected by the sensors. A telecommunications device may also be coupled to the module for communicating with a remote station to provide the remote station with the information derived from the physical characteristics, properties or states detected by the sensors, e.g., impending failure of a specific vehicle component or a vehicle crash. More specifically, the sensors may generate signals containing information as to whether the component is operating normally or abnormally whereby the module comprises pattern recognition means for receiving the signals and ascertaining whether the signals contain patterns representative of normal or abnormal operation of the component.

By using a single pair of wires in a twisted pair or coaxial configuration for the communication bus, and perhaps using another for the power bus, the connector problem can now be addressed because a single design can be used for all connections on the bus and each connector will only be connecting at most two wires. A great deal of effort can thus be applied to substantially improve the reliability of such a connector.

Although several preferred embodiments are illustrated and described above, there are possible combinations using other geometries, materials and different dimensions for the components that perform the same functions as described and illustrated herein. This invention is not limited to the above embodiments and should be determined by the following claims. For example, the reducing means for reducing the concentration of toxic gas in the passenger compartment of the vehicle in conjunction with deployment of the at least one airbag may be coupled to an element of the airbag module which would indicate deployment of the airbag or may be a completely separate system which is positioned to detect or sense deployment of the air bag and activate accordingly. Also, for example, although the airbag is described as being a film airbag, it must be understood that this is only a preferred embodiment and that the airbag can be made of any other material, even though this may detract from efficient operation of the airbag module. Lastly, a variety of different processes for inflating an airbag so as to provide a high pumping ratio, i.e., a high ratio of gas from the passenger compartment to pressurized gas from the inflator means, as well as to achieve the numerous objects mentioned above, are also within the scope of the invention disclosed herein as are different configurations of the electronic circuits. It is quite possible to house the passenger side electronic circuit within the passenger module instead of adjacent to it and it is also possible to house the electronic circuitry within either the passenger or driver electronic circuitry.

Appendix: Analysis of Aspiration NozzleAppendix: Analysis of Aspiration Nozzle

Gas at high pressure and temperature is generated in the chamber of the inflator. This gas flows through a convergent-divergent nozzle, to emerge near the throat of a larger convergent-divergent nozzle. Both nozzles are two-dimensional and symmetric about the center plane. Passenger compartment air enters the larger nozzle and begins to mix with the inflator gas where the inflator gas emerges from its nozzle. At the end of a mixing section the two streams are substantially uniformly mixed. The mixing section is followed by a divergent section where some of the velocity of the mixed stream is converted back into pressure sufficient to fill the airbag.

The inflator gas emerges from its nozzle as a supersonic jet at high speed and relatively low static pressure and temperature. As the jet mixes with the surrounding air it entrains this air, imparting some of its high kinetic energy to the combined stream. The techniques required for analysis of this process are contained in the book The Theory of Turbulent Jets by G. N. Abramovich (The M.I.T. Press, Cambridge Mass., 1963). The basic technique is to reduce the full three- or four-dimensional equations of transient fluid flow by integrating them over the cross-section. This is supplemented by additional approximations justified by theory and experiment.

The equations of fluid flow may be expressed as conservation of mass, momentum, and energy. Let x be the distance along the central plane from the exit of the inflator gas nozzle, in the direction of flow,
y be the distance from the central plane,
b be the value of y at the boundary of the jet,
$C_p$ be the fluid heat capacity at constant pressure,
u be the time-averaged fluid speed in the x-direction,
p be the fluid static pressure,
T be the (absolute) static temperature of the fluid,
h be the fluid enthalpy,
ρ be the fluid mass density,
R be the gas constant,
γ be the specific heat ratio of the fluid,
μ be the fluid viscosity,
k be the fluid thermal conductivity,
m' be the mass flow rate per unit width (per unit z) of the inflator,
q' be the heat input rate per unit width of the inflator nozzle,
n be the aspiration ratio, the ratio of the mass flow rate of air to the mass flow rate of the inflator gas,
f be the fanning friction factor,
$h_e$ be the heat transfer coefficient, based on the adiabatic saturation temperature,
Pr be the Prandtl number,
Re be the Reynolds number,
St be the Stanton number.
The following subscripts are used:
m for the central plane (inside the jet),
H for the fluid outside the jet (air),
w for the fluid adjacent to the wall of the outer nozzle, or for the wall of the inner nozzle,
0 for the cross-section where the supersonic inflator gas jet emerges (the beginning of the mixing section),
2 or the end of the mixing section,
3 or the exit from the air nozzle (airbag entrance),
t for total (stagnation) properties,
a for ambient conditions, inside the vehicle,
i for pressure and temperature inside the inflator, before expansion,
* for the throat of the convergent-divergent inflator exit nozzle,
as for adiabatic saturation (temperature),
ref for properties or numbers evaluated at the reference temperature,
bag for fluid properties inside the airbag.

Note that $b_0$ is the half-thickness of the supersonic inflator gas nozzle at its exit.

Then after integrating over the cross-section the conservation equations for steady flow become $$\text{Mass:} \int_0^{y_w} \rho u \, dy = \rho_{m0} - u_{m0} b_0 + \rho_{H0} u_{H0} (y_{w0} - b_0). \qquad 1$$

$$\text{Momentum:} \int_0^{y_w} \rho u^2 \, dy = \rho_{m0} - u_{m0}^2 b_0 + \rho_{H0} u_{H0}^2 (y_{w0} - b_0) + \qquad 2$$
$$b_0 p_{m0} + (y_{m0} - b_0) p_{H0} +$$
$$\int_0^x p_w \, dy_w - \int_0^{y_w} p \, dy.$$

$$\text{Energy:} \int_0^{y_w} \rho u h_t = \rho_{m0} u_{m0} h_{mt0} + \rho_{H0} u_{H0} h_{Ht0} (y_{w0} - b_0). \qquad 3$$

$$m'_m = 2\rho_{m0} u_{m0} b_0, \quad m'_H = 2\rho_{H0} u_{H0} (y_{w0} - b_0), \quad m' = m'_m + m'_H, \qquad 4$$

The approximations have been made that the conditions (velocity, temperature, pressure) in the two streams are each substantially uniform at the cross-section where they meet, that time-averaged fluid velocity components in the cross-directions are much smaller than in the axial direction, and that the friction and heat transfer at the wall in the outer nozzle may be neglected. These approximations may be relaxed, and will be in later studies, but should have a secondary effect on the results of interest.

Abramovich provides expressions for the velocity and total temperature profiles in the jet in terms of the values on the mid-plane and in the surrounding air. These can be substituted in the conservation equations, along with expressions for the air properties in terms of the pressure, to provide 3 equations for the axial distribution of mid-plane velocity, mid-plane temperature, and pressure. This calculation will be necessary to determine the effect of the finite length of the mixing section and to find the optimum length. An approximation to the overall performance of the aspirator can be found more simply if the flow is assumed to be fully mixed and substantially uniform at the end of the mixing length. Further approximations in this preliminary analysis are that in the air nozzle and in the mixing section the fluids are perfect gases with constant specific heats, that the two streams have the same properties, those of air, $$p = \rho RT, \quad C_p = \frac{\gamma R}{\gamma - 1}, \quad h = C_p T, \qquad 5$$

that the air flow up to the point where mixing begins is isentropic, so $$\rho_{H0} = \frac{p_a}{RT_a} \left(\frac{p_{H0}}{p_a}\right)^{\frac{1}{\gamma}}, \quad u_{H0}^2 = 2C_p T_a \left[1 - \left(\frac{p_{H0}}{p_a}\right)^{1-\frac{1}{\gamma}}\right], \qquad 6$$

and that $y_w$ is constant in the mixing region, from x=0 to the section where the flow is substantially uniform again, say at section 2. Then the 3 conservation equations may be written $$\rho_2 u_2 y_w = \rho_{m0} u_{m0} b_0 + \rho_{H0} u_{H0} (y_w - b_0), \qquad 7$$
$$\rho_2 u_2^2 y_w = \rho_{m0} u_{m0}^2 b_0 + \rho_{H0} u_{H0}^2 (y_w - b_0) -$$
$$b_0 p_{m0} + (y_w - b_0) p_{H0} - y_w p_2,$$
$$\rho_2 u_2 T_{2t} y_w = \rho_{m0} u_{m0} T_{mt0} b_0 - \rho_{H0} u_{H0} T_a (y_w - b_0).$$

If the gas temperature in the inflator is relatively low, say less than 2000 F., then equations similar to Eqs. (6) may be used for the inflator nozzle in the preliminary analysis, without introducing errors that cannot be adjusted for later. Sufficient aspiration can be achieved so that the airbag temperature is not excessive. When the inflator temperature is much higher, though, then the inflator gas must be cooled. The inflator gas exit nozzle is, as will be seen, quite thin (small b), and as a result the heat transfer, and, to a lesser extent, the wall fluid friction is significant unless the nozzle is very short. Thus the nozzle is a natural place to cool the hot gases from the inflator.

Flow in the nozzle will be assumed to be turbulent. The fluid flow and heat transfer equations are taken to be (see, for example, F. Kreith, Principles of Heat Transfer, 3rd ed. (Harper & Row, New York, 1973), Chapters 6 and 8, and M. Jakob, Heat Transfer, vol. 1 (John Wiley, New York, 1949), . . .

$$m'_m C_{pt} \frac{dT_t}{dx} = \frac{dq'}{dx} = -2h_e(T_{as} - T_w), \qquad 8$$

$$T_{as} = T + (T_i - T)Pr_{ref}^{1/3},$$

$$\frac{1}{\rho}\frac{dp}{dx} + \frac{d(u^2/2)}{dx} = -f\frac{u^2}{2}\frac{4}{4b},$$

$$f = 0.046 Re_{ref}^{-0.2}, \quad \frac{h_e}{C_{p,ref}\rho u} = St_{ref} = \frac{1}{2}fPr_{ref}^{-2/3},$$

$$T_{ref} = \frac{1}{2}(T + T_w) + 0.22(T_{as} - T),$$

$$Re_{ref} = \frac{2m'_m}{\mu_{ref}}, \quad Pr_{ref} = \frac{C_{p,ref}\mu_{ref}}{k_{ref}}.$$

Some of these may be combined to yield the following equations for the rates of change of velocity and total temperature $$\frac{du}{dx} = -\frac{2b}{m'_m}\frac{dp}{dx} - \frac{fu}{2b}, \qquad 9$$

$$\frac{dT_t}{dx} = -\frac{C_{p,ref}}{C_{pt}}\frac{St_{ref}}{b}[T_t - T_w - (1 - Pr_{ref}^{1.3})(T_t - T)].$$

The temperature dependence of the specific heat of air was taken from NACA Report 1135, Equations, Tables, and Charts for Compressible Flow (U.S. Govt. Printing Office. Washington, 1953) p. 15 (thermally perfect): the temperature dependencies of the viscosity and thermal conductivity were found by fitting Sutherland-type equations (S. Chapman & T. G. Cowling, The Mathematical Theory of Non-Uniform Gases (CUP, Cambridge, 1961) pp. 224 and 241) to data from Kreith p. 636

$$C_p = 3.5R\left\{1 - \frac{2}{7}\left[\left(\frac{5500}{T}\right)^2 \frac{e^{555/T}}{(e^{555/T} - 1)^2}\right]\right\}, \qquad 10$$

$$\mu = 3.564 \times 10^{-6} \frac{T^{1.314}}{T + 594.8} \text{ lb}_m/\text{ft-sec},$$

$$k = 4.113 \times 10^{-7} \frac{(T + 429900) T^{0.9576}}{T + 4451} \text{ Btu/ft-hr-R.}$$

Now suppose that the pressure and temperature in the inflator, $p_i$ and $T_i$, and the ambient pressure and temperature, $p_a$ and $T_a$, are specified, along with the airbag pressure $p_{bag}$, the desired airbag temperature $T_{bag}$, the airbag inflated volume $V_{bag}$, the airbag fill time, and the width of the inflator nozzle. The airbag pressure, temperature, volume, and fill time allow the total mass flow rate m to be calculated, and dividing this by the width gives the required m'. If heat loss from the inflator gas is ignored then the required aspiration ratio is given by $$n = \frac{T_i - T_{bag}}{T_{bag} - T_a}. \qquad (11a)$$

If the inflator temperature is too high, then the inflator exit nozzle may be designed to achieve some exit total temperature $T_{mt0}$ and the aspiration ratio becomes $$n = \frac{T_{mt0} - T_{bag}}{T_{bag} - T_a}. \qquad (11b)$$

Then $m'_m = m'/(1=n)$ and $m'_H = n\, m'_m$.

The inflator exit nozzle may be designed to produce any reasonable pressure $p_{m0}$ at its exit, regardless of the air pressure at that point.

When the inflator temperature is relatively low, the inflator exit nozzle design is approximated by assuming isentropic flow. Equations similar to Eqs. (6) are used to calculate the density and velocity of the inflator gas at the nozzle exit, section 0. When the inflator temperature is high the inflator nozzle is designed by integrating Eqs. (9) numerically, using the relations of Eqs. (8) and (10). For this the nozzle wall temperature, and an entrance loss factor for the pressure drop, must be specified. The shape was determined by requiring a constant rate of pressure drop with axial distance, until the divergence angle reached a preset maximum and then the divergence angle was held at that value. Different pressure drop rates were tried until the desired exit total temperature was reached. This procedure produces the inflator gas density and velocity at the exit, along with the total temperature.

An air pressure at the start of the mixing section, $P_{H0}$, may be chosen. Equations (6) then allow $\rho_{H0}$ and $u_{H0}$ to be calculated, along with the air nozzle size $y_w - b_0$.

Now Equations (7) may be used to find the properties at the end of the mixing section. The first of Equations (7) allows the product $\rho_2 u_2$ to be calculated, and the third of Equations (7) yields $$T_{2t} = \frac{T_i + nT_a}{1 + n}. \qquad 13$$

Now $$u_2 p_2 = u_2 \rho_2 RT_2 = \rho_2 u_2 R\left(T_{2t} - \frac{u_2^2}{2C_p}\right) \qquad 14$$

and when this is used in the second of Equations (7) that equation becomes a quadratic in $u_2$ with all other quantities known. The two roots of this quadratic correspond to the two possibilities of either subsonic or supersonic flow at section 2. In practice the flow here will be expected to be subsonic (that is, shocks will occur in the supersonic stream). Once $u_2$ is found, $p_2$ is calculated with Equation (13) and $p_{2t}$ with $$p_{2t} = p_2\left[1 - \frac{u_2^2}{2C_p T_{2t}}\right]^{-\frac{\gamma}{\gamma - 1}} \qquad 15$$

When the gas mixture comes to rest in the airbag its temperature will be $T_{bag} = T_{2t}$, (neglecting heat lost to the airbag material).

In the divergent portion of the main nozzle, after section 2, some of the kinetic energy at section 2 is converted into an increase in static pressure. If $y_{w3}$ is the half-thickness at the exit from the divergent portion, and $p_3$ the pressure at the exit, then $$\frac{y_{w3}}{y_w} = \left(\frac{p_2}{p_3}\right)^{\frac{1}{\gamma}} \sqrt{\frac{1-\left(\frac{p_2}{p_{2t}}\right)^{\frac{\gamma-1}{\gamma}}}{1-\left(\frac{p_3}{p_{2t}}\right)^{\frac{\gamma-1}{\gamma}}}}. \qquad 16$$

$p_3$ will be the airbag pressure $p_{bag}$.

If $p_{bag}$ and $y_{w3}$ are specified then the last series of calculations may be preformed for different $p_{H0}$ until the correct value is found for $p_{H0}$. This will be the value that causes Equation (15) to be satisfied. Alternatively, if $p_{2t}$ is greater than $p_{bag}$, then the necessary value of $y_{w3}$ may be computed.

When Equations (9) are integrated numerically then the thickness at the minimum section of the inflator nozzle will be evident. When the gas flow in the inflator nozzle is assumed to be isentropic, then the half-thickness at the throat of the convergent-divergent inflator exit nozzle is given by $$\frac{b_x}{b_0} = \sqrt{\frac{\gamma+1}{\gamma-1}} \left(\frac{\gamma+1}{2}\right)^{\frac{1}{\gamma-1}} \left(\frac{p_{m0}}{p_i}\right)^{\frac{1}{\gamma}} \sqrt{1-\left(\frac{p_{m0}}{p_i}\right)^{\frac{\gamma-1}{\gamma}}}. \qquad 17$$

We claim:

1. In a vehicle having seats, an occupant protection system for protecting one or more occupants comprising:
a deployable occupant protection device arranged on at least one of the seats,
deployment determining means for generating a signal indicative of whether deployment of said occupant protection device is desired, and
an electrical bus extending into the seat and electrically coupling said occupant protection device and said deployment determining means, the signal from said deployment determining means being sent over said bus to said occupant protection device to enable deployment of said occupant protection device.

2. The vehicle of claim 1, wherein said occupant protection device includes an airbag module having an airbag.

3. The vehicle of claim 1, wherein said occupant protection device is arranged at a rear of the seat and to be deployable rearward for protecting an occupant situated behind the seat.

4. The vehicle of claim 1, wherein said deployment determining means comprise a crash sensor for sensing a crash event and providing a signal indicative thereof, said crash sensor being electrically coupled to said bus.

5. The vehicle of claim 4, wherein said occupant protection device is arranged in a housing, said crash sensor being arranged separate and at a location apart from said housing.

6. The vehicle of claim 1, wherein said bus includes a single pair of wires.

7. The vehicle of claim 1, wherein said occupant protection device is resident in a module housing and includes at least one airbag and an inflator for inflating said at least one airbag.

8. The vehicle of claim 7, further comprising control means arranged within or proximate said housing and coupled to said inflator and via said bus to said deployment determining means, said control means initiating inflation of said at least one airbag by said inflator upon receiving a coded signal from said deployment determining means.

9. The vehicle of claim 8, wherein said control means include a power supply for enabling initiation of said inflator.

10. The vehicle of claim 8, further comprising an occupant position sensor arranged to detect the position of the occupant to be protected by said occupant protection device, said control means being structured and arranged to initiate inflation of said at least one airbag by said inflator in consideration of the detected position of the occupant.

11. The vehicle of claim 10, wherein said occupant position sensor is arranged in said housing.

12. The vehicle of claim 8, wherein said control means are arranged within said housing.

13. The vehicle of claim 1, wherein said occupant protection device is resident in a module housing, further comprising a power supply arranged in said housing for supplying power to initiate deployment of said occupant protection device.

14. The vehicle of claim 13, further comprising monitoring means arranged in said housing for monitoring energy stored in said power supply.

15. In a vehicle having seats, an occupant protection system for protecting one or more occupants comprising:
a deployable occupant protection device arranged in connection with at least one of the seats;
a crash sensor for generating a signal indicative of whether deployment of said occupant protection device is desired; and
an electrical bus located at least partially within the seat and electrically coupling said occupant protection device and said crash sensor, the signal from said crash sensor being sent over said bus to said occupant protection device to enable deployment of said occupant protection device.

16. The vehicle of claim 15, wherein said occupant protection device includes an airbag module having an airbag.

17. The vehicle of claim 15, wherein said occupant protection device is arranged at a rear of the seat and to be deployable rearward for protecting an occupant situated behind the seat.

18. The vehicle of claim 15, wherein said occupant protection device is arranged in a housing, said crash sensor being arranged separate and at a location apart from said housing.

19. The vehicle of claim 15, wherein said bus includes a single pair of wires.

20. The vehicle of claim 15, wherein said occupant protection device is resident in a module housing and includes at least one airbag and an inflator for inflating said at least one airbag.

21. The vehicle of claim 20, further comprising control means arranged within or proximate said housing and coupled to said inflator and via said bus to said crash sensor, said control means initiating inflation of said at least one airbag by said inflator upon receiving a coded signal from said crash sensor.

22. The vehicle of claim 21, wherein said control means include a power supply for enabling initiation of said inflator.

23. The vehicle of claim 21, further comprising an occupant position sensor arranged to detect the position of the occupant to be protected by said occupant protection device, said control means being structured and arranged to initiate inflation of said at least one airbag by said inflator in consideration of the detected position of the occupant.

24. The vehicle of claim 23, wherein said occupant position sensor is arranged in said housing.

25. The vehicle of claim 21, wherein said control means are arranged within said housing.

26. The vehicle of claim 15, wherein said occupant protection device is resident in a module housing, further comprising a power supply arranged in said housing for supplying power to initiate deployment of said occupant protection device.

27. The vehicle of claim 26, further comprising monitoring means arranged in said housing for monitoring energy stored in said power supply.

28. A method for controlling deployment of an occupant protection system for protecting one or more occupants in a vehicle comprising the steps of:

arranging a deployable occupant protection device on at least one of the seats;

generating a signal indicative of whether deployment of the occupant protection device is desired by means of a crash sensor;

electrically coupling the occupant protection device and the crash sensor by means of an electrical bus extending at least partially into the seat, and directing the signal from the crash sensor over the bus to the occupant protection device to enable deployment of the occupant protection device.

29. The method of claim 28, wherein the occupant protection device is arranged at a rear of the seat and to be deployable rearward for protecting an occupant situated behind the seat.

30. The method of claim 28, further comprising the steps of:

arranging the occupant protection device in a housing; and arranging the crash sensor separate and at a location apart from the housing of the occupant protection device.

31. The method of claim 28, wherein said bus includes a single pair of wires.

32. The method of claim 28, further comprising the step of arranging the occupant protection device in a module housing including at least one airbag and an inflator for inflating the at least one airbag.

33. The method of claim 32, further comprising the step of arranging a control unit within or proximate the housing and coupling the control unit to the inflator and via the bus to the crash sensor, the control unit initiating inflation of the at least one airbag by the inflator upon receiving a coded signal from the crash sensor.

34. The method of claim 33, further comprising the step of providing a power supply in the housing for enabling initiation of the inflator.

35. The method of claim 33, further comprising the steps of:

detecting the position of the occupant to be protected by the occupant protection device; and initiating inflation of the at least one airbag by the inflator in consideration of the detected position of the occupant.

36. The method of claim 28, further comprising the steps of:

arranging the occupant protection device in a module housing; and providing a power supply in the housing for supplying power to initiate deployment of the occupant protection device.

* * * * *